US012595325B2

(12) United States Patent
Kipiani et al.

(10) Patent No.: US 12,595,325 B2
(45) Date of Patent: *Apr. 7, 2026

(54) PROCESS FOR THE PREPARATION OF A MULTIMODAL POLYETHYLENE

(71) Applicant: BOREALIS AG, Vienna (AT)

(72) Inventors: Georgy Kipiani, Kulloo (FI); Jyrki Kauhanen, Kulloo (FI); Felice De Santis, Linz (AT); Marja Mustonen, Kulloo (FI); Matthias Hoff, Linz (AT); Kalin Simeonov, Linz (AT); Kimmo Hakala, Helsinki (FI); Jarkko Hassinen, Kulloo (FI); Maria Ranieri, Kulloo (FI); Esko Saikkonen, Kulloo (FI); Tiina Hämäläinen, Kulloo (FI); Stefan Pollhammer, Linz (AT); Pascal Castro, Kulloo (FI); Irfan Saeed, Kulloo (FI); Kalle Kallio, Kulloo (FI)

(73) Assignee: BOREALIS AG, Vienna (AT)

( * ) Notice: Subject to any disclaimer, the term of this patent is extended or adjusted under 35 U.S.C. 154(b) by 532 days.

This patent is subject to a terminal disclaimer.

(21) Appl. No.: 18/017,439

(22) PCT Filed: Jul. 23, 2021

(86) PCT No.: PCT/EP2021/070757

§ 371 (c)(1), (2) Date: Jan. 23, 2023

(87) PCT Pub. No.: WO2022/018290

PCT Pub. Date: Jan. 27, 2022

(65) Prior Publication Data

US 2024/0002560 A1 Jan. 4, 2024

(30) Foreign Application Priority Data

Jul. 23, 2020 (EP) .................................... 20187383

(51) Int. Cl.
*C08F 210/16* (2006.01)
*B01J 31/12* (2006.01)
(Continued)

(52) U.S. Cl.
CPC ........... *C08F 210/16* (2013.01); *B01J 31/122* (2013.01); *B01J 37/0201* (2013.01); *C07F 17/00* (2013.01); *C08F 4/65912* (2013.01); *B01J 2231/12* (2013.01); *B01J 2531/48* (2013.01); *C08F 2420/07* (2021.01)

(58) Field of Classification Search
None
See application file for complete search history.

(56) References Cited

U.S. PATENT DOCUMENTS 6,169,051 B1 * 1/2001 Mitani .................. C08F 110/06 502/103
6,184,402 B1 2/2001 Yamazaki et al.
(Continued)

FOREIGN PATENT DOCUMENTS

CN 103380151 A 10/2013
CN 103582669 A 2/2014
(Continued)

OTHER PUBLICATIONS

Severn et al. "Bound but not gagged"—Immobilizing Single-Site alpha-olefin polmerization catalysts, Che. Rev. (2005), 105, 4073-41447.
International Search Report and Written Opinion mailed Nov. 12, 2021 in International Application No. PCT/EP2021/070757 (15 pages).
Davies et al. Studies on 1,2-phenylenedioxoborylcyclopentadienes and some of their metal (Ti, Zr, Fe) complexes, Polyhedron, 2006, 25(2), 397-405.
Yamazaki et al. Novel high performance ansa-zirconocene catalysts for isospecific polymerization of propylene, Chemistry Letters, 1999, 12, 1311-1312.
(Continued)

*Primary Examiner* — Christopher M Rodd
(74) *Attorney, Agent, or Firm* — Meunier Carlin & Curfman LLC

(57) ABSTRACT

The invention provides a process for the preparation of a multimodal ethylene polymer in a multistage process in the presence of a catalyst comprising a complex of formula (Ix) wherein each X is a sigma donor ligand; each Het is independently a monocyclic or multicyclic heteroaromatic or heterocyclic group containing at least one heteroatom selected from O, N or S; L is a carbon, silicon or germanium based divalent bridge in which one or two backbone atoms link the ligands; M is Ti, Zr or Hf; each $R_1$ is the same or different and is a linear $C_{1-10}$ alkyl group, or linear $C_{1-10}$ alkoxy, each n is 0 to 3; each $R_2$ is the same or different and is a $C_{1-10}$ alkyl group, $C_{1-10}$ alkoxy group or —$Si(R)_3$ group; each R is the same or different and is $C_{1-10}$ alkyl or phenyl group optionally substituted by 1 to 3 $C_{1-6}$ alkyl groups; and each p is 0 to 3.

(Ix)

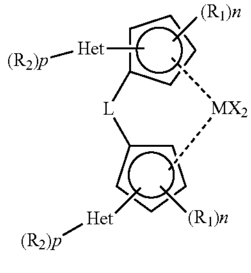

21 Claims, 16 Drawing Sheets

(51) Int. Cl.

| | |
|---|---|
| ***B01J 37/02*** | (2006.01) |
| ***C07F 17/00*** | (2006.01) |
| ***C08F 4/659*** | (2006.01) |

(56) References Cited

U.S. PATENT DOCUMENTS

| | | | |
|---|---|---|---|
| 6,326,493 | B1 | 12/2001 | Mitani et al. |
| 9,079,985 | B2 | 7/2015 | Resconi et al. |
| 9,309,340 | B2 | 4/2016 | Ishihama et al. |
| 9,567,351 | B2 | 2/2017 | Hafner et al. |
| 9,598,517 | B2 | 3/2017 | Resconi et al. |
| 9,963,522 | B2 | 5/2018 | Suzuki et al. |
| 2005/0192418 | A1 | 9/2005 | Ewen et al. |
| 2018/0237565 | A1 | 8/2018 | Ishihama et al. |
| 2019/0283009 | A1 | 9/2019 | Holtcamp et al. |
| 2021/0095057 | A1 | 4/2021 | Resconi et al. |
| 2024/0287217 | A1 | 8/2024 | Castro et al. |
| 2024/0287224 | A1 | 8/2024 | Dou et al. |
| 2024/0294682 | A1 | 9/2024 | Castro et al. |

FOREIGN PATENT DOCUMENTS

| | | | |
|---|---|---|---|
| CN | 103649101 | A | 3/2014 |
| CN | 104870492 | A | 8/2015 |
| CN | 109996820 | A | 7/2019 |
| CN | 110483670 | A | 11/2019 |
| EP | 1587888 | B1 | 6/2006 |
| EP | 2285893 | B1 | 9/2011 |
| EP | 1828266 | B1 | 7/2015 |
| EP | 3438183 | A1 | 2/2019 |
| EP | 3431483 | B1 | 3/2021 |
| JP | H10287693 | A | 10/1998 |
| JP | 2013204015 | A | 10/2013 |
| JP | 2016183334 | A | 10/2016 |
| WO | 94/14856 | A1 | 7/1994 |
| WO | 95/12622 | A1 | 5/1995 |
| WO | 03/051934 | A2 | 6/2003 |
| WO | 2006/097497 | A1 | 9/2006 |
| WO | 2015141675 | A1 | 9/2015 |

OTHER PUBLICATIONS

International Search Report and Written Opinion mailed Nov. 12, 2021 in International Application No. PCT/EP2021/070763 (15 pages).

* cited by examiner

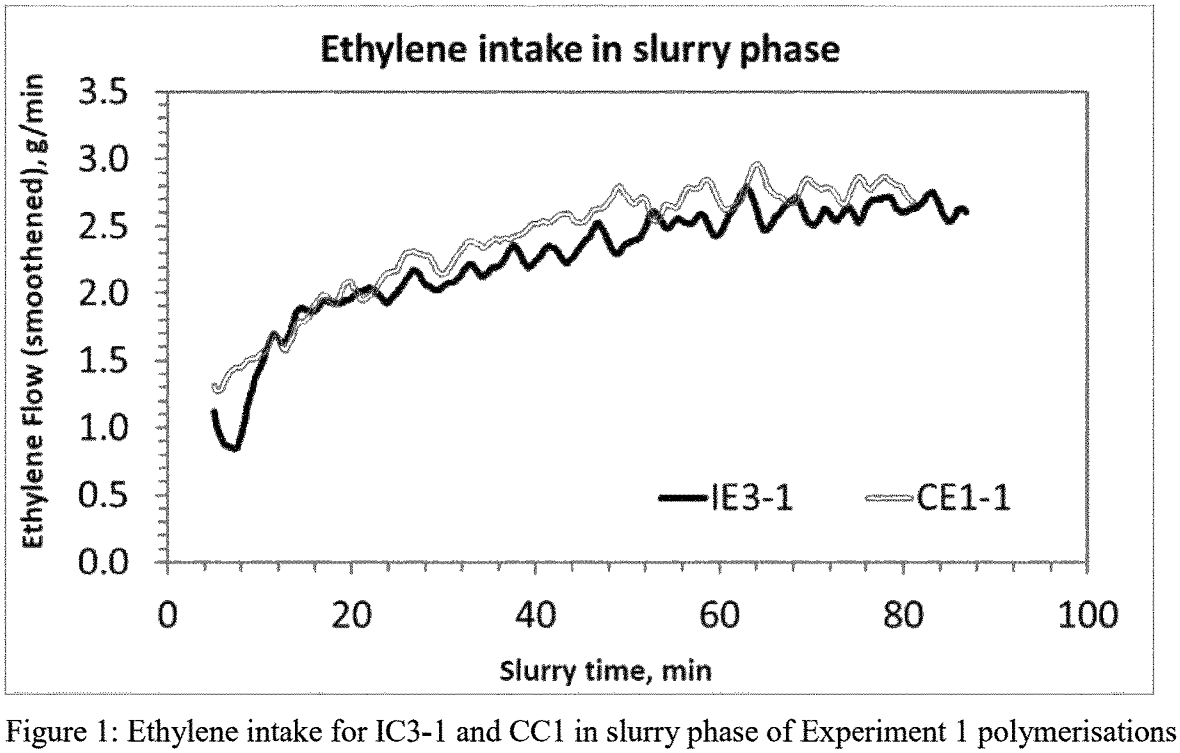
Figure 1: Ethylene intake for IC3-1 and CC1 in slurry phase of Experiment 1 polymerisations
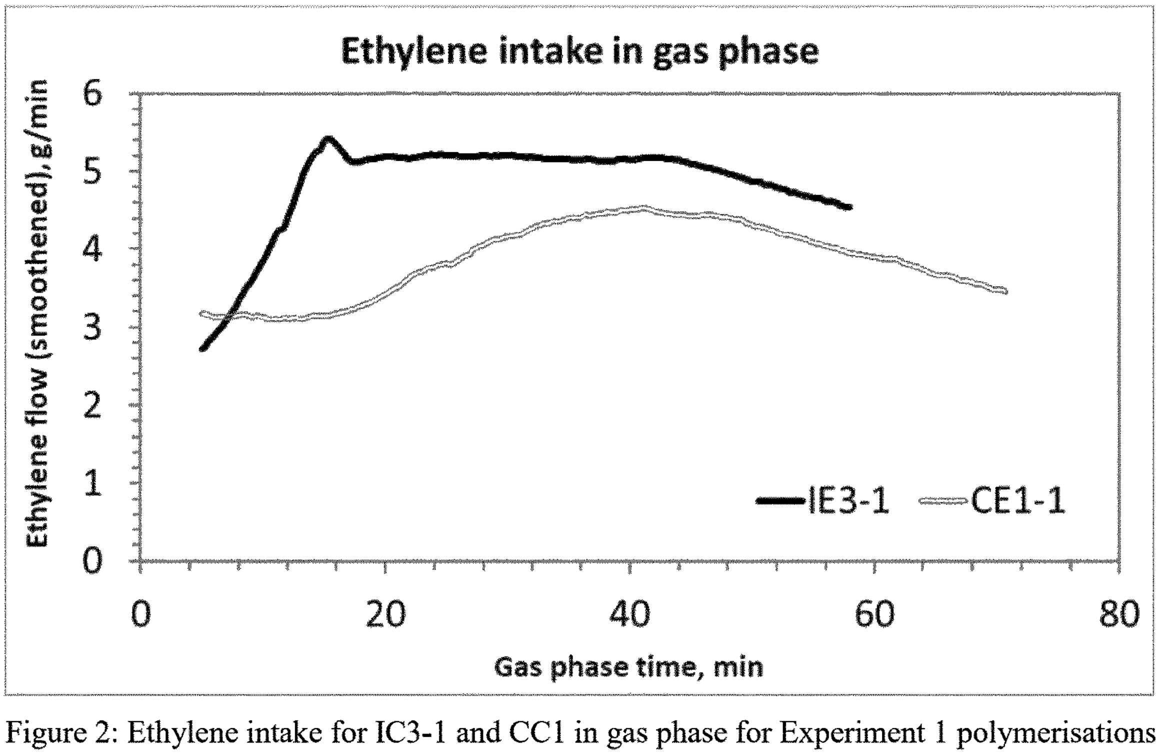
Figure 2: Ethylene intake for IC3-1 and CC1 in gas phase for Experiment 1 polymerisations

PROCESS FOR THE PREPARATION OF A MULTIMODAL POLYETHYLENE

This invention relates to a process for the preparation of a multimodal polyethylene polymer using a particular metallocene catalyst. The invention also concerns certain novel metallocene complexes and catalysts made therefrom. In particular, the catalyst of use in the process of the invention is one that can be prepared in a one-step or two-step catalyst preparation process.

BACKGROUND

In multi-stage polymerisations which are used for the preparation of multimodal polymers, different polymer components are produced continuously in each reactor. Typically, in a first reactor a lower molecular weight polymer fraction is prepared and in a subsequent reactor, a higher molecular weight polymer component is produced. Compositional control can also be applied to comonomer content, branching, comonomer type, etc.

The use of multiple reactors having different conditions (physical and chemical) creates stringent demands on the catalyst system employed as the same catalyst system is typically employed in all stages of the polymerisation. The catalyst is typically transferred from the first stage to the second stage and hence needs to function in all stages of the reaction. The catalyst needs to be stable for the entire duration of the multi-stage process. The catalyst needs to operate in the different conditions offered by, inter alia, slurry and gas phase polymerisations.

The catalyst must be capable of producing polymers of lower molecular weight, as well as higher molecular weight. The catalyst must perform well in ethylene homopolymerisation and/or polymerisations with low comonomer concentration, as well as in polymerisations with high comonomer concentration (see A. R. Albunia, F. Prades and D. Jeremic, Ed., Multimodal Polymers with Supported Catalysts, Springer 2019, ISBN 978-3-030-03474-0).

Typically, Ziegler-Natta catalysts have been used in multi-stage systems with very good results but these catalysts are not able to produce very specific polymer architecture. On the other hand, single site catalysts such as metallocenes are able to generate very controlled polymer structures. However, it has been very challenging to combine the benefits of single site catalysis with multi-stage processes because it is challenging to find metallocene catalysts that have the required properties, i.e.:

- the catalyst must have good kinetic stability as the catalyst has to polymerise for over several hours of average residence time under different reaction conditions,
- the catalyst must be able to produce polymers with lower and higher molecular weight in separate reactors;
- the catalyst must have high catalyst activity across all reactors.

The present inventors therefore sought a metallocene catalyst for multi-stage polymerisation that can provide multimodal polymers with, for example:

- high molecular weight;
- high comonomer incorporation;
- good catalyst activity; and
- ability to make lower and higher molecular weight components in a cascade (facilitated by hydrogen as a molecular weight regulator).

It is particularly preferred if the activity of the catalyst in the gas phase is high relative to the slurry phase, i.e. the ratio of the gas phase activity/slurry phase activity is high, e.g. 1.8 or more. It is highly preferred therefore if the activity of the catalyst in the gas phase is higher than the slurry phase, e.g. the ratio of the gas phase activity/slurry phase activity is 1.8 to 10, especially 2 to 8, more preferably 2.2 to 6.

Surprisingly, it has been now found that a certain bridged bis-cyclopentadienyl type complexes bearing heterocyclic substituents such as furanyl moieties, especially when supported on a carrier, offer the required features.

In particular, the complexes of the invention demonstrate higher activity with an advanced molecular weight capability combined with an extremely good comonomer incorporation capability. When $H_2$ is added in polymerization, it is possible to control $M_w$ while still keeping the good catalyst activity, polymer morphology and other key polymer properties. Capability of these inventive catalysts in Borstar multi-stage process setup is highly favoured due to more stable kinetic profiles in slurry phase, similar or higher activity in gas phase and, crucially, much higher gas phase to slurry phase activity ratio.

Some of the metallocene catalysts used herein are known. U.S. Pat. No. 6,326,493 describes certain furanyl containing metallocene catalysts but these are not used for the manufacture of multimodal polyethylene polymers. Whilst this reference discloses a large number of metallocenes catalysts, only the formation of unimodal polypropylene is exemplified.

JP 2016/183334 describes a multimodal polyethylene-based resin containing two multimodal polyethylene resins, (C) and (G). The multimodal polyethylenes are prepared in a multi-stage processes.

SUMMARY OF INVENTION

Thus viewed from one aspect the invention provides a process for the preparation of a multimodal polyethylene polymer comprising:

(I) polymerising ethylene and optionally at least one C4-10 alpha olefin comonomer in a first stage in the presence of a metallocene catalyst comprising:

(i) a complex of formula (I)

(I)

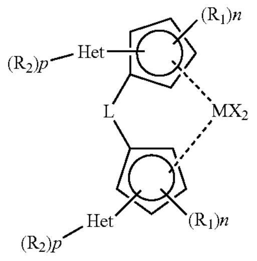

wherein each X is a sigma donor ligand;

each Het is independently a monocyclic or multicyclic heteroaromatic or heterocyclic group containing at least one heteroatom selected from O, N or S;

L is a carbon, silicon or germanium based divalent bridge in which one or two backbone atoms link the ligands;

M is Ti, Zr or Hf;

each $R_1$ is the same or different and is a $C_{1-10}$ alkyl group, $C_{1-10}$ alkoxy, benzyl, O-benzyl, phenyl group optionally substituted by 1 to 3 $C_{1-6}$ alkyl groups or O-phenyl group optionally substituted by 1 to 3 $C_{1-6}$ alkyl groups; and/or two adjacent $R^1$ groups taken together with the atoms to which they are bound form a further ring, e.g. so as to form an indenyl ring with the Cp ring, which further ring is optionally substituted by up to 4 groups $R_3$;

each $R_3$ is the same or different and is a $C_{1-10}$ alkyl group, $C_{1-10}$ alkoxy group, or phenyl group optionally substituted by 1 to 3 $C_{1-6}$ alkyl groups;

each n is 0 to 3;

each $R_2$ is the same or different and is a $C_{1-10}$ alkyl group, $C_{1-10}$ alkoxy group or —Si(R)$_3$ group;

each R is the same or different and is a $C_{1-10}$ alkyl or phenyl group optionally substituted by 1 to 3 $C_{1-6}$ alkyl groups; and each p is 0 to 3;

(ii) a cocatalyst which comprises a compound of a group 13 element; and optionally (iii) a support;

so as to form a first polyethylene component (e.g. a lower molecular weight component);

(II) polymerising ethylene and optionally at least one C4-10 alpha olefin comonomer in a second stage in the presence of the product of step (I) so as to form a second polyethylene component (e.g. a higher molecular weight component).

Viewed from another aspect the invention provides a process for the preparation of a multimodal polyethylene polymer comprising:

(I) polymerising ethylene and optionally at least one C4-10 alpha olefin comonomer in a first stage in the presence of a racemic metallocene catalyst comprising:

(i) a complex of formula (Ix)

(Ix)

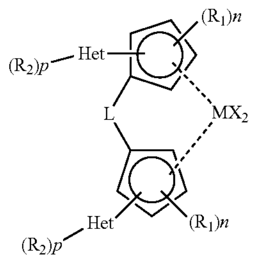

wherein each X is a sigma donor ligand;

each Het is independently a monocyclic or multicyclic heteroaromatic or heterocyclic group containing at least one heteroatom selected from O, N or S;

L is a carbon, silicon or germanium based divalent bridge in which one or two backbone atoms link the ligands;

M is Ti, Zr or Hf;

each $R_1$ is the same or different and is a linear $C_{1-10}$ alkyl group or linear $C_{1-10}$ alkoxy group;

each n is 0 to 3;

each $R_2$ is the same or different and is a $C_{1-10}$ alkyl group, $C_{1-10}$ alkoxy group or —Si(R)$_3$ group;

each R is the same or different and is a $C_{1-10}$ alkyl or phenyl group optionally substituted by 1 to 3 $C_{1-6}$ alkyl groups; and each p is 0 to 3;

(ii) a cocatalyst which comprises a compound of a group 13 element; and optionally (iii) a support;

so as to form a first polyethylene component (e.g. a lower molecular weight component);

(II) polymerising ethylene and optionally at least one C4-10 alpha olefin comonomer in a second stage in the presence of the product of step (I) so as to form a second polyethylene component (e.g. a higher molecular weight component).

Certain metallocene complexes are new and form a further aspect of the invention. Viewed from another aspect the invention provides a metallocene complex of formula (I')

(I')

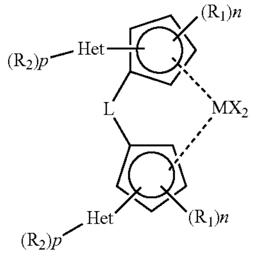

wherein each X is a sigma donor ligand;

L is a carbon, silicon or germanium based divalent bridge in which one or two backbone atoms link the ligands;

M is Ti, Zr or Hf;

each Het is independently a monocyclic or multicyclic heteroaromatic or heterocyclic group containing at least one heteroatom selected from O, N or S;

each $R_1$ is the same or different and is a $C_{1-10}$ alkyl group, $C_{1-10}$ alkoxy, benzyl, O-benzyl, phenyl group optionally substituted by 1 to 3 $C_{1-6}$ alkyl groups or O-phenyl group optionally substituted by 1 to 3 $C_{1-6}$ alkyl groups; and/or two adjacent $R^1$ groups taken together with the atoms to which they are bound form a further ring, e.g. so as to form an indenyl ring with the Cp ring, which further ring is optionally substituted by up to 4 groups $R_3$;

each $R_3$ is the same or different and is a $C_{1-10}$ alkyl group, $C_{1-10}$ alkoxy group, or phenyl group optionally substituted by 1 to 3 $C_{1-6}$ alkyl groups;

each n is 0 to 3;

each $R_2$ is the same or different and is a —Si(RaRbRc) group;

Ra is $C_{1-10}$ alkyl or phenyl group optionally substituted by 1 to 3 $C_{1-6}$ alkyl groups;

Rb is $C_{1-10}$ alkyl or phenyl group optionally substituted by 1 to 3 $C_{1-6}$ alkyl group Rc is a phenyl group optionally substituted by 1 to 3 $C_{1-6}$ alkyl group; and each p is 1 to 3.

Viewed from another aspect the invention provides a metallocene complex of formula (I")

(I")

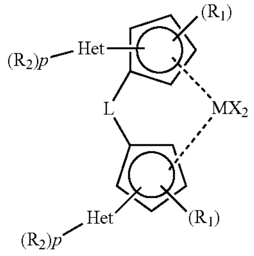

wherein each X is a sigma donor ligand;

each Het is independently a monocyclic or multicyclic heteroaromatic or heterocyclic group containing at least one heteroatom selected from O, N or S;

L is a carbon, silicon or germanium based divalent bridge in which one or two backbone atoms link the ligands;

M is Ti, Zr or Hf;

each $R_1$ is the same or different and is a branched $C_{3-10}$ alkyl group;

each $R_2$ is the same or different and is a $C_{1-10}$ alkyl group, $C_{1-10}$ alkoxy group or —$Si(R)_3$ group;

each R is the same or different and is $C_{1-10}$ alkyl or phenyl group optionally substituted by 1 to 3 $C_{1-6}$ alkyl groups; and each p is 0 to 3.

Viewed from another aspect the invention provides a racemic metallocene complex of formula (Ia)

(Ia)

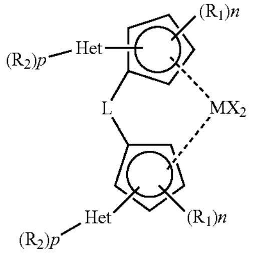

wherein each X is a sigma donor ligand;

each Het is independently a monocyclic or multicyclic heteroaromatic or heterocyclic group containing at least one heteroatom selected from O, N or S;

L is a (RdRe)Si group, (RdRe)Ge or $(RdRe)CH_2$;

Rd is a $C_{1-10}$ alkyl group, $C_{5-10}$-cycloalkyl, benzyl or phenyl;

Re is a $C_{2-10}$ alkenyl group;

M is Ti, Zr or Hf;

each $R_1$ is the same or different and is a linear $C_{1-10}$ alkyl group or a linear $C_{1-10}$ alkoxy;

each n is 0 to 3;

each $R_2$ is the same or different and is a $C_{1-10}$ alkyl group, $C_{1-10}$ alkoxy group or —$Si(R)_3$ group;

each R is the same or different and is a $C_{1-10}$ alkyl or phenyl group optionally substituted by 1 to 3 $C_{1-6}$ alkyl groups; and each p is 0 to 3.

Viewed from another aspect the invention provides a metallocene complex of formula (Ia')

(Ia')

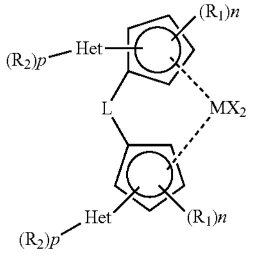

wherein each X is a sigma donor ligand;

each Het is independently a monocyclic or multicyclic heteroaromatic or heterocyclic group containing at least one heteroatom selected from O, N or S;

L is a (RdRe)Si group;

Rd is a $C_{1-10}$ alkyl group;

Re is a $C_{2-10}$ alkenyl group;

M is Ti, Zr or Hf;

each $R_1$ is the same or different and is a $C_{1-10}$ alkyl group, $C_{1-10}$ alkoxy, benzyl, O-benzyl, phenyl group optionally substituted by 1 to 3 $C_{1-6}$ alkyl groups or O-phenyl group optionally substituted by 1 to 3 $C_{1-6}$ alkyl groups; and/or two adjacent $R^1$ groups taken together with the atoms to which they are bound form a further ring, e.g. so as to form an indenyl ring with the Cp ring, which further ring is optionally substituted by up to 4 groups $R_3$;

each $R_3$ is the same or different and is a $C_{1-10}$ alkyl group, $C_{1-10}$ alkoxy group, or phenyl group optionally substituted by 1 to 3 $C_{1-6}$ alkyl groups;

each n is 0 to 3;

each $R_2$ is the same or different and is a $C_{1-10}$ alkyl group, $C_{1-10}$ alkoxy group or —$Si(R)_3$ group;

each R is the same or different and is $C_{1-10}$ alkyl or phenyl group optionally substituted by 1 to 3 $C_{1-6}$ alkyl groups; and each p is 0 to 3.

Viewed from another aspect the invention provides the use of a metallocene catalyst as hereinbefore defined to prepare a multimodal ethylene polymer in a process comprising a slurry phase step and a gas phase step.

Definitions

Throughout the description, the following definitions are employed.

The term "molecular weight" is used herein to refer to weight average molecular weight $M_w$ unless otherwise stated.

DETAILED DESCRIPTION OF THE INVENTION

This invention relates to a process for the preparation of a multimodal polyethylene polymer as well as certain new metallocene complexes and catalysts made therefrom.

Metallocene Complex

The metallocene catalyst complexes of use in the process of the invention can be either symmetrical or asymmetrical. By asymmetrical means simply that the two ligands forming the metallocene complex are different, that is, each ligand bears a set of substituents that are chemically different. The term symmetrical implies that the two ligands in the metallocene complex are the same, i.e. they bear the same substituent pattern.

The metallocene catalyst complexes of the invention can be meso or racemic or mixtures thereof. It is preferred however, if the metallocene catalyst complexes of the invention are chiral, racemic bridged biscyclopentadienyl metallocene complexes in their anti-configuration. The metallocene complexes may be C2-symmetric or C1-symmetric. When they are C1-symmetric they still maintain a pseudo-C2-symmetry since they maintain C2-symmetry in close proximity of the metal centre, although not at the ligand periphery. By nature of their chemistry, both a meso form and a racemic enantiomer pair (in case of C2-symmetric complexes) or anti and syn enantiomer pairs (in case of C1-symmetric complexes) are formed during the synthesis of the complexes. For the purpose of this invention, racemic-anti means that the two ligands are oriented in opposite directions with respect to the cyclopentadienyl-metal-cyclopentadienyl plane, while racemic-syn means that the two ligands are oriented in the same direction with respect to the cyclopentadienyl-metal-cyclopentadienyl plane.

Formulae herein, are intended to cover both syn- and anti-configurations unless otherwise stated. Preferred metallocene catalyst complexes are in the anti-configuration or are racemic.

The metallocene catalyst of the invention may contain, in addition to the racemic isomer, some meso or syn isomer. Due to the nature of the synthesis of the metallocene complexes, these might be produced as a mixture. There might be up to 60 mol % of meso isomer and hence a minimum of 40 mol % of the rac isomer in such a mixture.

It is however preferred if the content of the racemic isomer is 50 mol % or more, such as 60 mol % or more, especially 70 mol % or more, ideally 90 mol % or more based on the weight of the complex as a whole.

The metallocene catalyst complexes of the invention preferably contain a racemic-anti isomer. Ideally, therefore at least 95 mol %, such as at least 98 mol %, especially at least 99 mol % of the metallocene catalyst complex is in the racemic-anti isomeric form.

In the metallocene catalyst complexes of the invention, the following preferences apply. Complexes of invention may have the structure of formula (I):

(I)

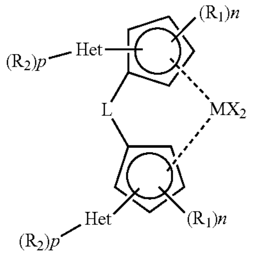

wherein each X is a sigma donor ligand;

each Het is independently a monocyclic or multicyclic heteroaromatic or heterocyclic group containing at least one heteroatom selected from O, N or S;

L is a carbon, silicon or germanium based divalent bridge in which one or two backbone atoms link the ligands;

M is Ti, Zr or Hf;

each $R_1$ is the same or different and is a $C_{1-10}$ alkyl group, $C_{1-10}$ alkoxy, benzyl, O-benzyl, phenyl group optionally substituted by 1 to 3 $C_{1-6}$ alkyl groups or O-phenyl group optionally substituted by 1 to 3 $C_{1-6}$ alkyl groups; and/or two adjacent $R^1$ groups taken together with the atoms to which they are bound form a further ring, e.g. so as to form an indenyl ring with the Cp ring, which further ring is optionally substituted by up to 4 groups $R_3$;

each $R_3$ is the same or different and is a $C_{1-10}$ alkyl group, $C_{1-10}$ alkoxy group, or phenyl group optionally substituted by 1 to 3 $C_{1-6}$ alkyl groups;

each n is 0 to 3;

each $R_2$ is the same or different and is a $C_{1-10}$ alkyl group, $C_{1-10}$ alkoxy group or —$Si(R)_3$ group;

each R is the same or different and is $C_{1-10}$ alkyl or phenyl group optionally substituted by 1 to 3 $C_{1-6}$ alkyl groups; and each p is 0 to 3.

The following preferred options apply to all general formulae herein.

M is preferably Zr or Hf, more preferably Zr.

Each X independently is a sigma-donor ligand. Thus each X may be the same or different, and is preferably a hydrogen atom, a halogen atom, a linear or branched, cyclic or acyclic $C_{1-20}$-alkyl or $C_{1-20}$-alkoxy group, a $C_{6-20}$-aryl group, a $C_{7-20}$-alkylaryl group or a $C_{7-20}$-arylalkyl group.

In one embodiment the X group may be trihydrocarbyl-silyl, $C_{1-10}$-alkoxy, $C_{1-10}$alkoxy-$C_{1-10}$-alkyl-, or amido group.

The term halogen includes fluoro, chloro, bromo and iodo groups, preferably chloro groups.

Amido groups of interest are —$NH_2$, —$NHC_{1-6}$ alkyl or —$N(C_{1-6}$ alkyl$)_2$.

More preferably, each X is independently a hydrogen atom, a halogen atom, a $C_{1-6}$-alkyl, $C_{1-6}$-alkoxy group, amido, phenyl or benzyl group.

Yet more preferably, each X is independently a halogen atom, a linear or branched $C_{1-4}$-alkyl or $C_{1-4}$-alkoxy group, a phenyl or benzyl group.

Most preferably, each X is independently chlorine, benzyl, cyclohexyl, or a methyl group.

Preferably, both X groups are the same.

The most preferred options for both X groups are two chlorides, two methyl or two benzyl groups.

L is a bridge based on carbon, silicon or germanium. There are one to two backbone linking atoms between the two ligands, e.g. a structure such as ligand-C-ligand (one backbone atom) or ligand-Si—Si-ligand (two backbone atoms).

The bridging atoms can carry other groups. For example, suitable bridging ligands L are selected from —$R'_2C$—, —$R'_2C$—$CR'_2$—, —$R'_2Si$—, —$R'_2Si$—$SiR'_2$—, —$R'_2Ge$—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring. In one embodiment R' can be an alkyl having 1 to 10 carbon atoms substituted with alkoxy having 1 to 10 carbon atoms.

The term heteroatoms belonging to groups 14-16 of the periodic table includes for example Si, N, O or S.

Preferably L is —$R'_2Si$—, ethylene or methylene.

In the formula —$R'_2Si$—, each R' is preferably independently a $C_1$-$C_{20}$-hydrocarbyl group. The term $C_{1-20}$-hydrocarbyl group therefore includes $C_{1-20}$-alkyl, $C_{2-20}$-alkenyl, $C_{2-20}$-alkynyl, $C_{3-20}$-cycloalkyl, $C_{3-20}$-cycloalkenyl, $C_{6-20}$-aryl groups, $C_{7-20}$-alkylaryl groups or $C_{7-20}$-arylalkyl groups or of course mixtures of these groups such as cycloalkyl substituted by alkyl. Unless otherwise stated, preferred $C_{1-20}$-hydrocarbyl groups are $C_{1-20}$-alkyl, $C_{1-20}$ alkenyl, $C_{4-20}$-cycloalkyl, $C_{5-20}$-cycloalkyl-alkyl groups, $C_{7-20}$-alkylaryl groups, $C_{7-20}$-arylalkyl groups or $C_{6-20}$-aryl groups.

In one embodiment the formula —$R'_2Si$—, represents silacycloalkanediyls, such as silacyclobutane, silacyclopentane, or 9-silafluorene.

In one embodiment L is (RdRe)Si and Rd is a $C_{1-10}$ alkyl group, $C_{5-10}$-cycloalkyl, benzyl or phenyl and Re is C2-10 alkenyl such as L is (RdRe)Si and Rd is a $C_{1-4}$ alkyl group, cyclohexyl, benzyl or phenyl and Re is C4-8 alkenyl. For the avoidance of doubt, in a (RdRe)Si group, the Rd and Re groups bind to the Si atom.

In one embodiment, each R' are different. It is preferred if one R' is a $C_{1-10}$ alkyl group, e.g. C1-4 alkyl group, especially methyl and one R' is a $C_{2-10}$ alkenyl group, e.g. C4 to 8 alkenyl group. It is preferred if the double bond is located at the terminal of the alkenyl group remote from the Si bridge. Most preferably the bridge is $=Si(CH_3)(—CH_2CH_2CH_2CH=CH_2)$.

Preferably, both R' groups are the same. It is preferred if R' is a $C_1$-$C_{10}$-hydrocarbyl, or an alkyl having 1 to 10 carbon atoms substituted with alkoxy having 1 to 10 carbon atoms. Preferred R' groups are methyl, ethyl, propyl, isopropyl, tert-butyl, isobutyl, $C_{2-10}$ alkenyl, $C_{3-8}$-cycloalkyl, cyclohexylmethyl, phenyl or benzyl, more preferably each R' are independently a $C_1$-$C_6$-alkyl, $C_{2-10}$ alkenyl, $C_{5-6}$-cycloalkyl or phenyl group, and most preferably both R' are methyl or one is methyl and the other is cyclohexyl. Most preferably the bridge is $—Si(CH_3)_2—$.

The Het groups can be the same or different, preferably the same. The Het group is a monocyclic or multicyclic heteroaromatic or heterocyclic group containing at least one heteroatom selected from O, N or S. If an N is present in a ring, depending on the structure of the ring, it may carry an H or $C_{1-6}$ alkyl group.

Preferably the Het group is monocyclic. Preferably the Het group is heteroaromatic. Preferably the Het group is a monocyclic heteroaromatic group. Preferably the Het group is a 5 or 6 membered heteroaromatic or heterocyclic ring structure.

Preferred Het groups include furanyl, tetrahydrofuranyl, thiophenyl, pyridyl, piperidinyl, or pyrrole.

It is preferred if there is one heteroatom in the Het ring. It is preferred if that heteroatom is O or S, preferably O. It is most preferred if Het is furanyl. It is preferred if the link to the cyclopentadienyl ring from the Het group is on a carbon adjacent to the heteroatom. It is preferred if the link to the Het ring from the Cp group is on a carbon adjacent to the linker L.

Each $R_1$ is the same or different and is a $C_{1-10}$ alkyl group, $C_{1-10}$ alkoxy, benzyl, O-benzyl (i.e. OBz), $C_{6-10}$ aryl, $OC_{6-10}$ aryl, phenyl group optionally substituted by 1 to 3 $C_{1-6}$ alkyl groups or O-Ph group optionally substituted by 1 to 3 $C_{1-6}$ alkyl groups;

and/or two adjacent $R_1$ groups taken together with the atoms to which they are bound form a further ring, e.g. so as to form an indenyl ring with the Cp ring, which further ring is optionally substituted by up to 4 groups $R_3$.

It is preferred however if no fused ring is present and hence the ligand comprises two cyclopentadienyl rings.

Each $R_1$ is preferably a $C_{1-6}$ alkyl group, $C_{1-6}$ alkoxy, benzyl, phenyl group optionally substituted by 1 to 3 $C_{1-6}$ alkyl groups.

More preferably $R_1$ is a $C_{1-6}$ alkyl group, such as a methyl, ethyl or tert-butyl group.

In one embodiment, $R_1$ is a linear $C_{1-6}$ alkyl group.

The subscript "n" is preferably 1 or 2, i.e. it is preferred if the ring is substituted. If n is 2 then it is preferred if $R_1$ is methyl. If n is 1 then it is preferred if $R_1$ is t-Bu.

If n=2 then the $R_1$ groups are preferably adjacent. If n=2 then the $R_1$ groups are preferably attached to a carbon adjacent the bridge L and the next carbon.

If n=1 then the $R_1$ group is preferably not adjacent to the linker L or the Het group.

Each $R_2$ is the same or different and is a $C_{1-10}$-alkyl group, $C_{1-10}$-alkoxy group or $—Si(R)_3$ group. It is preferred if $R_2$ is a $—Si(R)_3$ group.

Each R is independently a $C_{1-6}$ alkyl or phenyl group optionally substituted by 1 to 3 $C_{1-6}$ alkyl groups. Thus each R group can be the same or different.

R groups are preferably phenyl or $C_{1-4}$ alkyl, especially methyl or phenyl. In one embodiment one R is phenyl and the other R groups are $C_{1-4}$ alkyls such as methyl. In another embodiment, all R groups are $C_{1-4}$ alkyl groups. The use of $—SiPhMe_2$ or $SiMe_3$ is preferred.

It is preferred if p is 0 or 1, more preferably p=1.

If p is other than 0 then the $R_2$ substituent is preferably on a carbon adjacent the heteroatom. It is preferred if the $R_2$ group does not bind to the same carbon atom as the link to the Cp ring. If the Het group is furanyl then it is preferred if the Het ring is linked to the Cp ring and the Het group (if present) via the two carbons adjacent the O.

The complex of use in the invention is preferably of formula (II):

(II)

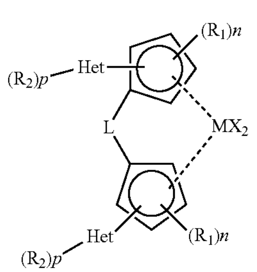

wherein each X is independently a hydrogen atom, a halogen atom, a $C_{1-6}$-alkyl, $C_{1-6}$-alkoxy group, amido, phenyl or benzyl group.;

each Het is independently a monocyclic or multicyclic heteroaromatic or heterocyclic group containing at least one heteroatom selected from O, N or S;

L is $—R'_2C—$, or $—R'_2Si—$, wherein each R' is independently $C_{1-20}$ hydrocarbyl or $C_{1-10}$ alkyl substituted with alkoxy having 1 to 10 carbon atoms;

M is Ti, Zr or Hf;

each $R_1$ is the same or different and is a $C_{1-10}$ alkyl group, $C_{1-10}$ alkoxy, benzyl, O-benzyl, phenyl group optionally substituted by 1 to 3 $C_{1-6}$ alkyl groups or O-phenyl group optionally substituted by 1 to 3 $C_{1-6}$ alkyl groups; and/or two adjacent $R^1$ groups taken together with the atoms to which they are bound form a further ring, e.g. so as to form an indenyl ring with the Cp ring, which further ring is optionally substituted by up to 4 groups $R_3$;

each $R_3$ is the same or different and is a $C_{1-6}$ alkyl group, $C_{1-6}$ alkoxy group, or phenyl group optionally substituted by 1 to 3 $C_{1-6}$ alkyl groups;

each n is 0 to 3;

each $R_2$ is the same or different and is a $C_{1-10}$ alkyl group, $C_{1-10}$ alkoxy group or $—Si(R)_3$ group;

each R is the same or different and is $C_{1-10}$ alkyl or a phenyl group optionally substituted by 1 to 3 $C_{1-6}$ alkyl groups; and each p is 0 to 3.

Ideally in formula (II), $R_1$ is a linear $C_{1-6}$ alkyl group.

The complex of use in the invention is preferably of formula (III):

(III)

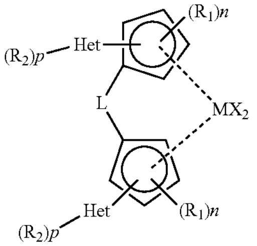

wherein each X is independently a hydrogen atom, a halogen atom, a $C_{1-6}$-alkyl, $C_{1-6}$-alkoxy group, amido, phenyl or benzyl group.;

each Het is independently a monocyclic or multicyclic heteroaromatic or heterocyclic group containing at least one heteroatom selected from O, N or S;

L is —R'$_2$C—, or —R'$_2$Si—, wherein each R' is independently $C_{1-20}$ hydrocarbyl or $C_{1-10}$ alkyl substituted with alkoxy having 1 to 10 carbon atoms;

M is Ti, Zr or Hf;

each $R_1$ is the same or different and is a $C_{1-10}$ alkyl group, $C_{1-10}$ alkoxy, benzyl, O-benzyl, phenyl group optionally substituted by 1 to 3 $C_{1-6}$ alkyl groups or O-phenyl group optionally substituted by 1 to 3 $C_{1-6}$ alkyl groups;

each n is 0 to 3;

each $R_2$ is the same or different and is a $C_{1-6}$ alkyl group, $C_{1-6}$ alkoxy group or —Si(R)$_3$ group;

each R is the same or different and is $C_{1-6}$ alkyl or a phenyl group optionally substituted by 1 to 3 $C_{1-6}$ alkyl groups; and each p is 0 to 3.

Ideally in formula (III), $R_1$ is a linear $C_{1-6}$ alkyl group.

The complex of use in the invention is preferably of formula (IV):

(IV)

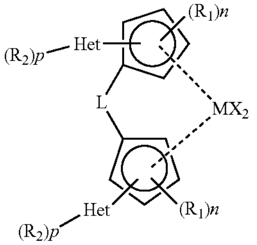

wherein each X is independently a hydrogen atom, a halogen atom, a $C_{1-6}$-alkyl, $C_{1-6}$-alkoxy group, amido, phenyl or benzyl group.;

each Het is independently a monocyclic heteroaromatic group containing at least one heteroatom selected from O, N or S;

L is —R'$_2$C—, or —R'$_2$Si—, wherein each R' is independently C1-20 hydrocarbyl or $C_{1-10}$ alkyl substituted with alkoxy having 1 to 10 carbon atoms;

M is Ti, Zr or Hf;

each $R_1$ is the same or different and is a $C_{1-6}$ alkyl group, or $C_{1-6}$ alkoxy group;

each n is 0 to 3;

each $R_2$ is the same or different and is a $C_{1-6}$ alkyl group, $C_{1-6}$ alkoxy group or —Si(R)$_3$ group;

each R is independently $C_{1-6}$ alkyl or a phenyl group optionally substituted by 1 to 3 $C_{1-6}$ alkyl groups; and each p is 0 to 3.

Ideally in formula (IV), $R_1$ is a linear $C_{1-6}$ alkyl group.

The complex of use in the invention is preferably of formula (V):

(V)

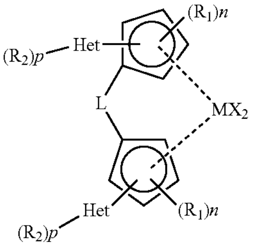

wherein each X is independently a hydrogen atom, a halogen atom, a $C_{1-6}$-alkyl, $C_{1-6}$-alkoxy group, amido, phenyl or benzyl group;

each Het is independently a monocyclic heteroaromatic or heterocyclic group containing at least one heteroatom selected from O or S;

L is —R'$_2$Si—, wherein each R' is independently $C_{1-20}$ hydrocarbyl or $C_{1-10}$ alkyl substituted with alkoxy having 1 to 10 carbon atoms;

M is Ti, Zr or Hf;

each $R_1$ is the same or different and is a $C_{1-6}$ alkyl group or $C_{1-6}$ alkoxy group;

each n is 1 to 2;

each $R_2$ is the same or different and is a $C_{1-6}$ alkyl group, $C_{1-6}$ alkoxy group or —Si(R)$_3$ group;

each R is the same or different and is $C_{1-10}$ alkyl or phenyl group optionally substituted by 1 to 3 $C_{1-6}$ alkyl groups; and each p is 0 to 1.

Ideally in formula (V), $R_1$ is a linear $C_{1-6}$ alkyl group.

The complex of use in the invention is preferably of formula (VI):

(VI)

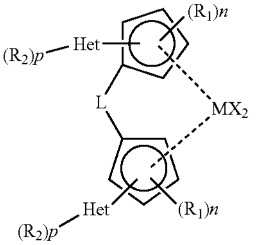

wherein each X is independently a hydrogen atom, a halogen atom, a $C_{1-6}$-alkyl, $C_{1-6}$-alkoxy group, amido, phenyl or benzyl group.;

each Het is independently a monocyclic heteroaromatic or heterocyclic group containing at least one heteroatom selected from O or S;

L is —R'$_2$Si—, wherein each R' is independently C1-10 alkyl, C3-8 cycloalkyl or C2-10 alkenyl;

M is Ti, Zr or Hf;

each $R_1$ is the same or different and is a $C_{1-6}$ alkyl group;

each n is 1 to 2;

each $R_2$ is the same or different and is a —Si(R)$_3$ group;

each R is the same or different and is $C_{1-10}$ alkyl or phenyl group optionally substituted by 1 to 3 $C_{1-6}$ alkyl groups; and each p is 0 to 1.

Ideally in formula (VI), $R_1$ is a linear $C_{1-6}$ alkyl group.

The complex of use in the invention is preferably of formula (VII)

(VII)

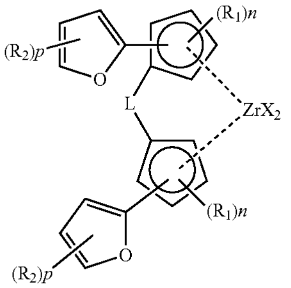

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

each $R_1$ is the same or different and is a $C_{1-6}$ alkyl group;

each n is 0 to 3;

each $R_2$ is the same or different and is a $C_{1-6}$ alkyl group or —$Si(R)_3$ group;

each R is the same or different and is $C_{1-10}$ alkyl or phenyl group optionally substituted by 1 to 3 $C_{1-6}$ alkyl groups; and each p is 0 to 3.

Ideally in formula (VII), $R_1$ is a linear $C_{1-6}$ alkyl group.

The complex of use in the invention is preferably of formula (VIII)

(VIII)

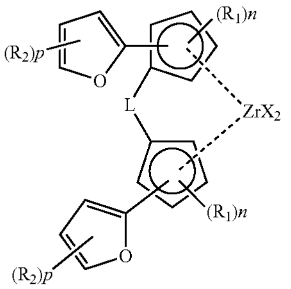

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

each $R_1$ is the same or different and is a $C_{1-6}$ alkyl group;

each n is 1 to 2;

$R_2$ is a —$Si(R)_3$ alkyl group;

each R is the same or different and is $C_{1-10}$ alkyl or phenyl group optionally substituted by 1 to 3 $C_{1-6}$ alkyl groups;

each p is 1.

Ideally in formula (VIII), $R_1$ is a linear $C_{1-6}$ alkyl group.

The complex of use in the invention is preferably of formula (IX)

(IX)

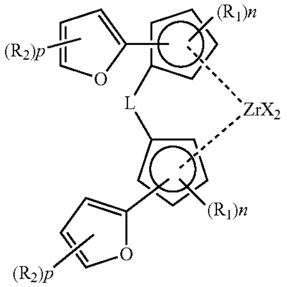

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a $Me_2Si$— or $(Me)C_{2-10}$-alkenylSi;

each $R_1$ is the same or different and is a $C_{1-6}$ alkyl group, e.g. methyl or t-Bu;

each n is 1 to 2;

$R_2$ is a —$Si(R)_3$ alkyl group;

each R is the same or different and is $C_{1-6}$ alkyl or phenyl group;

each p is 1; such as of formula (IX')

(IX')

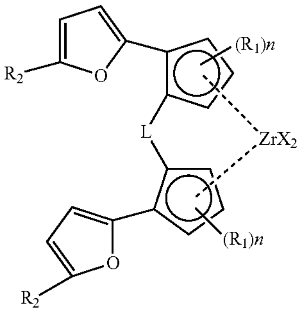

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a $Me_2Si$— or $(Me)C_{2-10}$-alkenylSi;

each $R_1$ is the same or different and is a $C_{1-6}$ alkyl group, e.g. methyl or t-Bu;

each n is 1 to 2;

$R_2$ is a —$Si(R)_3$ alkyl group;

each R is the same or different and is $C_{1-6}$ alkyl or phenyl group.

Ideally in formula (XI or XI'), $R_1$ is a linear $C_{1-6}$ alkyl group.

Certain complexes are new as previously mentioned. Preferred novel complexes are those of formula (X)

(X)

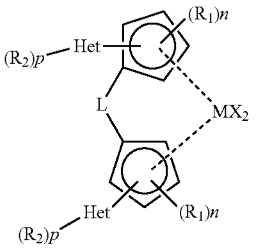

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

M is Ti, Zr or Hf;

each Het is independently a monocyclic heteroaromatic or heterocyclic group containing at least one heteroatom selected from O, N or S;

each $R_1$ is the same or different and is a $C_{1-10}$ alkyl group;

each n is 1 to 3;

each $R_2$ is the same or different and is a —Si(RaRbRc) group;

Ra is $C_{1-6}$ alkyl;

Rb is $C_{1-6}$ alkyl;

Rc is a phenyl group optionally substituted by 1 to 3 $C_{1-6}$ alkyl group; and each p is 1 to 3; such as of formula (X')

(X')

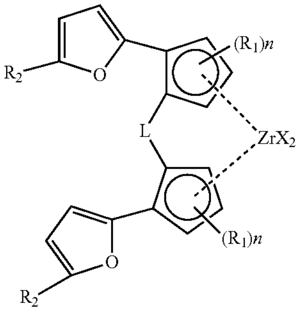

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

each $R_1$ is the same or different and is a $C_{1-10}$ alkyl group;

each n is 1 to 3;

each $R_2$ is the same or different and is a —Si(RaRbRc) group;

Ra is $C_{1-6}$ alkyl;

Rb is $C_{1-6}$ alkyl;

Rc is a phenyl group optionally substituted by 1 to 3 $C_{1-6}$ alkyl group.

Ideally in formula (X or X'), $R_1$ is a linear $C_{1-6}$ alkyl group.

More preferred novel complexes are those of formula (XI)

(XI)

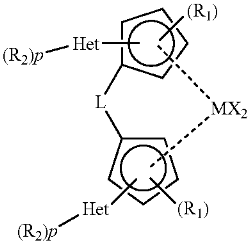

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

each Het is independently a monocyclic heteroaromatic group containing at least one heteroatom selected from O, N or S;

M is Ti, Zr or Hf;

each $R_1$ is the same or different and is a branched $C_{3-10}$ alkyl group;

each $R_2$ is the same or different and is a —$Si(R)_3$ group;

each R is the same or different and is $C_{1-10}$ alkyl or phenyl group optionally substituted by 1 to 3 $C_{1-6}$ alkyl groups; and each p is 1, such as of formula (XI')

(XI')

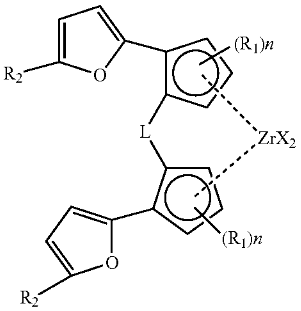

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a carbon, silicon or germanium based divalent bridge in which one or two backbone atoms link the ligands such as —$R'_2Si$—, wherein each R' is independently $C_{1-20}$ hydrocarbyl or $C_{1-10}$ alkyl substituted with alkoxy having 1 to 10 carbon atoms;

each $R_1$ is the same or different and is a branched $C_{3-10}$ alkyl group;

each $R_2$ is the same or different and is a —$Si(R)_3$ group;

each R is the same or different and is $C_{1-10}$ alkyl or phenyl group optionally substituted by 1 to 3 $C_{1-6}$ alkyl groups.

Even more preferred novel complexes are those of formula (XII)

(XII)

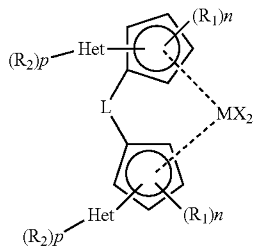

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

each Het is independently a monocyclic heteroaromatic group containing at least one heteroatom selected from O, N or S;

L is a (RdRe)Si group;

Rd is a $C_{1-10}$ alkyl group;

Re is a $C_{2-10}$ alkenyl group;

M is Ti, Zr or Hf;

each $R_1$ is the same or different and is a $C_{1-10}$ alkyl group;

each n is 1 to 3;

each $R_2$ is the same or different and is a —$Si(R)_3$ group;

each R is $C_{1-10}$ alkyl or phenyl group optionally substituted by 1 to 3 $C_{1-6}$ alkyl groups; and each p is 0 to 3, such as of formula (XII')

(XII')

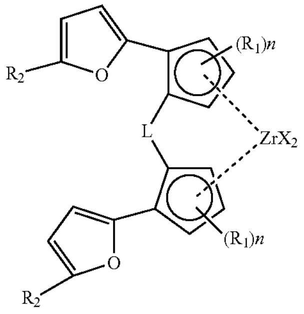

wherein each X is a sigma donor ligand such as wherein each X is independently a hydrogen atom, a halogen atom, a $C_{1-6}$-alkyl, $C_{1-6}$-alkoxy group, amido, phenyl or benzyl group;

L is a (RdRe)Si group;

Rd is a $C_{1-10}$ alkyl group;

Re is a $C_{2-10}$ alkenyl group;

each $R_1$ is the same or different and is a $C_{1-10}$ alkyl group;

each n is 1 to 3;

each $R_2$ is the same or different and is a —$Si(R)_3$ group;

each R is $C_{1-10}$ alkyl or phenyl group optionally substituted by 1 to 3 $C_{1-6}$ alkyl groups.

Ideally in formula (XII or XII'), $R_1$ is a linear $C_{1-6}$ alkyl group.

Highly preferred complexes are

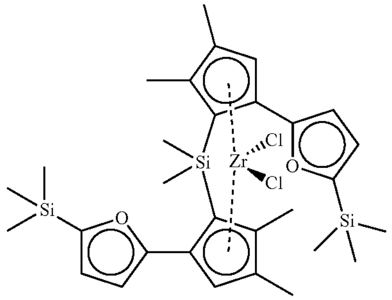

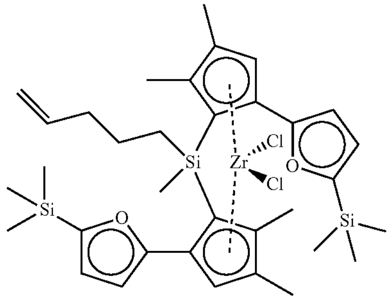

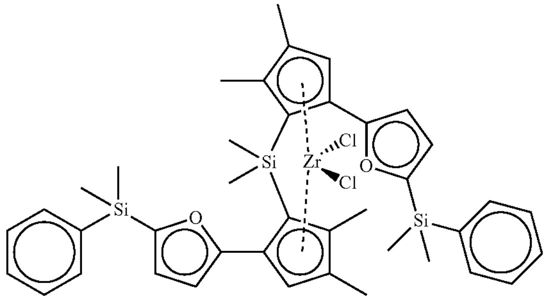

Cocatalyst

To form an active catalytic species it is normally necessary to employ a cocatalyst as is well known in the art.

According to the present invention, a cocatalyst comprising a group 13 element is required such as a boron-containing cocatalyst or an Al containing cocatalyst. The use of an aluminoxane cocatalyst in combination with the above defined metallocene catalyst complexes is most preferred.

The aluminoxane cocatalyst can be one of formula (A):

(A)

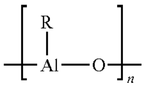

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (A).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

A boron-containing cocatalyst may also be used, optionally in combination with the aluminoxane cocatalyst. Boron-containing cocatalysts of interest include those of formula (B)

$$BY_3 \quad (B)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl) phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate.

These compounds generally contain an anion of formula (C):

$$(Z)_4B^- \quad (C)$$

where Z is an optionally substituted phenyl derivative, said substituent being a halo-$C_{1-6}$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate.

Suitable cationic counter-ions include triphenylcarbenium and are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:

tributylammoniumtetrakis(pentafluorophenyl)borate,
tributylammoniumtetrakis(trifluoromethylphenyl)borate,
tributylammoniumtetrakis(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylaniliniumtetrakis(pentafluorophenyl)borate, N,N-dimethylcyclohexylammoniumtetrakis(pentafluorophenyl)borate or N,N-dimethylbenzylammoniumtetrakis(pentafluorophenyl) borate.

Preferred borates of use in the invention therefore comprise the trityl, i.e. triphenylcarbenium ion. Thus, the use of $Ph_3CB(PhF_5)_4$ and analogues therefore are especially favoured.

Suitable amounts of cocatalyst will be well known to the person skilled in the art.

Preferably, the amount of cocatalyst is chosen to reach below defined molar ratios.

The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Catalyst System

The metallocene complex as described above is used in combination with a suitable cocatalyst combination as described above.

It is possible to use the catalyst system of the invention in solid but unsupported form following the protocols in WO03/051934. The catalyst system of the invention is preferably used in solid supported form. The particulate support material used is preferably an inorganic porous support such as a silica, alumina or a mixed oxide such as silica-alumina, in particular silica.

The use of a silica support is preferred.

Especially preferably, the support is a porous material so that the complex may be loaded into the pores of the particulate support, e.g. using a process analogous to those described in WO94/14856, WO95/12622, WO2006/097497 and EP1828266.

The average particle size of the support such as silica support can be typically from 10 to 100 µm.

The average pore size of the support such as silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The catalyst can contain from 5 to 500 µmol, such as 10 to 100 µmol of transition metal per gram of support such as silica, and 3 to 15 mmol of Al per gram of support such as silica.

One-Step Catalyst Preparation

In order to prepare a catalyst of use in the invention, the metallocene complex, cocatalyst and the support need to be combined. In a preferred embodiment, the process for combining all these components occurs in a single step.

It is therefore preferred if a solution is prepared at temperatures ranging from −20 to 75° C., preferably at 10 to 60° C., in which the metallocene complex and cocatalyst(s) are combined in a solvent, usually under an inert atmosphere with pre-contact times ranging from merely minutes to a few days. Preferred solvents are hydrocarbons such as toluene and xylene.

The obtained solution is then added to the support, such as a silica support.

Preferably, a "dry mixing" or "pore filling" or "incipient wetness" impregnation method is used where the total volume of the impregnated solution is close to (e.g. in the range of just below to just above) the pore volume of the dry support.

It is possible that the impregnated liquid volume is well above the pore volume of the support such that at the end of the liquid addition to the dry support, the mixture represents a mud or a suspension. This is less preferred.

It is also possible to initially suspend the support in suitable hydrocarbon solvents before impregnation solution addition but again, this is less preferred.

The resulting crude catalyst is then gently mixed and may be left to stand before drying. Washing steps can be used, if required.

The solution of metallocene complex and cocatalyst is preferably added dropwise to the support. The contacting step occurs at a temperature of −20 to 60° C., ideally at a temperature of 10 to 30° C. This step is often exothermic.

Thus viewed from one aspect the invention provides a process for the preparation of a multimodal polyethylene polymer comprising:

(I) contacting a solid support with a solution of a cocatalyst comprising a compound of a group 13 element and a racemic metallocene complex of formula (Ix)

(Ix)

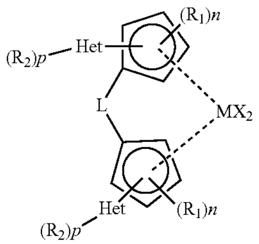

wherein each X is a sigma donor ligand;

each Het is independently a monocyclic or multicyclic heteroaromatic or heterocyclic group containing at least one heteroatom selected from O, N or S;

L is a carbon, silicon or germanium based divalent bridge in which one or two backbone atoms link the ligands;

M is Ti, Zr or Hf;

each $R_1$ is the same or different and is a linear $C_{1-10}$ alkyl group, or linear $C_{1-10}$ alkoxy, each n is 0 to 3;

each $R_2$ is the same or different and is a $C_{1-10}$ alkyl group, $C_{1-10}$ alkoxy group or —$Si(R)_3$ group;

each R is the same or different and is $C_{1-10}$ alkyl or phenyl group optionally substituted by 1 to 3 $C_{1-6}$ alkyl groups; and each p is 0 to 3;

so as to form a supported catalyst;

(II) polymerising ethylene and optionally at least one C4-10 alpha olefin comonomer in a first stage in the presence of said supported catalyst so as to form a first polyethylene component (e.g. a lower molecular weight component);

(III) polymerising ethylene and optionally at least one C4-10 alpha olefin comonomer in a second stage in the presence of the product of step (I) so as to form a second polyethylene component (e.g. a higher molecular weight component).

When the supported catalyst is prepared in this one-step process, we have found that certain surprising technical effects are observed.

- Activity of the preferred furyl-substituted metallocene catalysts is up to double in slurry phase and up to five times higher in gas phase compared to classic unbridged bis-Cp metallocene catalysts (prepared in the same manner) such as based on Bis(1-methyl-3-n-butylcyclopentadienyl)zirconium dichloride.
- Activity in gas phase of these inventive catalysts is high.
- Co-monomer response of the preferred furyl-substituted metallocene catalysts is significantly higher compared to classic unbridged bis-Cp metallocene catalysts (regardless of catalyst preparation method) such as based on Bis(1-methyl-3-n-butylcyclopentadienyl)zirconium dichloride.
- Molecular weight capability of the preferred furyl-substituted metallocene catalysts is much higher.
- Regulation of MFR with Hydrogen is effected without significant loss of catalyst activity
- Polymer particle morphology is excellent (good bulk density of polymer)
- Significantly lower density of polymer
- Stable slurry phase kinetic profiles, suitable for a multistage process
- Relatively low long chain branching levels in copolymer.

Key here is the combination of comonomer sensitivity, molecular weight capability and greater overall multi-stage polymerisation activity with, crucially, higher gas phase to slurry phase activity ratio.

Two-Step Catalyst Preparation

In a second embodiment, the contact between the support, metallocene complex and the cocatalyst takes place in a stepwise manner. In a first step, the support, such as silica support, is contacted with the cocatalyst. Typically therefore, a solution of the cocatalyst in a solvent is brought into contact with the support suspended in a solvent. Solvents of interest are again hydrocarbon solvents such as toluene and xylene. The temperature at which this contact step is carried out is ideally room temperature or lower, e.g. −10 to 25° C. Any step might be effected under an inert atmosphere.

Once the cocatalyst has been allowed to impregnate the support (e.g. after stirring the mixture for a period) the system is preferably heated to at least 70° C. whilst the impregnation process continues, such as 70 to 120° C. It is of course possible however, to carry out impregnation at any temperature, such as ambient temperature.

Once impregnation is complete, the system is then allowed to settle (preferably still at the elevated temperature) and the supernatant is removed.

The impregnated support can then be washed with more solvent, ideally at elevated temperature once more, before solvent is removed. Washing steps can be repeated, perhaps with each washing step effected at a lower temperature than the previous step, before drying.

The resulting dry impregnated support (from here on also activated support, e.g. $SiO_2$/MAO) is then brought into contact with the metallocene complex. This is conveniently provided as a solution, ideally in the same solvent that was used in the manufacture of the impregnated support. The metallocene complex is allowed to impregnate the support before the solvent is removed to leave a dry catalyst.

In either step of the two-step process, it is possible that a "dry mixing" or "pore filling" or "incipient wetness" impregnation method is used where the total volume of the impregnated solution is close to (e.g. in the range of just below to just above) the pore volume of the dry support or dry activated support. It is especially preferred that this "dry mixing" is used in the second step of the two-step catalyst preparation process.

In the second step of the two-step catalyst preparation, it is possible that the impregnated liquid volume is well above the pore volume of the dry activated support such that at the end of the liquid addition step, the mixture represents a mud or a suspension. This is less preferred.

In the second step of the two-step catalyst preparation, where an activated support is used, it is also possible to initially suspend the support in suitable hydrocarbon solvents before impregnation solution addition but again, this is less preferred.

Washing steps can again be employed. This second step might take place at a temperature of −10-90° C., preferably at 20-60° C.

Thus viewed from one aspect the invention provides a process for the preparation of a multimodal polyethylene polymer comprising:

(I) contacting a solid support with a solution of a cocatalyst comprising a compound of a group 13 element; so as to form a cocatalyst impregnated support;

(II) contacting said cocatalyst impregnated support with a racemic metallocene complex of formula (Ix)

(Ix)

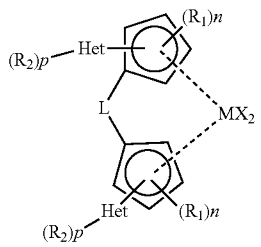

wherein each X is a sigma donor ligand;

each Het is independently a monocyclic or multicyclic heteroaromatic or heterocyclic group containing at least one heteroatom selected from O, N or S;

L is a carbon, silicon or germanium based divalent bridge in which one or two backbone atoms link the ligands;

M is Ti, Zr or Hf;

each $R_1$ is the same or different and is a linear $C_{1-10}$ alkyl group, or linear $C_{1-10}$ alkoxy, each n is 0 to 3;

each $R_2$ is the same or different and is a $C_{1-10}$ alkyl group, $C_{1-10}$ alkoxy group or $-Si(R)_3$ group;

each R is the same or different and is $C_{1-10}$ alkyl or phenyl group optionally substituted by 1 to 3 $C_{1-6}$ alkyl groups; and each p is 0 to 3;

so as to form a supported catalyst;

(III) polymerising ethylene and optionally at least one C4-10 alpha olefin comonomer in a first stage in the presence of said supported catalyst so as to form a first polyethylene component (e.g. a lower molecular weight component);

(IV) polymerising ethylene and optionally at least one C4-10 alpha olefin comonomer in a second stage in the presence of the product of step (I) so as to form a second polyethylene component (e.g. a higher molecular weight component).

When the supported catalyst is prepared in this significantly different two-step process, we have found that certain surprising technical effects are observed:

Activity is in some cases double in slurry phase and up to five times higher in gas phase compared to classic unbridged bis-Cp metallocene catalysts (prepared in the same manner) such as based on Bis(1-methyl-3-n-butylcyclopentadienyl)zirconium dichloride.

Activity in gas phase of these inventive catalysts is high.

Co-monomer response is significantly higher compared to classic unbridged bis-Cp metallocene catalysts (regardless of catalyst preparation method) such as based on Bis(1-methyl-3-n-butylcyclopentadienyl)zirconium dichloride.

Molecular weight capability of the inventive catalysts is much higher.

It is possible to regulate molecular weight with Hydrogen without significant loss of activity.

Polymer particle morphology is excellent.

The process enables the preparation of lower density polymers.

Stable slurry phase kinetic profiles suitable for multi-stage processes

Relatively low long chain branching in copolymer.

Key here is the combination of comonomer sensitivity, molecular weight capability and greater overall multi-stage polymerisation activity with, crucially, higher gas phase to slurry phase activity ratio.

Multimodal Polyethylene Polymer

The present invention concerns the preparation of a multimodal polyethylene homopolymer or copolymer. The density of the multimodal ethylene homopolymer or copolymer may be between 900 and 980 kg/$m^3$.

It is preferred if the multimodal polyethylene polymer is a copolymer. More preferably, the multimodal polyethylene copolymer is an LLDPE. It may have a density of 905 to 940 kg/$m^3$, preferably 910 to 935 kg/$m^3$, more preferably 915 to 930 kg/$m^3$, especially of 916 to 928 kg/$m^3$. In one embodiment a range of 910 to 928 kg/$m^3$ is preferred. The term LLDPE means linear low density polyethylene herein. The LLDPE of use in this invention is multimodal.

The term "multimodal" includes polymers that are multimodal with respect to MFR and includes also therefore bimodal polymers. The term "multimodal" may also mean multimodality with respect to the "comonomer distribution".

Usually, a polymer comprising at least two polyethylene fractions, which have been produced under different polymerisation conditions resulting in different (weight average) molecular weights and molecular weight distributions for the fractions, is referred to as "multimodal". The prefix "multi" relates to the number of different polymer fractions present in the polymer. Thus, for example, the term multimodal polymer includes so called "bimodal" polymers consisting of two fractions. The form of the molecular weight distribution curve, i.e. the appearance of the graph of the polymer weight fraction as a function of its molecular weight, of a multimodal polymer, e.g. LLDPE, may show two or more maxima or at least be distinctly broadened in comparison with the curves for the individual fractions. Often the final MWD curve will be broad, skewered or displaying a shoulder.

Ideally, the molecular weight distribution curve for multimodal polymers of the invention will show two distinct maxima. Alternatively, the polymer fractions have similar MFR and are bimodal in the comonomer content. A polymer comprising at least two polyethylene fractions, which have been produced under different polymerisation conditions resulting in different comonomer content for the fractions, is also referred to as "multimodal".

For example, if a polymer is produced in a sequential multi-stage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In any multimodal polymer, there may be a lower molecular weight component (LMW) and a higher molecular weight component (HMW). The LMW component has a lower molecular weight than the higher molecular weight component. This difference is preferably at least 5000 g/mol.

The multimodal polyethylene polymer of use in the invention preferably comprises at least one C4-10-comonomer. Comonomers may be present in the HMW component (or second component) or the LMW component (or first component) or both. From hereon, the term LMW/HMW component will be used but the described embodiments apply to the first and second components respectively.

It is preferred if the HMW component comprises at least one C4-10-comonomer. The LMW component may then be an ethylene homopolymer or may also comprise at least one C4-10-comonomer. In one embodiment, the multimodal polyethylene polymer contains a single comonomer. In a preferred embodiment, the multimodal polyethylene polymer comprises at least two, e.g. exactly two, C4-10 comonomers.

In one embodiment, the multimodal polyethylene polymer is a terpolymer and comprises at least two C4-10-comonomers. In that scenario, the HMW component may be a copolymer component or terpolymer component and the lower molecular weight (LMW) component can be an ethylene homopolymer component or copolymer component. Alternatively, both LMW and HMW components can be copolymers such that at least two C4-10-comonomers are present.

The multimodal polyethylene polymer may therefore be one in which the HMW component comprises repeat units deriving from ethylene and at least two other C4-10 alpha olefin monomers such as 1-butene and one $C_{6-10}$ alpha olefin monomer. Ethylene preferably forms the majority of the LMW or HMW component. In the most preferred embodiment, the LMW component may comprise an ethylene 1-butene copolymer and the HMW component may comprise an ethylene 1-hexene copolymer.

The overall comonomer content in the multimodal polyethylene polymer may be for example 0.5 to 8.0% by mol, preferably 0.7 to 6.5% by mol, more preferably 1.0 to 5.0% by mol and most preferably 1.5 to 5.0% by mol.

1-Butene may be present in an amount of 0.2 to 2.5% by mol, such as 0.4 to 2% by mol, more preferably 0.4 to 1.5% by mol and most preferably 0.4 to 1% by mol.

The C6 to C10 alpha olefin may be present in an amount of 0.3 to 5.5% by mol, preferably 0.4 to 4.5% by mol, more preferably 0.7 to 4.5% by mol.

Preferably, the LMW component has lower amount (mol %) of comonomer than the HMW component, e.g. the amount of comonomer, preferably of 1-butene in the LMW component is from 0.05 to 0.9 mol %, more preferably from 0.1 to 0.8 mol %, whereas the amount of comonomer, preferably of 1-hexene in the HMW component (B) is from 1.0 to 8.0 mol %, more preferably from 1.2 to 7.5 mol %.

If required the comonomer content (mol %) in the HMW component=(comonomer content (mol %) in final product−(weight fraction of LMW component*comonomer content (mol %) in LMW component))/(weight fraction of HMW component).

The multimodal polyethylene copolymer may therefore be formed from ethylene along with at least one of 1-butene, 1-hexene or 1-octene. The multimodal polyethylene polymer may be an ethylene butene hexene terpolymer, e.g. wherein the HMW component is an ethylene butene hexene terpolymer and the LMW is an ethylene homopolymer component. The use of a terpolymer of ethylene with 1-butene and 1-octene comonomers, or a terpolymer of ethylene with 1-octene and 1-hexene comonomers is also envisaged.

In a further embodiment, the multimodal polyethylene copolymer may comprise two ethylene copolymers, e.g. such as two ethylene butene copolymers or an ethylene butene copolymer (e.g. as the LMW component) and an ethylene hexene copolymer (e.g. as the HMW component). It would also be possible to combine an ethylene copolymer component and an ethylene terpolymer component, e.g. an ethylene butene copolymer (e.g. as the LMW component) and an ethylene butene hexene terpolymer (e.g. as the HMW component).

The LMW component of the multimodal polyethylene polymer may have a $MFR_2$ of 0.5 to 3000 g/10 min, more preferably 1.0 to 1000 g/10 min. In some embodiments, the $MFR_2$ of the LMW component may be 50 to 3000 g/10 min, more preferably 100 to 1000 g/10 min, e.g. where the target is a cast film. In some embodiments, the $MFR_2$ of the LMW component may be 0.5 to 50 g/10 min, more preferably 1.0 to 10 g/10 min, preferably of 1.5 to 9.0 and more preferably of 2.0 to 8.5., e.g. where the target is a blown film.

The molecular weight of the low molecular weight component should preferably range from 20,000 to 90,000, e.g. 60,000 to 90,000.

It may have a density of at least 925 kg/$m^3$, e.g. at least 940 kg/$m^3$. A density in the range of 930 to 950, preferably of 935 to 945 kg/$m^3$ is possible.

The HMW component of the multimodal polyethylene polymer may, for example, have an $MFR_2$ of less than 1 g/10 min, such as 0.2 to 0.9 g/10 min, preferably of 0.3 to 0.8 and more preferably of 0.4 to 0.7 g/10 min. It may have a density of less than 915 kg/$m^3$, e.g. less than 910 kg/$m^3$, preferably less than 905 kg/$m^3$. The Mw of the higher molecular weight component may range from 100,000 to 1,000,000, preferably 250,000 to 500,000.

The LMW component may form 30 to 70 wt % of the multimodal polyethylene polymer such as 40 to 60 wt %, especially 45 to 55 wt %.

The HMW component may form 30 to 70 wt % of the multimodal polyethylene polymer such as 40 to 60 wt %, especially 45 to 55 wt %.

In one embodiment, there is 40 to 45 wt % of the LMW component and 60 to 55 wt % of the HMW component.

In one embodiment, the polyethylene polymer consists of the HMW and LMW components as the sole polymer components.

The multimodal polyethylene polymer of the invention may have a $MFR_2$ of 0.01 to 50 g/10 min, preferably 0.05 to 25 g/10 min, especially 0.1 to 10 g/10 min.

The multimodal polyethylene polymer of the invention may have a density of 900 to 960 kg/$m^3$, preferably 905 to 940 kg/$m^3$, especially 910 to 935 kg/$m^3$.

The molecular weight distribution (MWD, $M_w/M_n$) of a polyethylene terpolymer of the invention is in a range of 2.0 to 15.0, preferably in a range of 2.2 to 10.0 and more preferably in a range of 2.4 to 4.6.

The multimodal (e.g. bimodal) polyethylene polymers are prepared by in-situ blending in a multi-stage polymerisation process. In particular, the process requires (I) polymerising ethylene and optionally at least one C4-10 alpha olefin comonomer in a first stage in the presence of a metallocene catalyst so as to form a first polyethylene component; and (II) polymerising ethylene and optionally at least one C4-10 alpha olefin comonomer in a second stage in the presence of the product of step (I) so as to form a second component.

The multimodal polyethylene polymer may be produced in any suitable polymerisation process known in the art where polymerisation is typically carried out in solution, slurry, bulk or gas phase. Preferably the multimodal polymer, is produced in at least two-stage polymerisation using, for example, two slurry reactors or two gas phase reactors, or any combinations thereof, in any order can be employed. Preferably however, the multimodal polymer is made using a slurry polymerisation, e.g. in a loop reactor followed by a gas phase polymerisation in a gas phase reactor.

A loop reactor—gas phase reactor system is marketed by Borealis as a BORSTAR reactor system. Any multimodal polyethylene polymer present is thus preferably formed in a two-stage process comprising a first slurry loop polymerisation followed by gas phase polymerisation.

The conditions used in such a process are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C., e.g. propane. In such reactors, polymerisation may if desired be effected under supercritical conditions. Slurry polymerisation may also be carried out in bulk where the reaction medium is formed from the monomer being polymerised.

The ethylene content in the fluid phase of the slurry may be from 2 to about 50% by mol, preferably from about 2 to about 20% by mol and in particular from about 3 to about 12% by mol. Hydrogen may be fed into the reactor to control the molecular weight of the polymer as known in the art.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

Preferably, the lower molecular weight polymer fraction is produced in a continuously operating loop reactor where ethylene and any comonomers are polymerised in the presence of the polymerisation catalyst as stated above and a chain transfer agent such as hydrogen. The diluent is typically an inert aliphatic hydrocarbon, preferably isobutane or propane.

The higher molecular weight component can then be formed in a gas phase reactor using the same catalyst.

It is also possible for a further polymerisation step to be used such as a further gas phase step.

It is often preferred to remove the reactants of the preceding polymerisation stage from the polymer before introducing it into the subsequent polymerisation stage. This is preferably done when transferring the polymer from one polymerisation stage to another.

The catalyst may be transferred into the first reactor by any means known in the art. For example, it is possible to suspend the catalyst in a diluent and maintain it as a slurry, to mix the catalyst with a viscous mixture of grease and oil and feed the resultant paste into the polymerisation zone or to let the catalyst settle and introduce portions of thus obtained catalyst mud into the polymerisation.

Where the higher molecular weight component is made second in a multi-stage polymerisation it is not possible to measure its properties directly. However, the skilled man is able to determine the density, $MFR_2$, etc. of the higher molecular weight component using Hagström equation (Hagström, The Polymer Processing Society, Europe/Africa Region Meeting, Gothenburg, Sweden, Aug. 19-21, 1997):

$$MI_b = \left( w \cdot MI_1^{-\frac{w^{-b}}{a}} + (1 - w) \cdot MI_2^{-\frac{w^{-b}}{a}} \right)^{-a \cdot w^b} \quad \text{(eq. 3)}$$

According to said Hagström, in said equation (eq.3), a=5.2 and b=0.7 for $MFR_2$. Furthermore, w is the weight fraction of the other ethylene polymer component, e.g. component (A), having higher MFR. The LMW component can thus be taken as the component 1 and the HMW component as the component 2. MIb is the $MFR_2$ of the final polyethylene.

The process of the invention may also involve a prepolymerisation step. This prepolymerisation step is a conventional step used routinely in polymer synthesis.

The prepolymerisation step may be conducted in slurry or in gas phase. Preferably prepolymerisation is conducted in slurry, preferably in a loop reactor. The prepolymerisation is then preferably conducted in an inert diluent, preferably the diluent is a low-boiling hydrocarbon having from 1 to 4 carbon atoms or a mixture of such hydrocarbons. The temperature in the prepolymerisation step is typically from 0 to 90° C., preferably from 20 to 80° C. and more preferably from 25 to 70° C.

The pressure is not critical and is typically from 1 to 150 bar, preferably from 10 to 100 bar.

The catalyst is preferably all introduced to the prepolymerisation step. Preferably the reaction product of the prepolymerisation step is then introduced to the first reactor.

If present, the prepolymer component is deemed a part of the LMW component.

Generally, the quantity of catalyst used will depend upon the nature of the catalyst, the reactor types and conditions and the properties desired for the polymer product. As is well known in the art hydrogen can be used for controlling the molecular weight of the polymer in any reactor.

Polymer made in the process of the invention can be used in a variety of applications such as films, e.g. blown or cast films. They also have utility in moulding applications.

The catalyst system prepared according to the invention especially possesses excellent catalyst activity throughout the multi-stage polymerisation process and at the same time is able to provide polymers of high weight average molecular weight $M_w$ and high comonomer content.

The invention will now be defined with reference to the following non-limiting examples and figures.

FIG. 1 shows the ethylene intake for IC3-1 and CC1 in the slurry phase in the Experiment 1 polymerisations (examples IE3-1 and CE1-1).

FIG. 2 shows the ethylene intake for IC3-1 and CC1 in the gas phase in the Experiment 1 polymerisations (examples IE3-1 and CE1-1).

Figure 7:
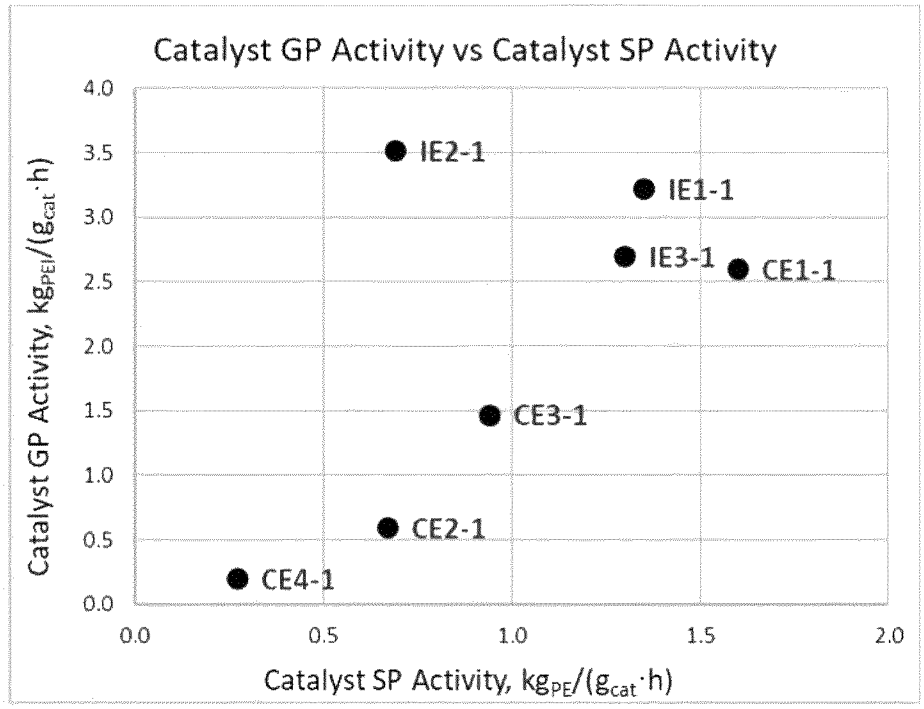

FIG. 7 plots the gas phase activity vs the slurry phase activity for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 8:
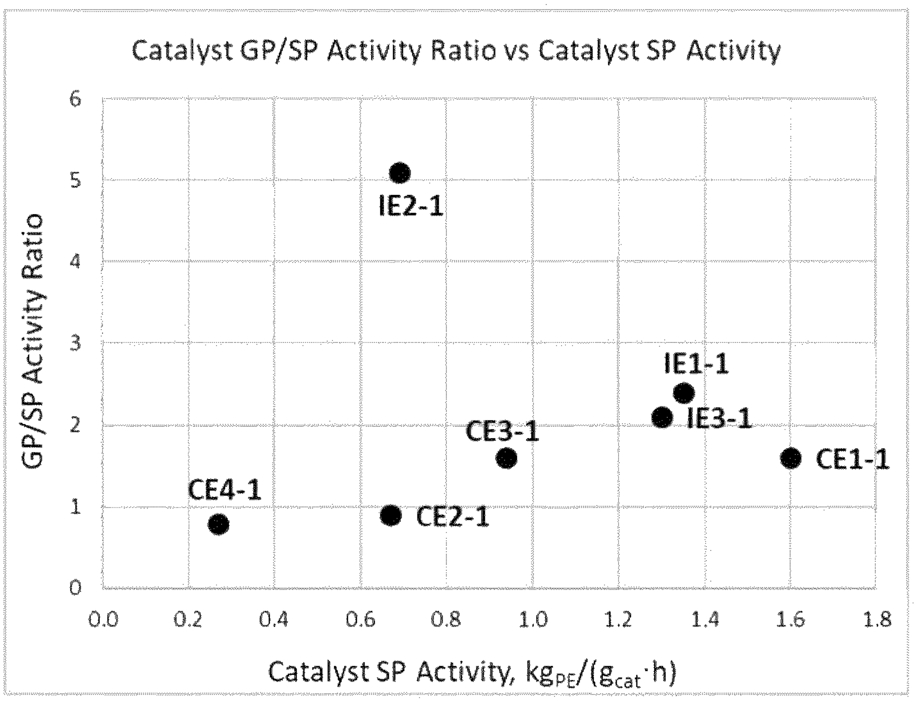

FIG. 8 plots the gas phase to slurry phase activity ratio vs the slurry phase activity for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 9:
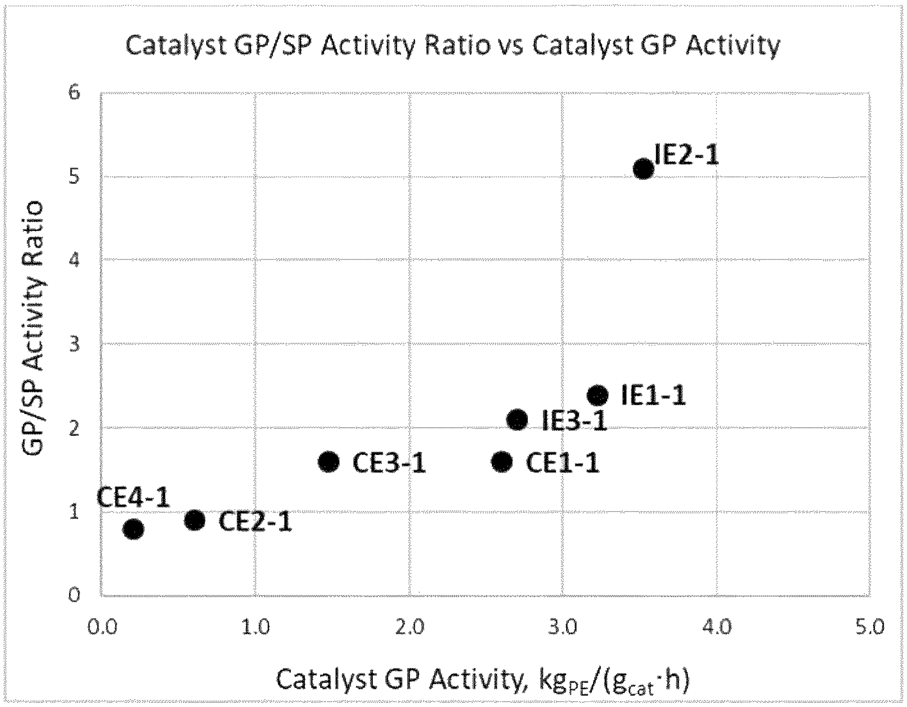

FIG. 9 plots the gas phase to slurry phase activity ratio vs the gas phase activity for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 10:
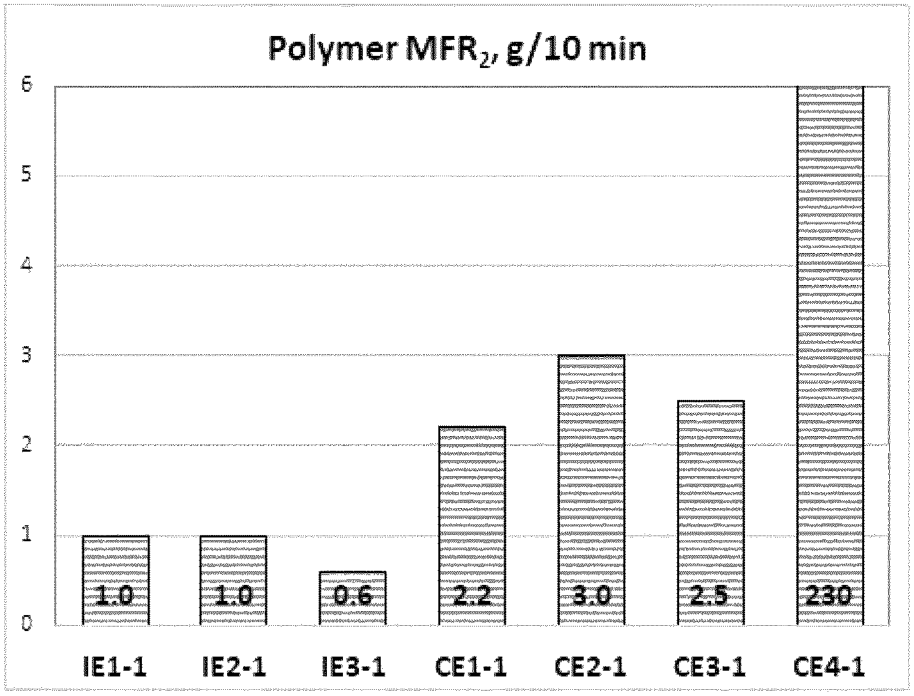

FIG. 10 shows the $MFR_2$ data for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 11:
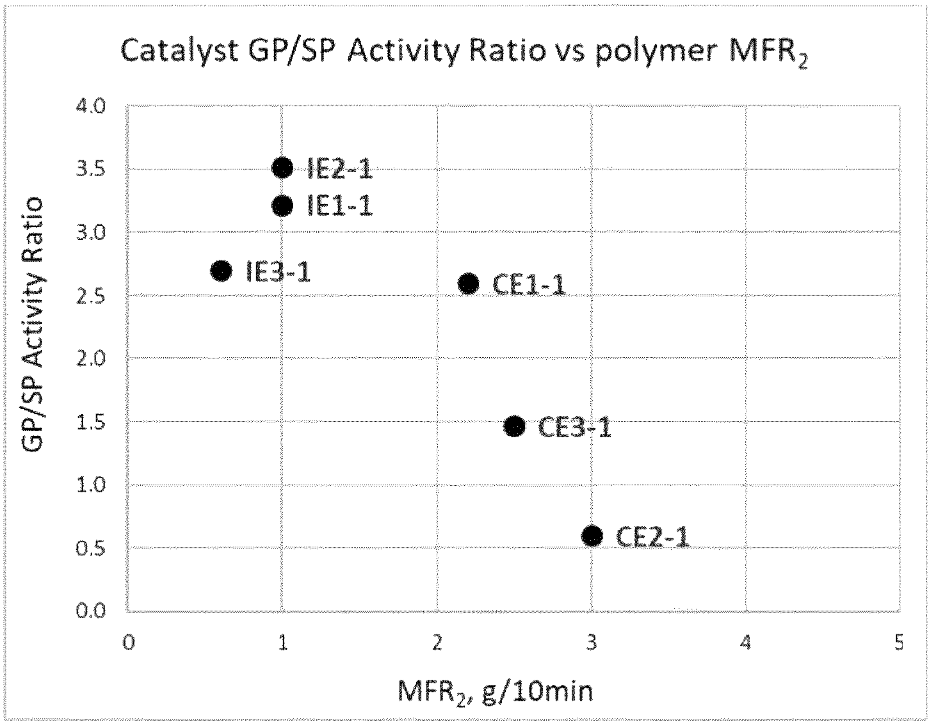

FIG. 11 plots the gas phase to slurry phase activity ratio vs $MFR_2$ for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 12:
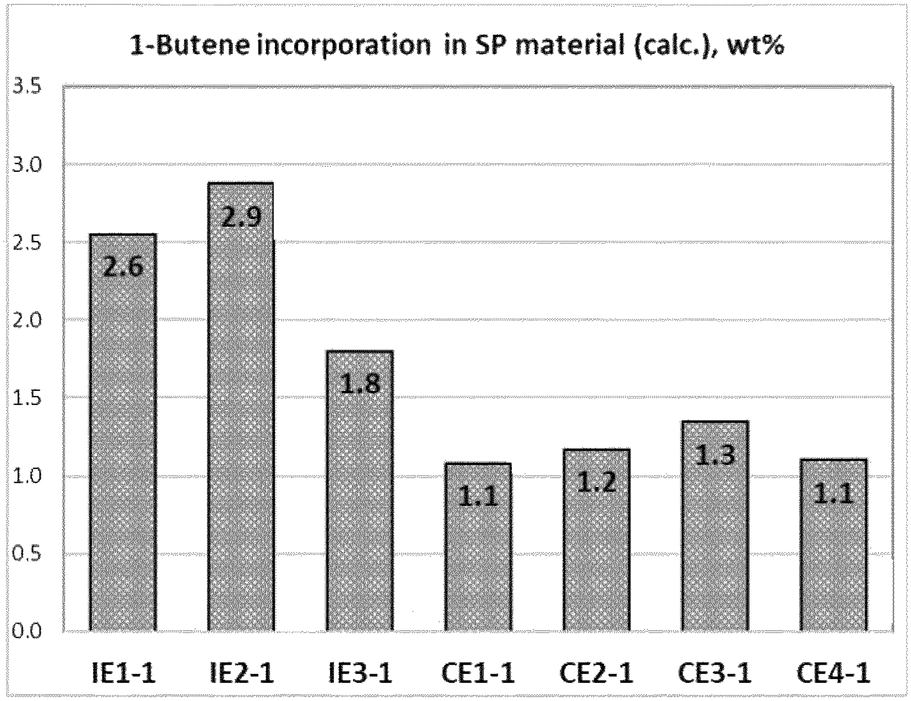

FIG. 12 shows calculated Butene incorporation in the slurry phase material for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 13:
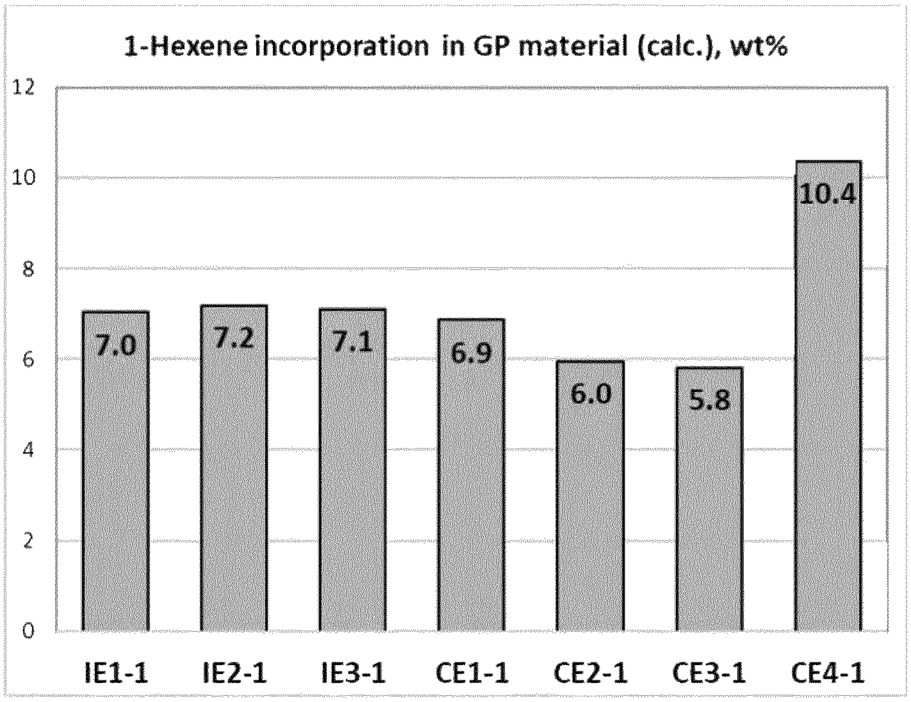

FIG. 13 shows calculated Hexene incorporation in the gas phase material for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 14:
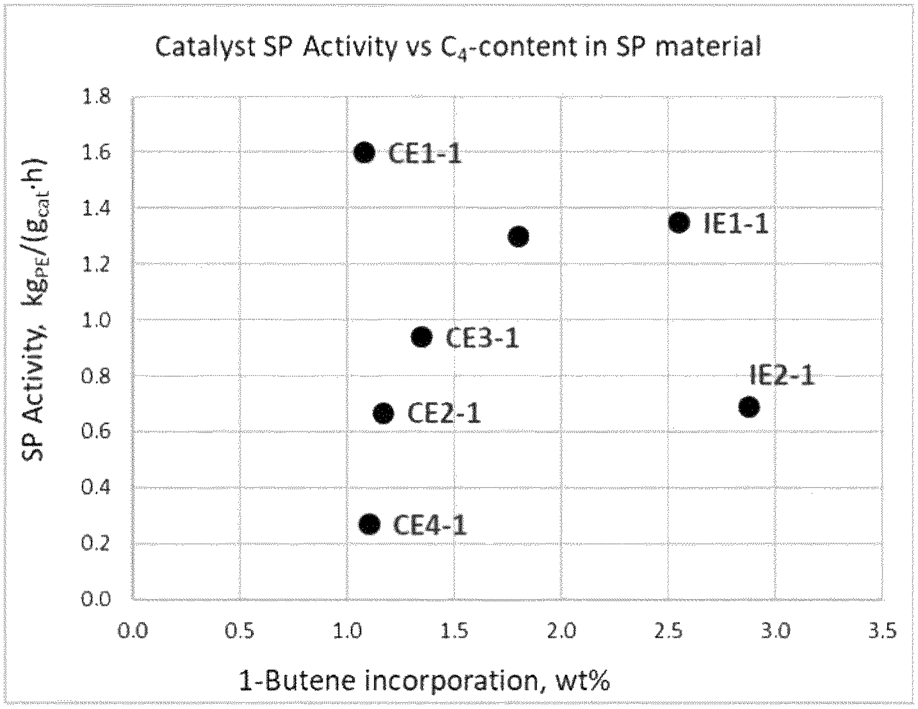

FIG. 14 plots the slurry phase activity vs calculated Butene incorporation in the slurry phase material for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 15:
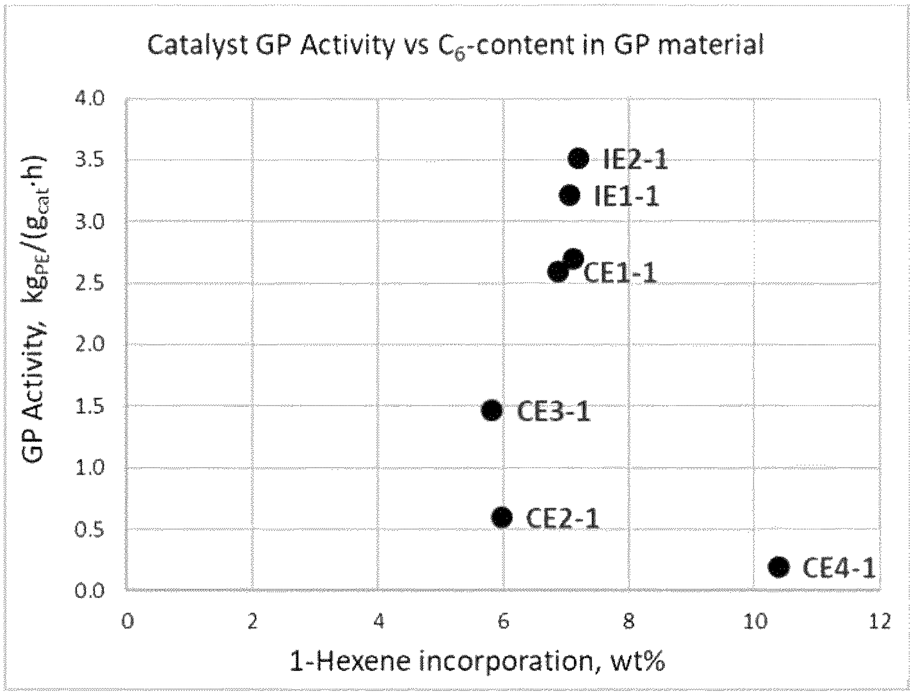

FIG. 15 plots gas phase activity vs calculated Hexene incorporation in the gas phase material for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 16:
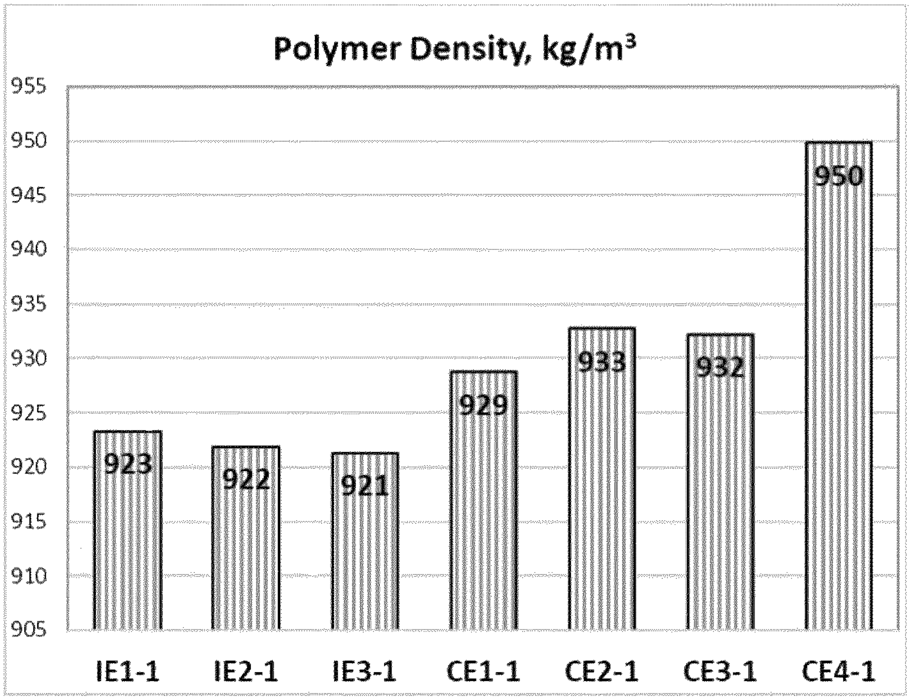

FIG. 16 shows the polymer final density for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 17:
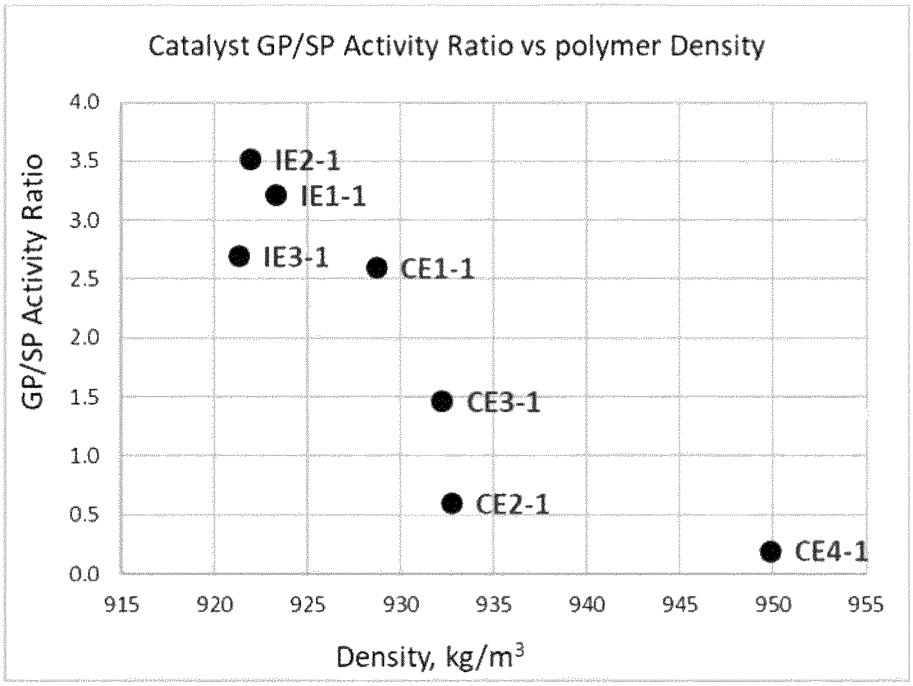

FIG. 17 plots the gas phase to slurry phase activity ratio vs polymer final density for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

Figure 18:
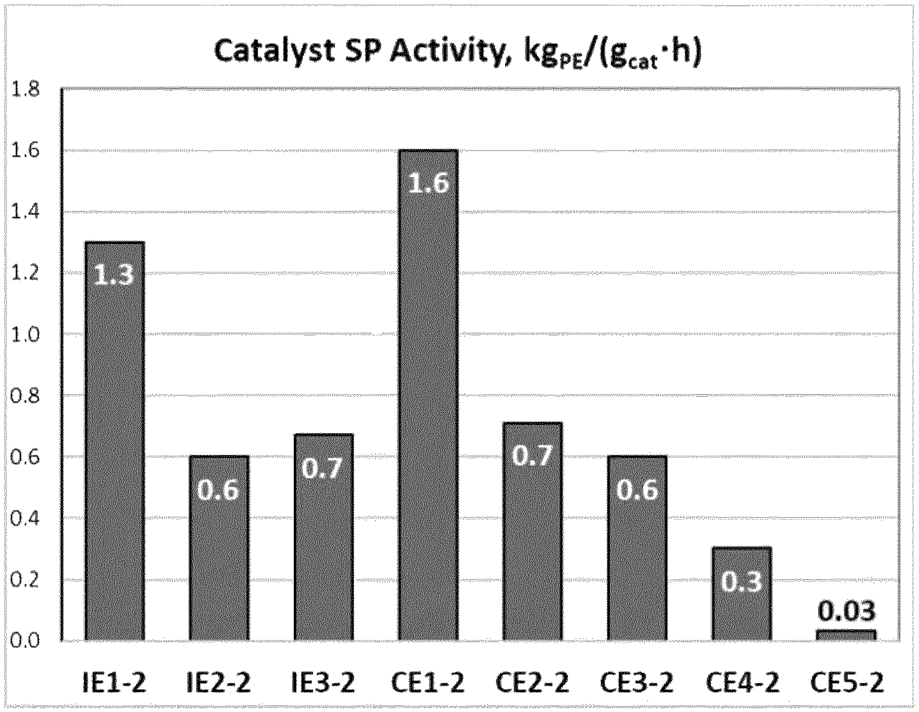

FIG. 18 shows catalyst activity in the slurry phase for IC1-2, IC2-2, IC3-2, CC1, CC2-2, CC3-2, CC4-2 and CC5-2 in the Experiment 2 polymerisations (examples IE1-2, IE2-2, IE3-2, CE1-2, CE2-2, CE3-2, CE4-2 and CE5-2).

Figure 19:
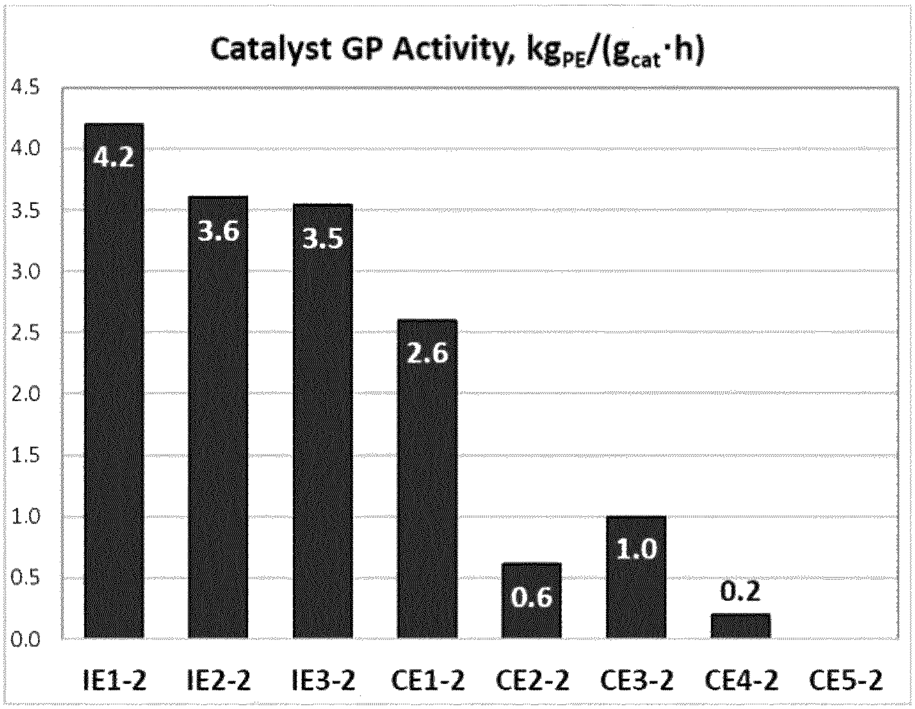

FIG. 19 shows catalyst activity in the gas phase for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 20:
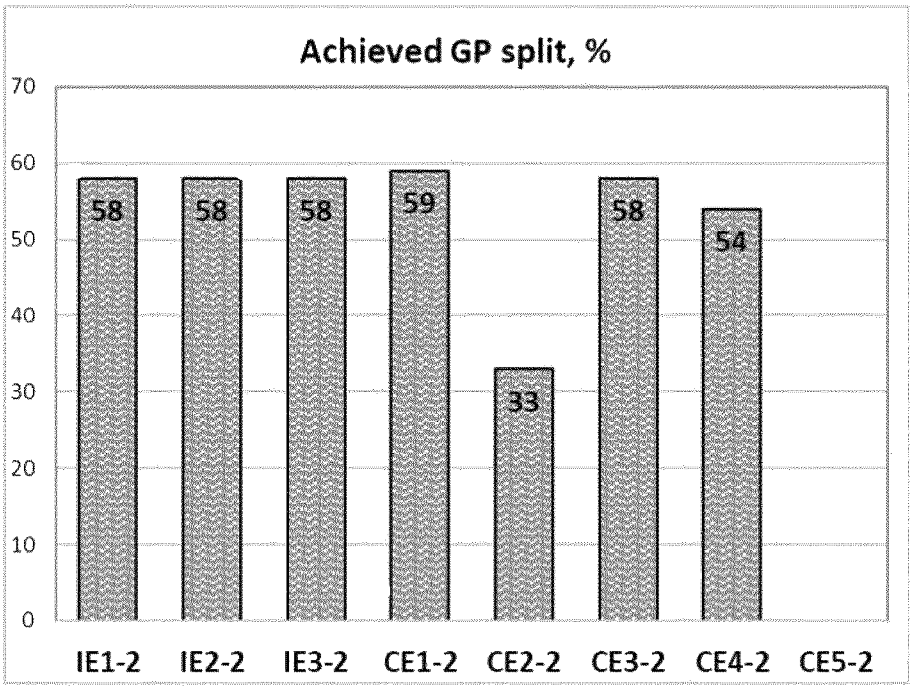

FIG. 20 shows the achieved gas phase split for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 21:
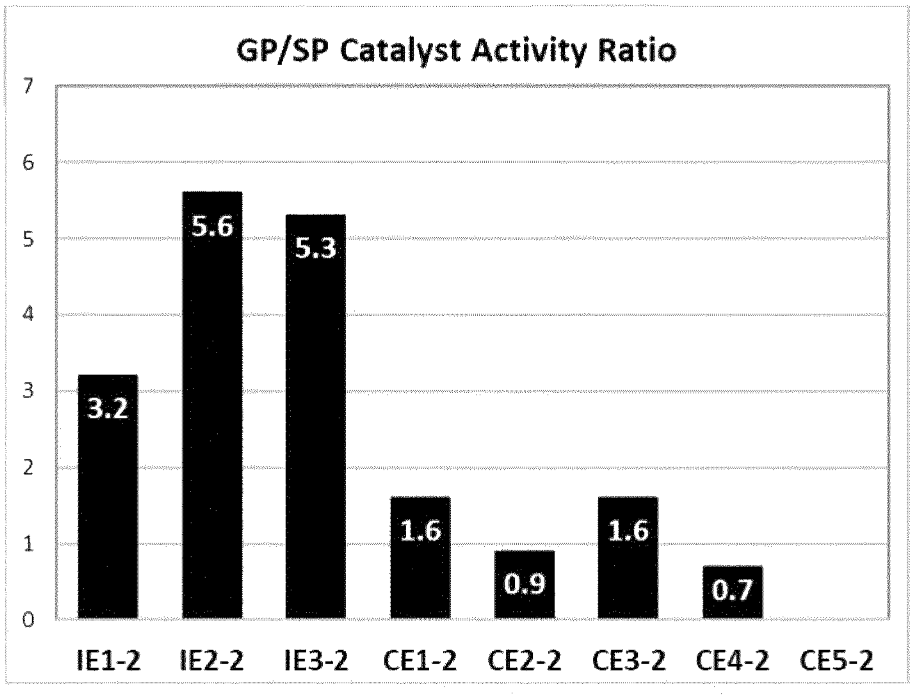

FIG. 21 shows the gas phase to slurry phase activity ratio for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 22:
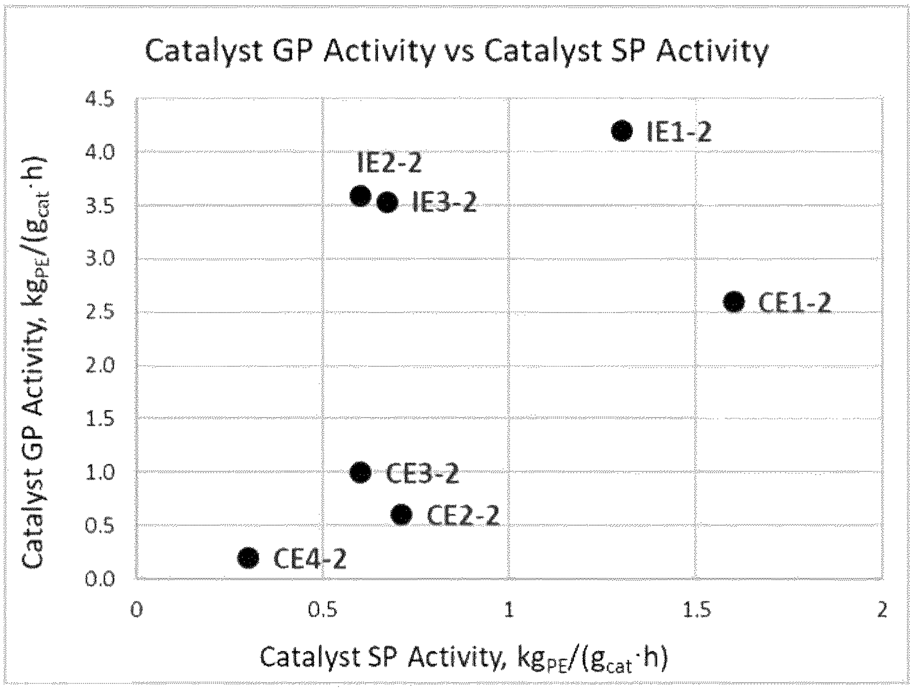

FIG. 22 plots the gas phase activity vs the slurry phase activity for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 23:
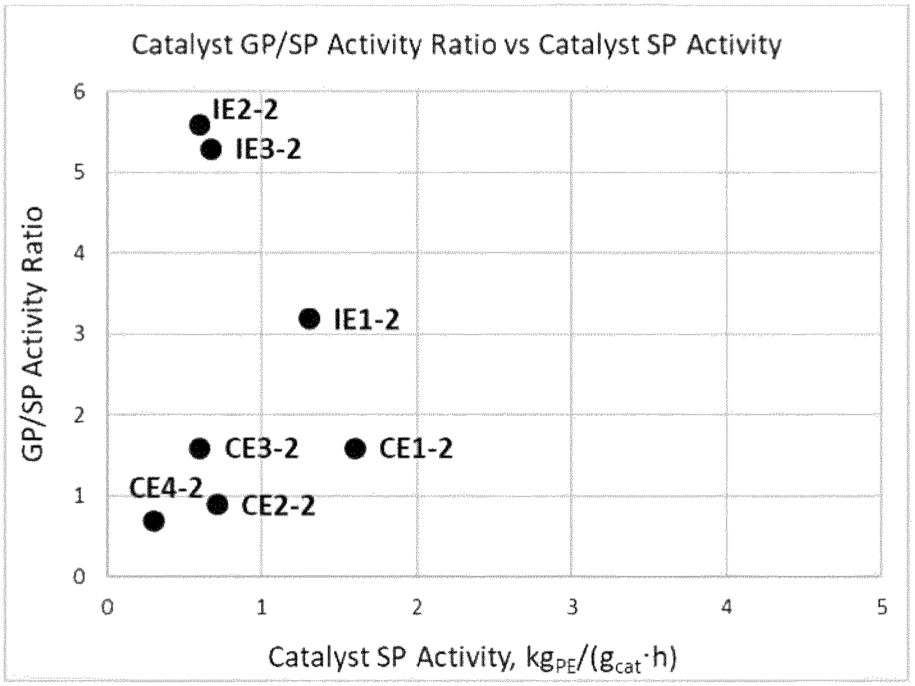

FIG. 23 plots the gas phase to slurry phase activity ratio vs the slurry phase activity for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 24:
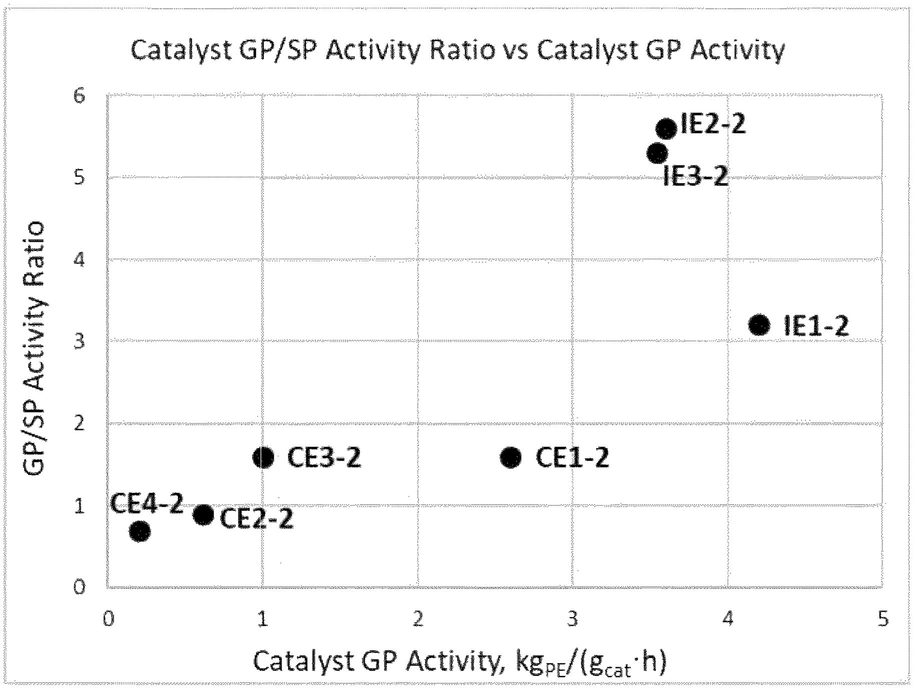

FIG. 24 plots the gas phase to slurry phase activity ratio vs the gas phase activity for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 25:
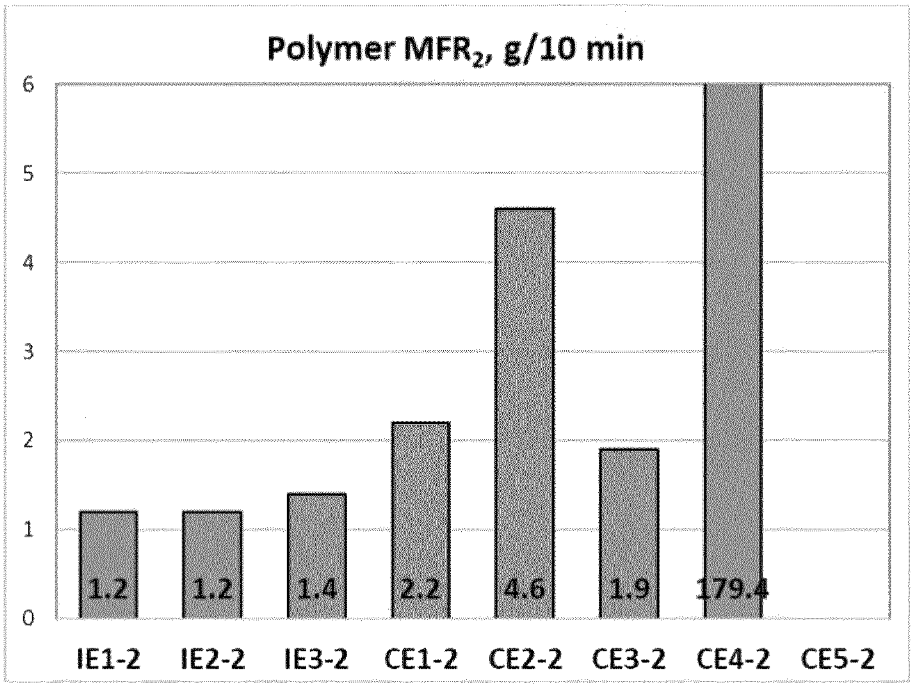

FIG. 25 shows the $MFR_2$ data for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 26:
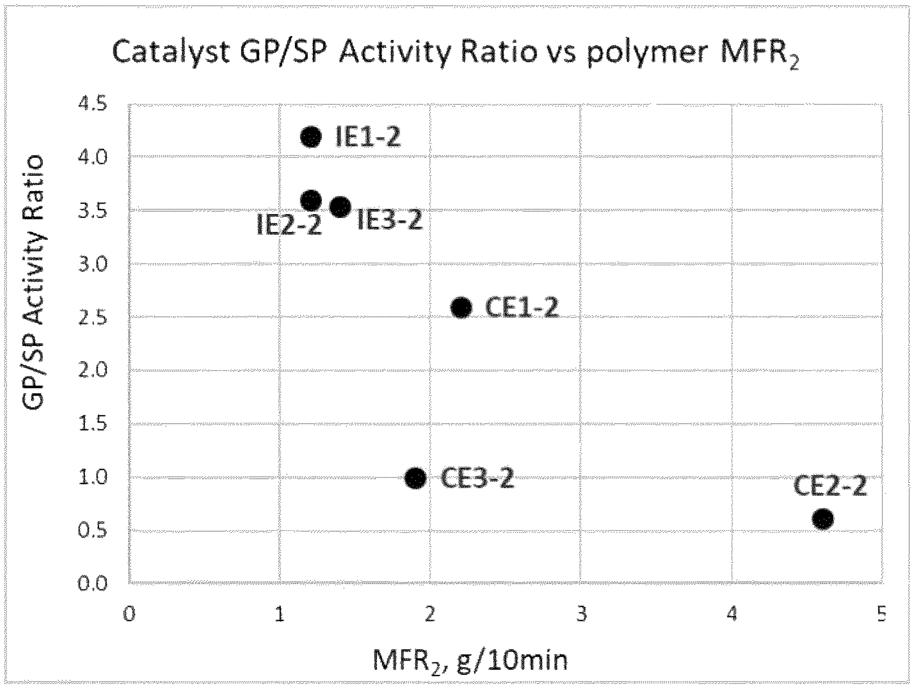

FIG. 26 plots the gas phase to slurry phase activity ratio vs $MFR_2$ for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 27:
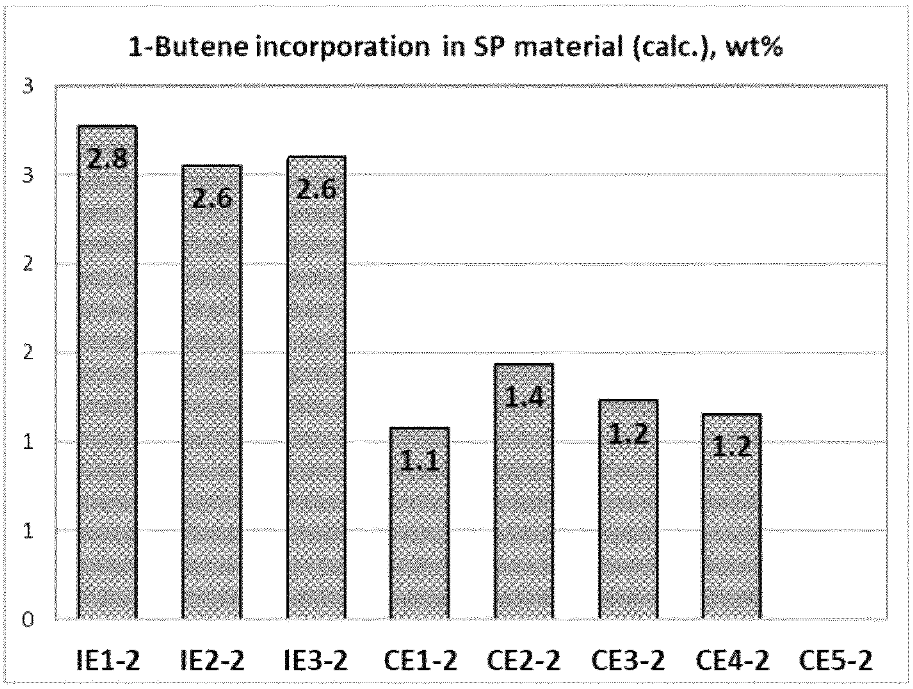

FIG. 27 shows calculated Butene incorporation in the slurry phase material for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 28:
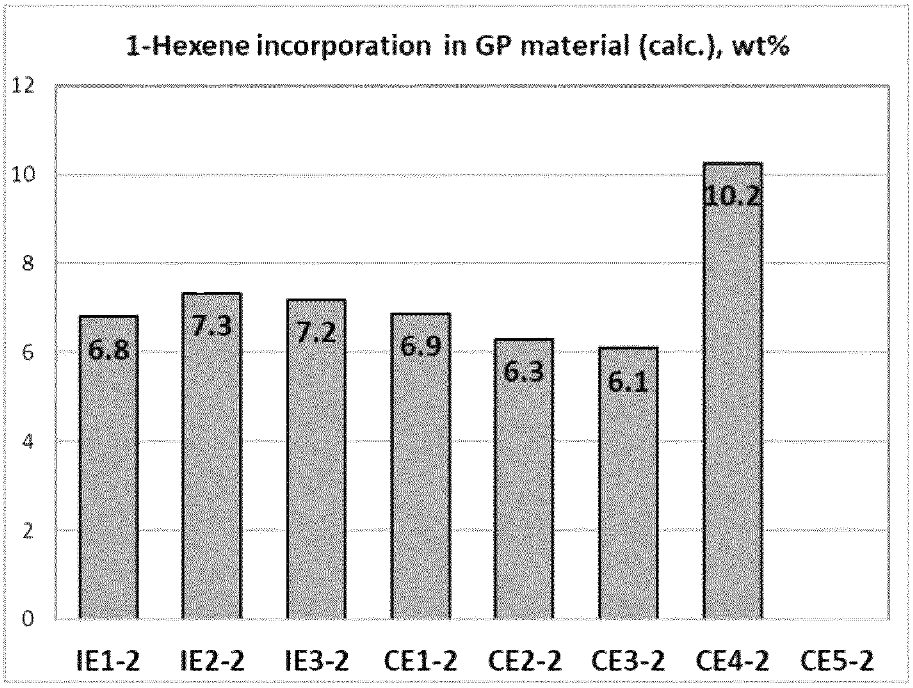

FIG. 28 shows calculated Hexene incorporation in the gas phase material for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 29:
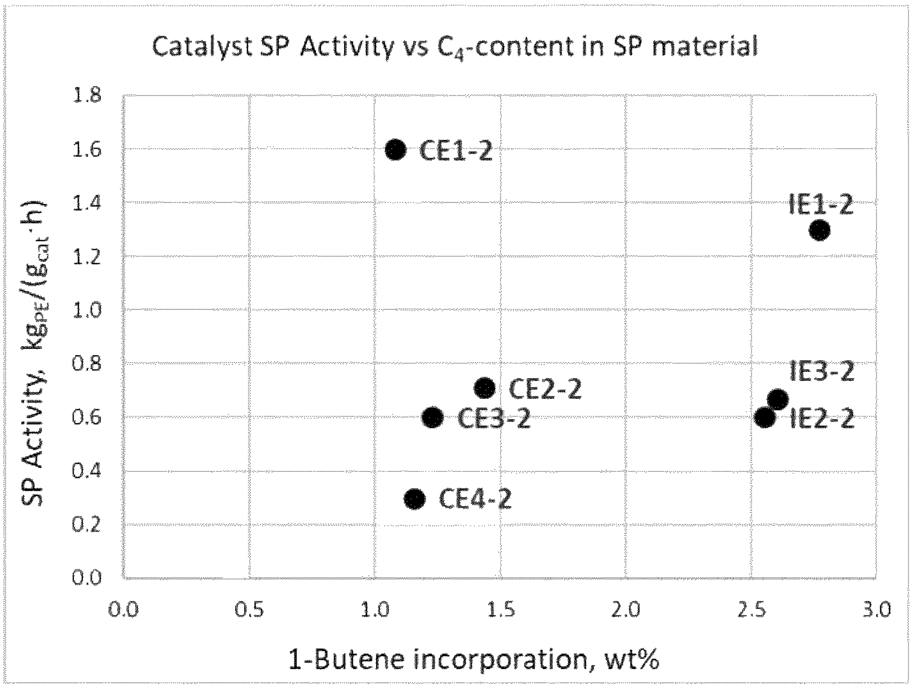

FIG. 29 plots the slurry phase activity vs calculated Butene incorporation in the slurry phase material for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 30:
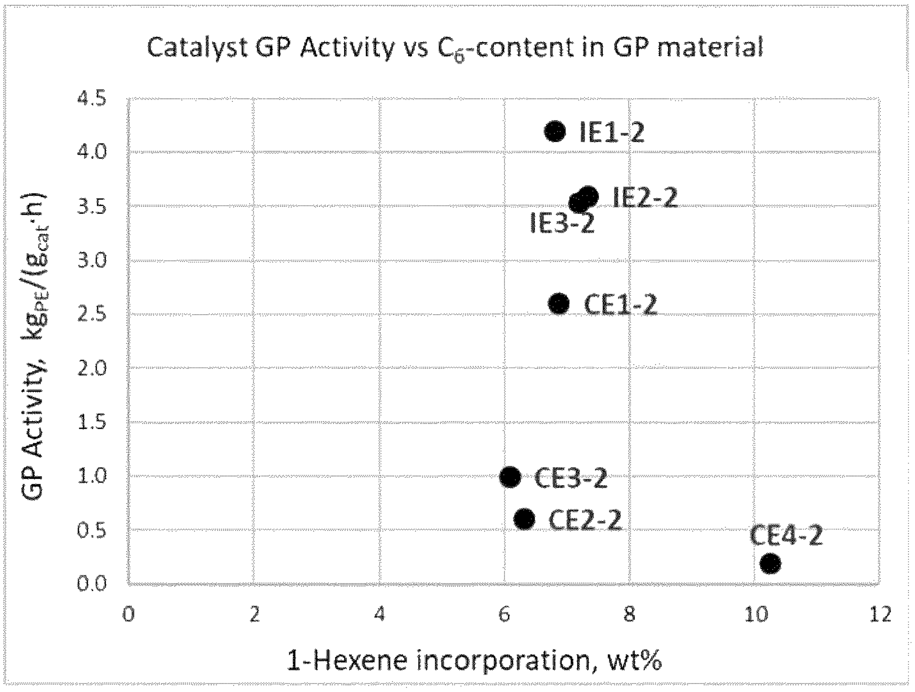

FIG. 30 plots gas phase activity vs calculated Hexene incorporation in the gas phase material for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 31:
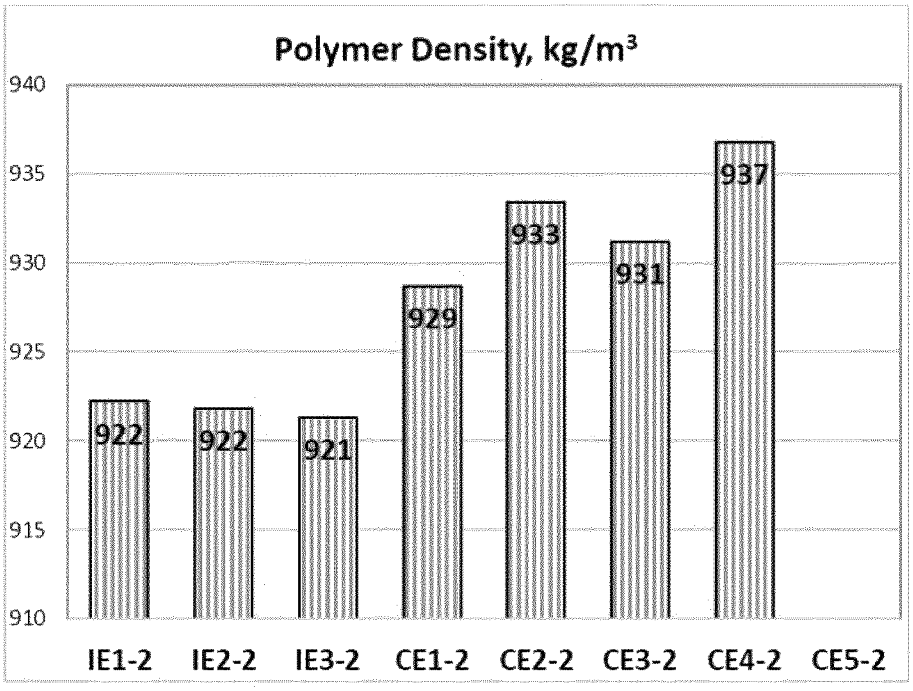

FIG. 31 shows the polymer final density for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

Figure 32:
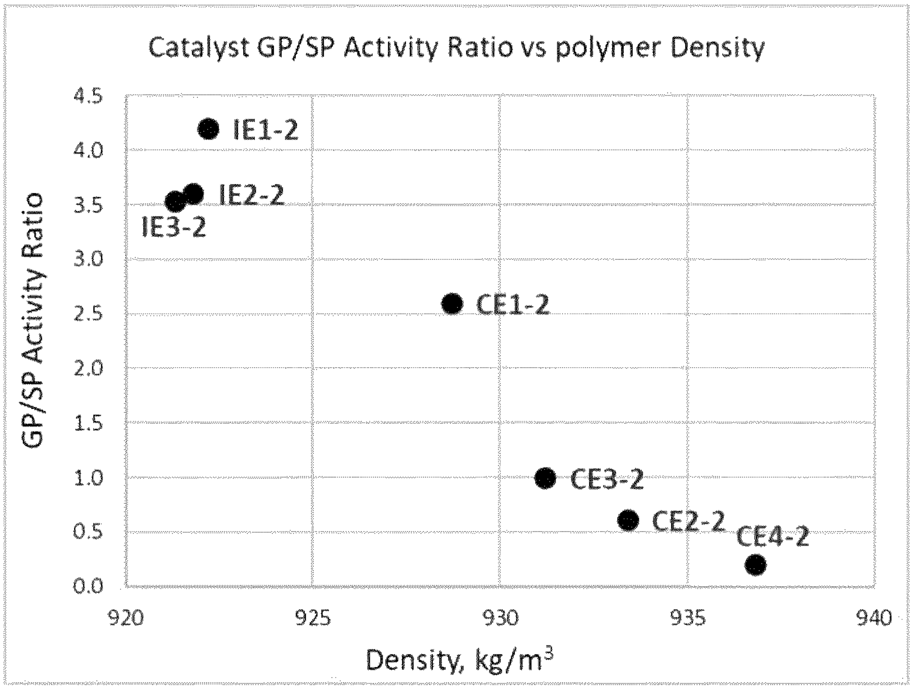

FIG. 32 plots the gas phase to slurry phase activity ratio vs polymer final density for IC1-2, IC2-2, IC3-2, CC1, CC2-2, CC3-2 and CC4-2 in the Experiment 2 polymerisations (examples IE1-2, IE2-2, IE3-2, CE1-2, CE2-2, CE3-2 and CE4-2).

EXPERIMENTAL

Analytical Methods
Catalyst Analysis
Al and Zr Content in a Solid Catalyst by ICP-OES In a glovebox, an aliquot of the catalyst (ca. 40 mg) is weighted into a glass weighing boat using an analytical balance. The sample is then allowed to be exposed to air overnight while being placed in a steel secondary container equipped with an air intake. Then, 5 mL of concentrated (65%) Nitric acid is used to rinse the content of the boat into an Xpress microwave oven vessel (20 mL). A sample is then subjected to microwave-assisted acid digestion using MARS 6 laboratory microwave unit with ramping to 150° C. within 20 minutes and a hold phase at 150° C. for 35 minutes. The digested sample is allowed to cool down to room temperature and then transferred into a plastic 100 mL volumetric flask. Standard solutions containing 1000 mg/L Yttrium (0.4 mL) are added. The flask is then filled up with distilled water and shaken. The solution is filtered through 0.45 μm Nylon syringe filters and subjected to analysis using Thermo iCAP 6300 ICP-OES and iTEVA software.

The instrument is calibrated for Al and Zr using a blank (a solution of 5% $HNO_3$, prepared from concentrated Nitric acid) and six standards of 0.005 mg/L, 0.01 mg/L, 0.1 mg/L, 1 mg/L, 10 mg/L and 100 mg/L of Al and Zr in solutions. The solutions contain 5% $HNO_3$ (from concentrated nitric acid), 4 mg/L of Y standard in distilled water. Plastic volumetric flasks are used. Curvilinear fitting and 1/ concentration weighting are used for the calibration curves. Immediately before analysis, the calibration is verified and adjusted (instrument re-slope function) using the blank and the 10 mg/L Al and Zr standard which has 4 mg/L Y and 5% $HNO_3$, from concentrated nitric acid, in distilled water. A quality control sample (QC: 1 mg/L Al; 2 mg/L Zr and 4 mg/L Y in a solution of 5% $HNO_3$, from concentrated nitric acid, in distilled water) is run to confirm the re-slope. The QC sample is also run at the end of a scheduled analysis set.

The content for Zr is monitored using the 339.198 nm line. The content of Al is monitored via the 394.401 nm line. The Y 371.030 nm is used as the internal standard. The reported values are calculated back to the original catalyst sample using the original mass of the catalyst aliquot and the dilution volume.

Volatiles Content in a Solid Catalyst by GC-MS

A test portion of 50-80 mg of catalyst powder is weighed accurately into a 20 mL headspace vial under inert atmosphere. The vial is capped using an aluminium cap with PTFE/silicone septum. 1 mL of internal standard solution (50 mg Toluene-$d_8$ and 50 mg n-Nonane in 100 mL n-Dodecane) is added into the sample vial through the septum cap using a precision micro-syringe. The same ISTD solution is used for the samples and for the calibration standard solutions.

For the calibration, a standard stock solution is prepared by weighing accurately 40 mg of each analyte component (n-Pentane, n-Heptane and Toluene) into a 20 mL volumetric flask which is filled up to the mark with ISTD stock solution. Calibration solutions with different analyte concentrations are prepared by dosing six increasing portions (0.1-1 mL) of analyte standard stock solution accurately into 20 mL headspace vials followed by addition of ISTD solution in decreasing volumes, bringing the total ISTD stock solution volume to 1.0 mL in each vial. The analyte amount in the final calibration samples ranges from 0.2 mg/mL to 2 mg/mL. For a blank 1 mL of ISTD stock solution is transferred into a 20 mL headspace vial.

The measurement is performed using an Agilent 7890B Gas Chromatograph equipped with an Agilent 7697A headspace sampler and an Agilent 5977A Mass Spectrometer Detector. The carrier gas is 99.9996% Helium. The headspace sampler oven temperature is set to 80° C. with loop and transfer line temperatures at 120° C. The vial equilibration time is 15 minutes. For sampling, the headspace sample vial is filled in the flow to pressure mode and pressurised with a flow of 20 mL/min to 172 kPa. The sampling of the loop is ramped at 138 kPa/min with final pressure of 34 kPa. The carrier gas flow in the DB-ProSteel transfer line with 0.53 mm diameter is 54 mL/min.

The gas chromatography inlet is operating in split mode. The inlet temperature is set to 280° C. and pressure to 18.236 psi, total flow is 111.9 mL/min, septum purge flow 3 mL/min and split flow 108 mL/min. The split ratio is 120:1. The inlet liner uses ultra-inert split liner with glass wool.

The separation is achieved using a ZB-XLB-HT Inferno 60 m×250 μm×0.25 μm column (Phenomenex) with a pre-column restriction capillary of 3 m×250 μm×0 μm. The carrier flow in the analytical column is 1.1 mL/min. The initial oven temperature is 40° C. and the hold time is 0.1 minutes. The oven ramp consists of a first stage of 5° C./min to 60° C. and a second stage of 10° C./min to 120° C. and a third stage of 40° C./min to 250° C.

The MS detector transfer line is kept at 300° C. The MSD is operated in Electron Impact mode at 70 eV and scan mode ranging from 33-175 m/z, step size 0.1 m/z. The source temperature is 230° C. and the quadrupole temperature is set to 150° C. Threshold is set to 50 counts and electron multiplier gain factor to 1. The detector is switched off after 11.40 minutes.

The signal identities are determined by retention times (Pentane 4.5, Heptane 6.3, Toluene 7.8, Toluene-$d_8$ 7.7 and n-Nonane 10.0) and target ion m/z (Pentane 55.0, Heptane 100.0, Toluene 91.0, Toluene-$d_8$ 98.0 and n-Nonane 98.0). Additionally qualifier ions are used for confirmation of the identification (Heptane, Toluene). The target ion signals of each analyte and the internal standard are integrated and compared to calibration curve, established in the beginning of each run with the six calibration samples. The calibration curves for the response ratios are linear; sample concentration weighting is applied for pentane. A quality control sample is used in each run to verify the standardisation. The mass of the test portion is used for calculating the analyte concentration in the sample for both replicates and the result reported as the average in wt %.

Polymer Analysis and Characterisation
Polymer Melt Flow Rate (MFR)

The melt flow rate (MFR) is determined according to ISO 1133 and is indicated in g/10 min. The MFR is determined at 190° C. for PE. The load under which the melt flow rate is determined is usually indicated as a subscript, for instance, $MFR_2$ is measured under 2.16 kg load.

Polymer Density

Determination of polymer density was performed using immersion method (Archimedean principle) following the ISO 1183-1:2012 (method A). The tests were done on disc die-cut out of compression-moulded plates. The compression moulding process parameters used were:

| PE | Time [s] | Temperature [° C.] | Pressure Hydraulic [bar] | Pressure Mould [N/cm$^2$] |
|---|---|---|---|---|
| Preheating | 360 | 180 | 5 | 7 |
| Moulding | 300 | 180 | 50 | 65 |
| | 300 | 180 | 200 | 262 |
| | 840 | 23 | | |
| Cooling | 15 K/min | | 200 | 262 |
| | <40° C. demoulding temperature | | | |

After compression moulding the specimens were conditioned at 23±2° C. and 50±10% humidity for 24±2 h. Following the Archimedean principle, the specimen were then weighed on air and immersed in a liquid (Isododecane), whose density is lower than that of the specimen. The tests were done without the Buoyancy correction suggested in the standard.

Quantification of Microstructure by NMR Spectroscopy

Quantitative nuclear-magnetic resonance (NMR) spectroscopy was used to quantify the comonomer content of the polymer.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed utilising the NOE at short recycle delays of 3 s {pollard04, klimke06} and the RS-HEPT decoupling scheme {fillip05, griffin07}. A total of 1024 (1k) transients were acquired per spectra.

Quantitative $^{13}C\{^1H\}$ NMR spectra were processed, integrated and relevant quantitative properties determined from the integrals. All chemical shifts are internally referenced to the bulk methylene signal (δ+) at 30.00 ppm {randall89}.

Characteristic signals corresponding to the incorporation of 1-butene were observed {randall89} and the comonomer fraction calculated as the fraction of 1-butene in the polymer with respect to all monomer in the polymer.

The amount of isolated 1-butene incorporated in EEBEE sequences was quantified using the integral of the *B2 sites [$I_{*B2}$] at 39.8 ppm accounting for the number of reporting sites per comonomer:

$$B=I_{*B2}$$

With no other signals indicative of other comonomer sequences, i.e. consecutive comonomer incorporation observed, the total 1-butene comonomer content was calculated based solely on the amount of isolated 1-butene sequences:

$$B\text{total}=B$$

The total mole fraction of 1-butene in the polymer was then calculated as:

$$fB=B\text{total}/(E\text{total}+B\text{total}+H\text{total})$$

Characteristic signals corresponding to the incorporation of 1-hexene were observed {randall89} and the comonomer fraction calculated as the fraction of 1-hexene in the polymer with respect to all monomer in the polymer.

The amount isolated 1-hexene incorporated in EEHEE sequences was quantified using the integral of the *B4 sites [$I_{*B4}$] at 38.2 ppm accounting for the number of reporting sites per comonomer:

$$H=I_{*B4}$$

With no other signals indicative of other comonomer sequences, i.e. consecutive comonomer incorporation observed, the total 1-hexene comonomer content was calculated based solely on the amount of isolated 1-hexene sequences:

$$H\text{total}=H$$

The total mole fraction of 1-hexene in the polymer was then calculated as:

$$fH=H\text{total}/(E\text{total}+B\text{total}+H\text{total})$$

The amount of ethylene was quantified using the integral of the bulk methylene (δ+) sites at 30.00 ppm. This integral included the γ site as well as the 3B4 sites from 1-hexene. The total ethylene content was calculated based on the bulk integral and compensating for the observed 1-butene and 1-hexene sequences and end-groups:

$$E=I_{\delta+}/2$$

Characteristic signals resulting from saturated end-groups were observed. The content of such saturated end-groups was quantified using the average of the integral of the signals at 22.8 [$I_{2S}$] and 32.2 ppm [$I_{3S}$] assigned to the 2s and 3s sites respectively:

$$S=(1/2)*(I_{2S}+I_{3S})$$

The presence of isolated comonomer units is corrected for based on the number of comonomer units and saturated end-groups present:

$$E\text{total}=E+(3/2)*B+(2/2)*H+(3/2)*S$$

The mole percent comonomer incorporation is calculated from the mole fraction:

$$B\ [\text{mol}\ \%]=100*fB$$

$$H\ [\text{mol}\ \%]=100*fH$$

The weight percent comonomer incorporation is calculated from the mole fraction:

$$B\ [\text{wt}\ \%]=100*(fB*56.11)/((fB*56.11)+(fH*84.16)+((1-(fB+fH))*28.05))$$

$$H\ [\text{wt}\ \%]=100*(fH*84.16)/((fB*56.11)+(fH*84.16)+((1-(fB+fH))*28.05))$$

randall89

J. Randall, Macromol. Sci., Rev. Macromol. Chem. Phys. 1989, C29, 201.

klimke06

Klimke, K., Parkinson, M., Piel, C., Kaminsky, W., Spiess, H. W., Wilhelm, M., Macromol. Chem. Phys. 2006; 207:382.

parkinson07

Parkinson, M., Klimke, K., Spiess, H. W., Wilhelm, M., Macromol. Chem. Phys. 2007; 208:2128.

pollard04

Pollard, M., Klimke, K., Graf, R., Spiess, H. W., Wilhelm, M., Sperber, O., Piel, C., Kaminsky, W., Macromolecules 2004; 37:813.

filip05

Filip, X., Tripon, C., Filip, C., J. Mag. Resn. 2005, 176, 239 griffin07

Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373

Raw Materials

Pre-treated silica is a commercial synthetic amorphous silica ES757 obtained from PQ Corp. The pre-treatment refers to silica commercial calcination at 600° C. according to a conventional PO catalyst technique.

Methylaluminoxane (30 wt % MAO solution in Toluene, Axion CA 1330) was obtained from Lanxess.

Bis(1-methyl-3-n-butylcyclopentadienyl)zirconium dichloride (MC4) was commercially available as a Toluene stock solution.

Metallocene Complex Preparation

Rac-dimethylsilanediylbis[2-(5-trimethylsilylfuran-2-yl)-4,5-dimethylcyclopentadien-1-yl]zirconium dichloride (MC3)

This complex was prepared in pure stereoisomeric form according to published synthetic procedure (U.S. Pat. No. 6,326,493)

The following novel metallocenes were prepared:

Anti- and syn-methyl(pent-4-en-1-yl)silanediyl-bis [$\eta^5$-2-(2-(5-trimethylsilyl)furyl)-4,5-dimethylcyclopentadienyl]zirconium dichloride (MC1, inventive and MC5, comparative)

Multi-Step Complex Preparation Method:

Bis[2-(2-(5-trimethylsilyl)furyl)-4,5-dimethylcyclopenta-2,4-dien-1-yl](methyl)pent-4-en-1-ylsilane

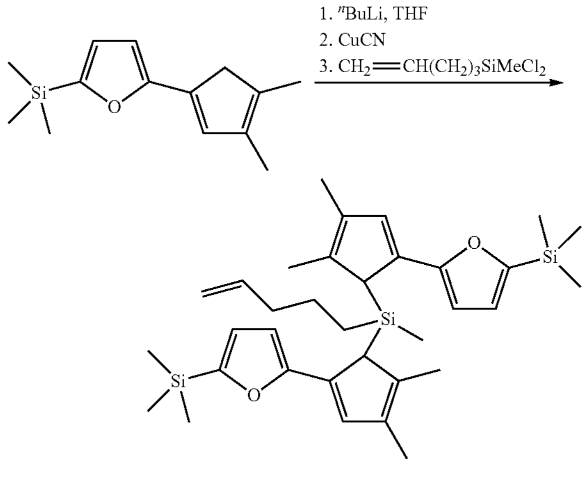

To a cooled to −78° C. solution of 19.6 g (84.3 mmol) of 1-(2-(5-trimethylsilyl)furyl)-3,4-dimethylcyclopenta-1,3-diene in 200 ml of THF 34.7 ml (84.3 mmol) of 2.43 M $^n$BuLi in hexanes was added. The resulting red solution was stirred for 4 h at room temperature, then cooled to −50° C., and 300 mg of CuCN was added. The obtained mixture was stirred for 15 min at −25° C., then 7.72 g (42.2 mmol) of dichloro (methyl)pent-4-en-1-ylsilane was added in one portion. This mixture was stirred overnight at room temperature. The solvents were removed on rotary evaporator; to the dark-red residue 600 ml of dichloromethane was added, and the resulting mixture was washed with 600 ml of water. The organic layer was separated, dried over $Na_2SO_4$, filtered through a pad of silica gel 60 (40-63 um), which was additionally washed by 2×50 ml of dichloromethane. The combined filtrate was evaporated under reduced pressure and dried in vacuum to give 21.9 g (90%, purity ca. 75%) of the target product (a ca. 60:40 mixture of two stereoisomers) as a dark-red oil.

Anti- and syn-methyl(pent-4-en-1-yl)silanediyl-bis [$\eta^5$-2-(2-(5-trimethylsilyl)furyl)-4,5-dimethylcyclopentadienyl]zirconium dichloride

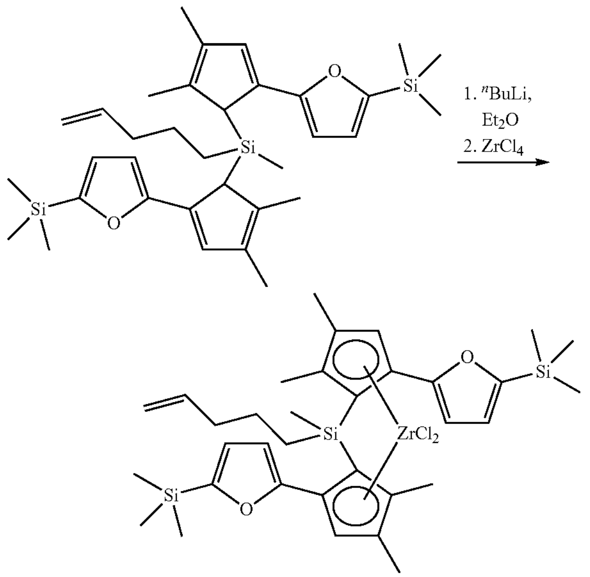

To a cooled to −78° C. solution of 21.85 g (ca. 28.5 mmol) of bis[2-(2-(5-trimethylsilyl)furyl)-4,5-dimethylcyclopenta-2,4-dien-1-yl](methy)pent-4-en-1-ylsilane in 250 ml of ether 31.3 ml (76.1 mmol) of 2.43 M $^n$BuLi in hexanes was added. This mixture was stirred for 4 h at room temperature, then the resulting red solution was cooled to −78° C., and 8.86 g (38.02 mmol) of $ZrCl_4$ was added. The mixture was stirred for 20 h at room temperature (giving dark-red solution with yellow precipitate) which was then evaporated to dryness. The residue was stirred with 100 ml of hot toluene, and the formed suspension was filtered through a glass frit (G4). On the evidence of NMR spectroscopy, the filtrate included a mixture of the isomeric complexes, i.e. anti-complex and two isomeric syn-zirconocenes in a ca. 2:1:1 ratio. This filtrate was evaporated to dryness, the residue was dissolved in a mixture of 25 ml of n-hexane and 100 ml of n-pentane. Yellow solid precipitated from this solution overnight at −30° C. was filtered off (G4) and dried in vacuum. This procedure gave 3.90 g of anti-complex contaminated with syn-admixture. Recrystallization of this sample from a mixture of 10 ml of toluene and 30 ml of n-hexane gave 3.00 g of pure anti-zirconocene dichloride. The mother liquor (obtained after isolation 3.90 g sample) was evaporated to dryness, and the residue was dissolved in 100 ml of n-pentane. Yellow solid precipitated from the obtained solution overnight at −30° C. was filtered off (G4) and dried in vacuum to give 1.85 g of anti-isomer containing trace amount of one of the two syn-complexes. Finally, the mother liquor was evaporated to dryness to the state of dark foam, and this foam was then dissolved in 150 ml of n-pentane. Yellow precipitate fallen from this solution for 2 days at −30° C. was filtered off (G4), washed with 5 ml of toluene and dried in vacuum to give 2.10 g of a 45:55 mixture of anti- and syn-complexes. Recrystallization of this mixture from a mixture of n-hexane and n-pentane gave 0.23 g of one of the two syn-complexes contaminated with ca. 6% of anti-isomer. Thus, the total yield of anti- and syn-complexes was 7.85 g (37.5%). It should be noted that only one of the two syn-isomers was isolated in this reaction.

Anti-methyl(pent-4-en-1-yl)silanediyl-bis[$\eta^5$-2-(2-(5-trimethylsilyl)furyl)-4,5-dimethylcyclopentadienyl]zirconium dichloride (MC1)

Anal. calc. for $C_{34}H_{48}Cl_2O_2Si_3Zr$: C, 55.55; H, 6.58. Found: C, 55.81; H, 6.70.

$^1$H NMR ($CDCl_3$): δ6.71 (2s, 2H), 6.61 (d, J=3.2 Hz, 2H), 6.56 (d, J=3.2 Hz, 1H), 6.52 (d, J=3.2 Hz, 1H), 5.90-5.77 (m, 1H), 5.04 (dm, J=17.1 Hz, 1H), 4.98 (dm, J=10.2 Hz, 1H), 2.28-2.10 (m, 2H), 2.19 (s, 6H), 1.85-1.59 (m, 2H), 1.48 (s, 3H), 1.46 (s, 3H), 1.21 (t, J=8.4 Hz, 2H), 0.73 (s, 3H), 0.29 (s, 9H), 0.28 (s, 9H). $^{13}C\{^1H\}$ NMR ($CDCl_3$): δ159.81, 159.56, 153.28, 153.20, 138.54, 138.31, 138.02, 129.57, 129.13, 128.51, 127.78, 123.06, 122.11, 121.82, 121.74, 114.96, 110.30, 110.17, 99.93, 99.75, 37.22, 22.79, 16.84, 14.47, 14.31, 14.25, 14.00, 0.42, −1.24, −1.39.

Syn-methyl(pent-4-en-1-yl)silanediyl-bis[$\eta^5$-2-(2-(5-trimethylsilyl)furyl)-4,5-dimethylcyclopentadienyl] zirconium dichloride (MC5)

Anal. calc. for $C_{34}H_{48}Cl_2O_2Si_3Zr$: C, 55.55; H, 6.58. Found: C, 55.69; H, 6.76.

$^1$H NMR ($CDCl_3$): δ6.63 (s, 2H), 6.31 (d, J=3.2 Hz, 2H), 6.11 (d, J=3.2 Hz, 2H), 5.93-5.80 (m, 1H), 5.09 (dm, J=17.1 Hz, 1H), 5.04 (dm, J=10.2 Hz, 1H), 2.31-2.23 (m, 2H), 2.28 (s, 6H), 2.00 (s, 6H), 1.85-1.73 (m, 2H), 1.53-1.45 (m, 2H), 0.40 (s, 3H), 0.22 (s, 18H). $^{13}C\{^1H\}$ NMR ($CDCl_3$): δ158.57, 152.38, 138.09, 138.06, 131.29, 129.02, 122.74, 121.42, 115.44, 110.23, 99.49, 37.28, 22.76, 16.54, 15.17, 14.32, 0.34, −1.40.

Rac-dimethylsilanediyl-bis[$\eta^5$-2-(2-(5-dimethylphenylsilyl)furyl)-4,5-dimethylcyclopentadienyl]zirconium dichloride (MC2, inventive)

Multi-Step Complex Preparation:

2-Furyl(dimethyl)phenylsilane

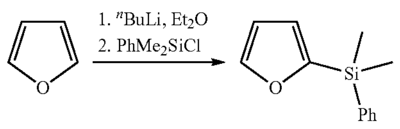

To a solution of 25.0 g (367 mmol) of furan in 165 ml of ether, cooled in an ice bath, 123.5 ml (300 mmol) of 2.43 M $^n$BuLi in hexanes was added dropwise over ca. 40 min. The resulting mixture was stirred for 3.5 h at room temperature, then the formed suspension was cooled to −78° C., and 50.0 ml (51.6 g, 302 mmol) of chloro(dimethyl)phenylsilane was added in one portion. The resulting mixture was stirred for 40 h at room temperature. The formed suspension was filtered through a pad of silica gel 60 (40-63 um), which was additionally washed with 3×50 ml of dichloromethane. The combined filtrate was evaporated under reduced pressure, and the residue was distilled in vacuum (b.p. 79° C./3-4 mm Hg) to give 56.6 g (93%) of 2-furyl(dimethyl)phenylsilane as a colourless liquid.

$^1$H NMR ($CDCl_3$): δ7.67 (d, J=1.6 Hz, 1H), 7.58-7.53 (m, 2H), 7.38-7.33 (m, 3H), 6.67 (d, J=3.2 Hz, 1H), 6.38 (dd, J=3.2 Hz, J=1.6 Hz, 1H), 0.54 (s, 6H). $^{13}C\{^1H\}$ NMR ($CDCl_3$): δ158.14, 147.11, 136.95, 133.91, 129.37, 127.85, 121.02, 109.41, −2.91.

1-[2-(5-Dimethylphenylsilyl)furyl]-3,4-dimethylcyclopenta-1,3-diene

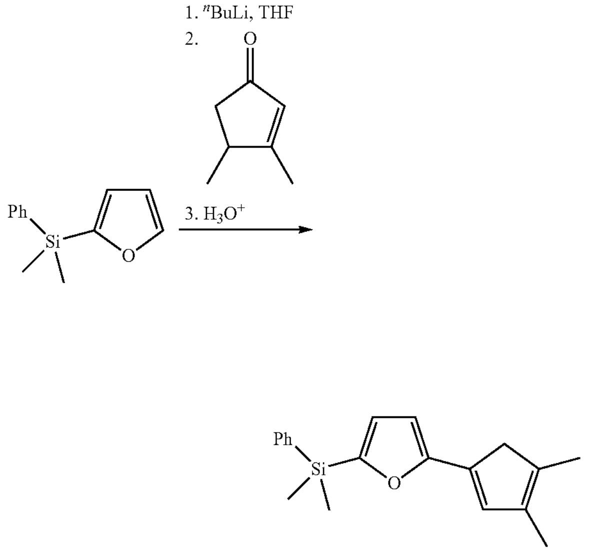

To a cooled to −78° C. solution of 20.2 g (100 mmol) of 2-furyl(dimethyl)phenylsilane in 150 ml of THF 41.2 ml (100.1 mmol) of 2.43 M $^n$BuLi in hexanes was added dropwise. The resulting mixture was stirred for 20 h at room temperature, then cooled to −30° C., and a solution of 11.0 g (100 mmol) of 3,4-dimethylcyclopent-2-en-1-one in 60 ml of THF was added dropwise by vigorous stirring. The resulting solution was stirred overnight at room temperature, then cooled in an ice bath, and 200 ml of 5 N HCl was added. This mixture was transferred into a separatory funnel, 600 ml of ether was added, and the obtained mixture was shaken for 1 min. The organic layer was separated, washed with 3×150 ml of water, dried over $Na_2SO_4$, and then evaporated to dryness. The residue was purified by flash column chromatography on silica gel 60 (40-63 um; eluent: hexane) to give 25.9 g (88%, purity ca. 90%) of the target product as a reddish oily liquid.

$^1$H NMR ($CDCl_3$): δ7.59-7.56 (m, 2H), 7.38-7.33 (m, 3H), 6.62 (d, J=3.2 Hz, 1H), 6.57 (br.s, 1H), 6.21 (d, J=3.2 Hz, 1H), 3.21 (s, 2H), 1.94 (s, 3H), 1.87 (s, 3H), 0.54 (s, 6H). $^{13}C\{^1H\}$ NMR ($CDCl_3$): δ157.01, 156.14, 137.36, 135.34, 135.14, 133.97, 132.89, 131.37, 129.24, 127.80, 122.95, 104.15, 44.75, 13.35, 12.54, −2.75.

Bis[2-(2-(5-dimethylphenylsilyl)furyl)-4,5-dimethyl-cyclopenta-2,4-dien-1-yl]dimethylsilane

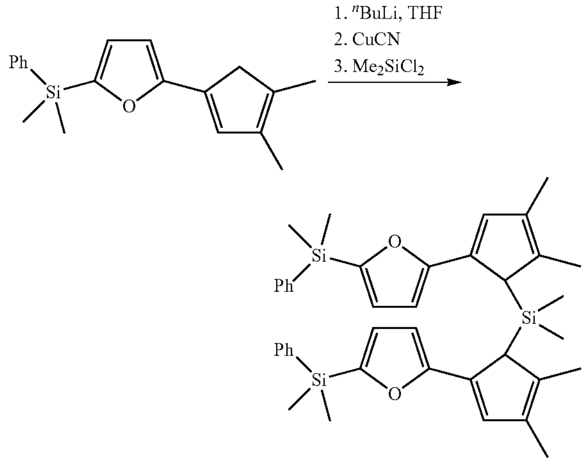

To a cooled to −78° C. solution of 25.9 g (87.9 mmol) of 1-[2-(5-dimethylphenylsilyl)furyl]-3,4-dimethylcyclopenta-1,3-diene in 200 ml of THF 36.2 ml (88.0 mmol) of 2.43 M $^n$BuLi in hexanes was added. The resulting dark-red solution was stirred for 3 h at room temperature, then cooled to −50° C., and 300 mg of CuCN was added. The obtained mixture was stirred for 15 min at −25° C., then 5.67 g (55.56 mmol) of dichlorodimethylsilane was added in one portion. This mixture was stirred overnight at room temperature. The solvents were removed on rotary evaporator, to the dark-red residue 700 ml of dichloromethane was added, and the resulting mixture was washed with 800 ml of water. The organic layer was separated, dried over $Na_2SO_4$, filtered through a pad of silica gel 60 (40-63 um), the latter was additionally washed with 2×50 ml of dichloromethane. The combined filtrate was evaporated under reduced pressure, and the residue was dried in vacuum to give 25.6 g (90%, purity ca. 80%) of the target pro-ligand (as a ca. 1:1 mixture of two stereoisomers) as a dark-red oil.

$^1$H NMR ($CDCl_3$): δ7.57-7.46 (m, 4H), 7.39-7.26 (m, 6H), 6.59 (d, J=3.2 Hz), 6.57 (br.s) and 6.57 (d, J=3.2 Hz) {sum 4H}, 6.24 (d, J=3.2 Hz) and 6.07 (d, J=3.2 Hz) {sum 2H}, 4.07 (s) and 3.70 (s) {sum 2H}, 2.13 (s), 1.98 (s), 1.88 (s) and 1.87 (s) {sum 12H}, 0.51 (s), 0.50 (s), 0.48 (s) and 0.46 (s) {sum 12H}, −0.45 (s), −0.72 (s) and −0.78 (s) {sum 6H}.

Rac-dimethylsilanediyl-bis[η$^5$-2-(2-(5-dimethylphenylsilyl)furyl)-4,5-dimethylcyclopentadienyl]zirconium dichloride (MC2)

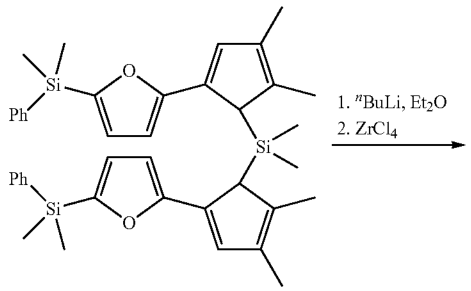

-continued

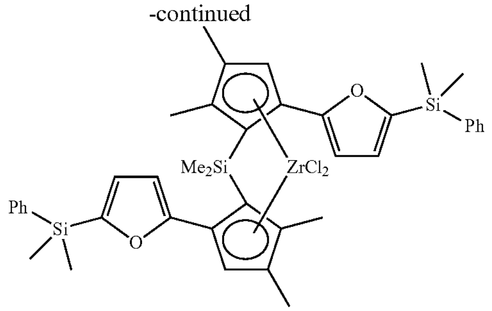

To a cooled to −78° C. solution of 25.6 g (ca. 39.7 mmol) of bis[2-(2-(5-dimethylphenylsilyl)furyl)-4,5-dimethylcyclopenta-2,4-dien-1-yl]dimethylsilane in 300 ml of ether 32.6 ml (79.2 mmol) of 2.43 M $^n$BuLi in hexanes was added. This mixture was stirred overnight at room temperature, then the resulting brown suspension with a lot of white precipitate was cooled to −78° C., and 9.25 g (39.7 mmol) of $ZrCl_4$ was added. The reaction mixture was stirred for 24 h at room temperature to give dark-red solution with yellow precipitate. The precipitate was filtered off. The filtrate was evaporated to ca. 30 ml, and then 30 ml of n-hexane was added. Yellow powder (a mixture of the target complex with LiCl) precipitated from this mixture was filtered off, washed with n-hexane, and then added to the above-isolated precipitate. Thus obtained solid was stirred with 50 ml of hot toluene (almost at reflux), and the formed suspension was filtered through a glass frit (G4). The filtrate was evaporated to ca. 25 ml, heated to ca. 60° C., and then 30 ml of n-hexane was added. Yellow powder precipitated from this solution overnight at room temperature was filtered off (G4), dried in vacuum to give 4.82 g of the target complex. The mother liquor was evaporated to ca. 5 ml, and 25 ml of hexane was added. Yellow solid precipitated from thus obtained mixture overnight at room temperature was collected (G4) and then dried in vacuum. This procedure gave extra 0.7 g of the title zirconocene. Thus, the total yield of the target rac-complex was 5.52 g (17%).

Anal. calc. for $C_{40}H_{46}Cl_2O_2Si_3Zr$: C, 59.67; H, 5.76. Found: C, 59.95; H, 5.81.

$^1$H NMR ($CDCl_3$): δ7.58-7.52 (m, 2H), 7.41-7.31 (m, 3H), 6.69 (s, 1H), 6.65 (d, J=3.3 Hz, 1H), 6.55 (d, J=3.3 Hz, 1H), 2.16 (s, 3H), 1.35 (s, 3H), 0.56 (s, 3H), 0.55 (s, 3H), 0.54 (s, 3H). $^{13}$C{$^1$H} NMR ($CDCl_3$): δ157.60, 154.01, 138.23, 136.56, 134.06, 129.42, 128.77, 128.18, 127.80, 123.41, 122.01, 110.19, 100.06, 14.22, 14.18, 3.34, −2.65, −3.05.

Rac- and meso-dimethylsilanediyl-bis[η$^5$-2-(2-(5-trimethylsilyl)furyl)-4-tert-butylcyclopentadienyl] zirconium dichloride (MC6 and MC7, comparative)

Multi-Step Complex Preparation:

Ethyl 2-acetyl-5,5-dimethyl-4-oxohexanoate

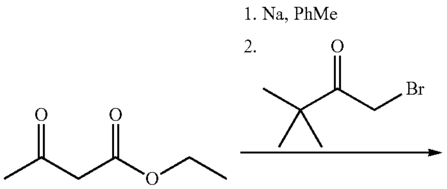

-continued

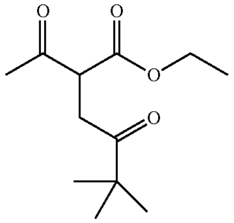

12.5 g (544 mmol, 1.66 equiv.) of sodium was added to 360 ml of toluene followed by 132 ml (1.04 mol, 3.16 equiv.) of ethyl acetoacetate. A vigorous exothermic reaction with evolution of molecular hydrogen took place after a minute and subsided after ca. 10 min. The reaction mixture was then stirred for 2 h at room temperature. To the resulting heterogeneous mixture 58.8 g (329 mmol) of 1-bromo-3,3-dimethylbutan-2-one was added dropwise, and the reaction mixture was stirred overnight at room temperature. The resulting mixture was cooled in an ice bath and then treated with 400 ml of water. Further on, another 400 ml of water was added, the organic layer was separated, and the aqueous layer was extracted with 400 ml of ether. The combined organic extract was dried over $Na_2SO_4$, evaporated, and an excess of ethyl acetoacetate was removed by distillation in vacuo (b.p. ≤65° C./6 mm Hg) to give 79.3 g (ca. 100%) of the target product which was further used without an additional purification.

$^{1}$H NMR ($CDCl_3$): δ4.19 (q, J=7.2 Hz, 2H), 4.01 (dd, J=8.3 Hz, J=5.6 Hz, 1H), 3.23 (dd, J=18.5 Hz, J=8.3 Hz, 1H), 3.02 (dd, J=18.5 Hz, J=5.6 Hz, 1H), 2.37 (s, 3H), 1.28 (t, J=7.2 Hz, 3H), 1.17 (s, 9H). $^{13}C\{^{1}H\}$ NMR ($CDCl_3$): δ213.36, 202.49, 168.92, 61.57, 53.67, 43.77, 35.70, 30.18, 26.39, 13.95.

3-tert-Butylcyclopent-2-en-1-one

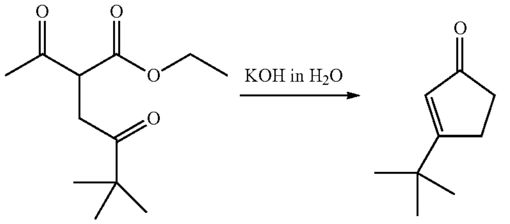

1 L of hot water was added to 37.5 g (164.3 mmol) of ethyl 2-acetyl-5,5-dimethyl-4-oxohexanoate (prepared above). To this mixture a solution of 110 g (1.96 mol) of KOH in 500 ml of water was added dropwise over 1 h at reflux. The reaction mixture was refluxed over 8 h, cooled to room temperature, and then extracted with 3×400 ml of ether. The combined extract was dried over $Na_2SO_4$, filtered through a pad of silica gel 60 (40-63 um), and then evaporated to dryness to give 18.0 g of the crude product contaminated with ca. 15% of 6,6-dimethylheptane-2,5-dione[1]. This crude product originated from four similar syntheses was combined and distilled in vacuum to obtain fractions with different purity of 3-tert-butylcyclopent-2-en-1-one, including the fraction of 3-tert-butylcyclopent-2-en-1-one of ca. 95% purity, which had a higher boiling point than 6,6-dimethylheptane-2,5-dione. Thus, the calculated yield of the target product (given $^{1}$H NMR data of pure 3-tert-butylcyclopent-2-en-1-one) was 52.0 g (57%), and 6,6-dimethylheptane-2,5-dione—8.77 g (8.5%). It was shown, that a mixture of 3-tert-butylcyclopent-2-en-1-one with diketone can be used for the subsequent synthesis of the substituted cyclopentadiene.

[1] The increase in reaction time to 11 hours led to a decrease in the 6,6-dimethylheptane-2,5-dione content to 10% without reducing the mass of the resulting mixture $^{1}$H NMR ($CDCl_3$): δ5.95 (t, J=1.7 Hz, 1H), 2.67-2.63 (m, 2H), 2.44-2.40 (m, 21-1), 1.2 (s, 9H). $^{13}C\{^{1}H\}$ NMR ($CDCl_3$): δ210.54, 191.11, 127.21, 35.41, 35.11, 28.68, 27.58.

1-tert-Butyl-3-[2-(5-trimethylsilyl)furyl]cyclopenta-1,3-diene

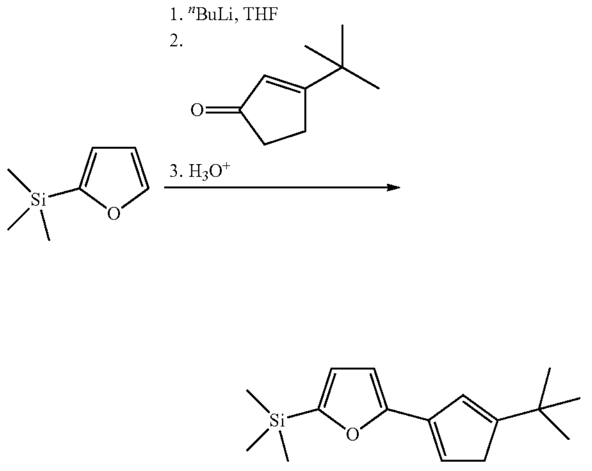

To a cooled to −78° C. solution of 22.2 g (158 mmol) of 2-trimethylsilylfuran in 230 ml of THF 65.2 ml (158 mmol) of 2.43 M $^{n}$BuLi in hexanes was added dropwise. The resulting mixture was stirred for 7.5 h at room temperature, then cooled to −35° C., and 20.0 g of 3-tert-butylcyclopent-2-en-1-one of 89% purity [containing ca. 11% of 6,6-dimethylheptane-2,5-dione, so the added mixture contained 17.55 g (127 mmol) of 3-tert-butylcyclopent-2-en-1-one and 2.45 g (15.68 mmol) of 6,6-dimethylheptane-2,5-dione] was added in one portion. The resulting solution was stirred overnight at room temperature, then cooled in an ice bath, and 200 ml of 4 N HCl was added. This mixture was transferred into a separatory funnel, 500 ml of ether was added, and the obtained mixture was shaken for 1 min. The organic layer was separated, washed with 3×200 ml of water, dried over $Na_2SO_4$, and then evaporated to dryness. The residue was purified by flash column chromatography on silica gel 60 (40-63 um; eluent: hexane) to give 27.5 g (83% based on 3-tert-butylcyclopent-2-en-1-one in a mixture) of the target product (a mixture of two double bond regioisomers in a ca. 88:12 ratio) as an orange oily liquid which spontaneously solidified at room temperature.

$^{1}$H NMR ($CDCl_3$): δ6.83 (m, 1H), 6.59 (d, J=3.2 Hz, 1H), 6.27 (d, J=3.2 Hz, 1H), 5.89 (“q”, J=1.7 Hz, 1H), 3.27 (“t”, J=1.4 Hz, 2H), 1.2 (s, 9H), 0.28 (s, 9H). $^{13}C\{^{1}H\}$ NMR ($CDCl_3$): δ158.86, 157.62, 156.36, 137.02, 127.12, 121.29, 121.01, 104.93, 40.01, 32.20, 29.70, −1.48.

Bis[2-(2-(5-trimethylsilyl)furyl)-4-tert-butylcyclopenta-2,4-dien-1-yl]dimethylsilane

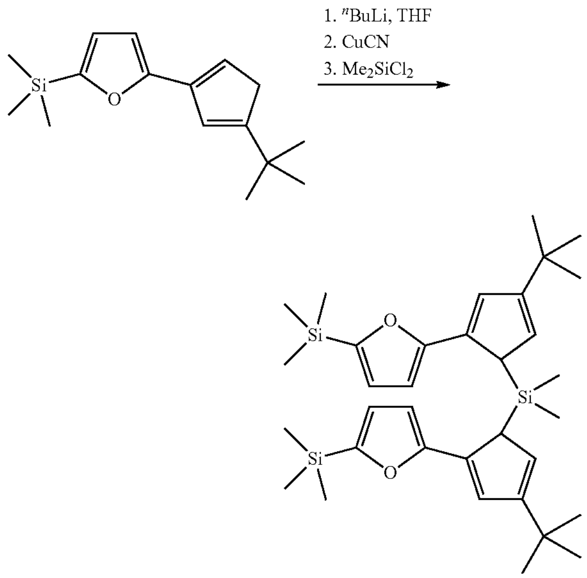

To a cooled to −50° C. solution of 25.5 g (97.9 mmol) of 1-tert-butyl-3-[2-(5-trimethylsilyl)furyl]cyclopenta-1,3-diene in 200 ml of THF 40.3 ml (97.9 mmol) of 2.43 M $^{n}$BuLi in hexanes was added. The resulting dark-red solution was stirred for 3.5 h at room temperature, then cooled to −50° C., and 300 mg of CuCN was added. The obtained mixture was stirred for 15 min at −25° C., then 6.32 g (49.0 mmol) of dichlorodimethylsilane was added in one portion. This mixture was stirred overnight at room temperature. The solvents were removed on rotary evaporator, to the dark-red residue 600 ml of dichloromethane was added, and the resulting mixture was washed with 800 ml of water. The organic layer was separated, dried over $Na_2SO_4$, filtered through a pad of silica gel 60 (40-63 um), which was additionally washed with 2×50 ml of dichloromethane. The combined filtrate was evaporated under reduced pressure. The resulting dark-red oil was dissolved in 500 ml of n-hexane, the obtained suspension was filtered through a pad of silica gel 60 (40-63 um), which was additionally washed with 3×50 ml of n-hexane. The filtrate was evaporated and dried in vacuum to give 25.4 g (90%, purity ca. 90%) of bis[2-(2-(5-trimethylsilyl)furyl)-4-tert-butylcyclopenta-2,4-dien-1-yl]dimethylsilane (a ca. 1:1 mixture of two stereoisomers) as a light-red oil.

$^{1}$H NMR ($CDCl_3$): δ6.85-6.82 (m, 2H), 6.58 (d, J=3.2 Hz) and 6.57 (d, J=3.2 Hz) {sum 2H}, 6.29 (d, J=3.2 Hz) and 6.27 (d, J=3.2 Hz) {sum 2H}, 6.17 (m) and 6.11 (m) {sum 2H}, 3.87 (d, J=1.2 Hz) and 3.66 (d, J=1.2 Hz) {sum 2H}, 1.24 (s) and 1.19 (s) {sum 18H}, 0.23 (s) and 0.22 (s) {sum 18H}, −0.36 (s), −0.44 (s) and −0.50 (s) {sum 6H}. $^{13}C\{^{1}H\}$ NMR ($CDCl_3$): δ158.41, 158.40, 156.50, 156.43, 156.09, 155.78, 138.14, 138.03, 126.69, 126.59, 124.53, 123.75, 121.37 (two resonances), 104.90, 104.82, 48.75, 47.78, 32.30, 32.24, 30.41, 30.38, −1.43, −1.46, −4.29, −6.52, −6.76.

Rac- and meso-dimethylsilanediyl-bis[$\eta^5$-2-(2-(5-trimethylsilyl)furyl)-4-tert-butylcyclopentadienyl] zirconium dichloride

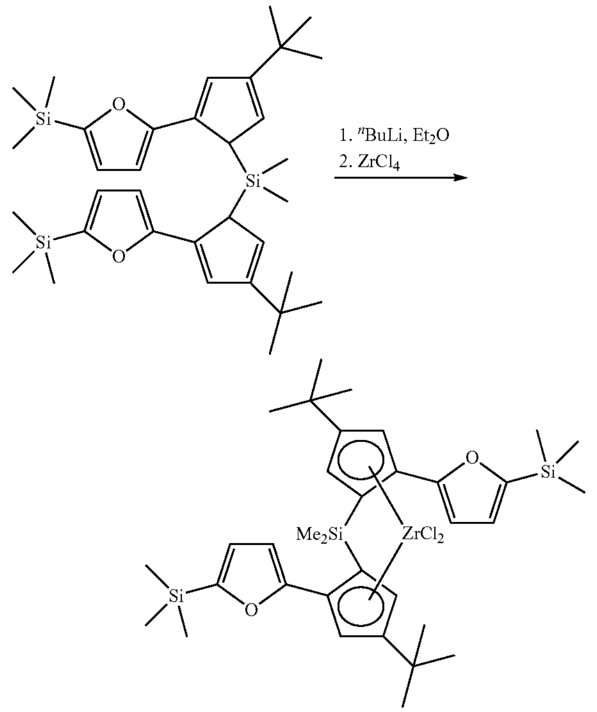

To a cooled to −78° C. solution of 25.4 g (44.0 mmol) of bis[2-(2-(5-trimethylsilyl)furyl)-4-tert-butylcyclopenta-2,4-dien-1-yl]dimethylsilane in 350 ml of ether 36.2 ml (88.0 mmol) of 2.43 M $^{n}$BuLi in hexanes was added. This mixture was stirred overnight at room temperature, then the resulting red solution was cooled to −78° C., and 10.3 g (44.2 mmol) of $ZrCl_4$ was added. The reaction mixture was stirred for 24 h at room temperature to give dark-red solution with yellow precipitate. This mixture was evaporated to dryness. The residue was stirred with 200 ml of hot toluene, and the formed suspension was filtered through a glass frit (G4). This filtrate was evaporated to ca. 100 ml. Light-orange precipitate fallen from this solution for 3 h at room temperature was washed with 10 ml of toluene and then dried in vacuum. This procedure gave 9.70 g (30%) of pure rac-complex. The mother liquor was evaporated to ca. 10 ml, the formed solution was heated to ca. 60° C., and then 30 ml of n-hexane was added. Yellow powder (meso-complex contaminated with 5% of rac-isomer) and red crystals (a ca. 4:1 mixture of rac- and meso-comp) precipitated from this solution overnight at room temperature were filtered off (G4) to give 9.30 g of meso-zirconocene contaminated with ca. 15% of rac-complex. The mother liquor was evaporated almost to dryness, and the residue was dissolved in 40 ml of n-hexane. Yellow solid precipitated from the resulting mixture overnight at room temperature was filtered off (G4) and dried in vacuum. This procedure gave 3.50 g of a mixture of meso-/rac-complexes in a 67:43 ratio. Thus, the total yield of rac- and meso-zirconocene dichloride was 22.5 g (69%). To the yellow powder from the second fraction (9.30 g, yellow powder with red crystals) 120 ml of n-hexane was added, the yellow powder was shortly dissolved, and the red crystals were immediately filtered off (G3). The filtrate was evaporated to dryness, and the residue was recrystallized from a mixture of 7 ml of toluene and 15 ml of n-hexane to give 4.50 g (14%) of pure meso-dimethylsilanediyl-bis[$\eta^5$-2-(2-(5-trimethylsilyl)furyl)-4-tert-butylcyclopentadienyl] zirconium dichloride.

Rac-dimethylsilanediyl-bis[$\eta^5$-2-(2-(5-trimethylsilyl)furyl)-4-tert-butylcyclopentadienyl]-zirconium dichloride (MC6)

Anal. calc. for $C_{34}H_{50}Cl_2O_2Si_3Zr$: C, 55.40; H, 6.84. Found: C, 55.64; H, 7.02.

$^1$H NMR ($CDCl_3$): δ6.75 (d, J=2.5 Hz, 2H), 6.67 (d, J=3.3 Hz, 2H), 6.54 (d, J=3.3 Hz, 2H), 5.54 (d, J=2.5 Hz, 2H), 1.26 (s, 18H), 0.84 (s, 6H), 0.33 (s, 18H). $^{13}C\{^1H\}$ NMR ($CDCl_3$): δ159.89, 153.94, 153.36, 124.98, 123.70, 122.07, 111.58, 109.47, 103.22, 33.89, 30.16, −0.09, −1.31.

Meso-dimethylsilanediyl-bis[$\eta^5$-2-(2-(5-trimethylsilyl)furyl)-4-tert-butylcyclopentadienyl]-zirconium dichloride (MC7)

Anal. calc. for $C_{34}H_{50}Cl_2O_2Si_3Zr$: C, 55.40; H, 6.84. Found: C, 55.77; H, 7.09.

$^1$H NMR ($CDCl_3$): δ6.82 (d, J=2.5 Hz, 2H), 6.25 (d, J=3.3 Hz, 2H), 6.07 (d, J=3.3 Hz, 2H), 5.69 (d, J=2.5 Hz, 2H), 1.35 (s, 18H), 1.04 (s, 3H), 0.74 (s, 3H), 0.28 (s, 18H). $^{13}C\{^1H\}$ NMR ($CDCl_3$): δ158.44, 152.94, 152.89, 127.08, 124.46, 122.28, 111.97, 108.47, 101.59, 34.10, 30.35, 1.77, −1.36, −2.89.

Catalyst Preparation

All catalyst examples (except CE1 which was used as received), were prepared based on the described metallocene complexes MC1-MC7 using two largely different catalyst preparation methods. One-step catalyst preparation method is described in Experiment 1 section, while the two-step catalyst preparation method is described in Experiment 2 section. MC7 complex was used only in two-step preparation method.

Inventive Catalysts

Inventive catalysts IC1-1 and IC1-2 are based on anti- or rac-form MC1:

(MC1)

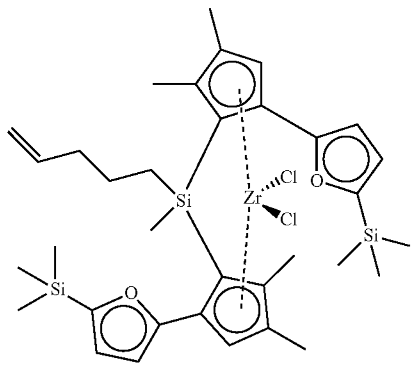

Inventive catalysts IC2-1 and IC2-2 are based on rac-form MC2:

(MC2)

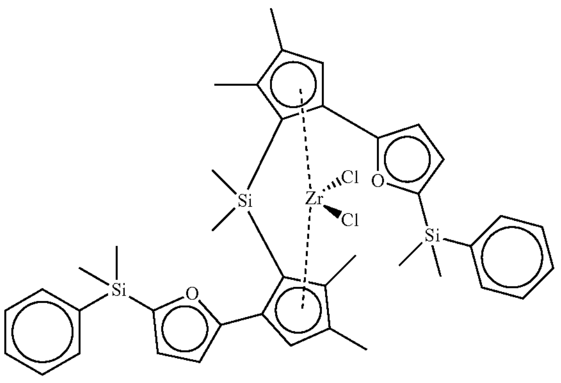

Inventive catalysts IC3-1 and IC3-2 are based on rac-form MC3:

(MC3)

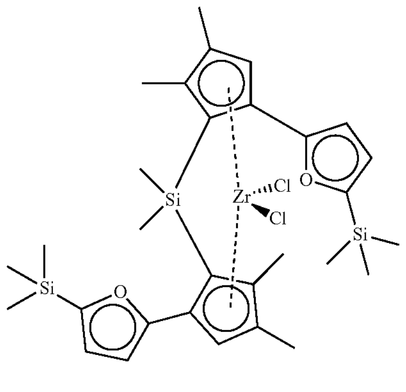

Comparative Catalysts

Comparative catalyst CE1 is an alumoxane-containing silica-supported catalyst containing metallocene Bis(1-methyl-3-n-butylcyclopentadienyl)zirconium dichloride (MC4) and is based on the enhanced ActivCat® activation technology from Grace, received in ready form as a slurry in mineral oil.

(MC4)

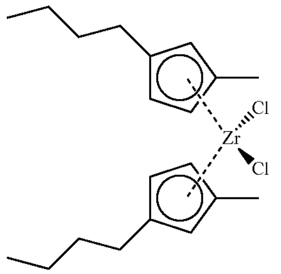

Comparative catalysts CE2-1 and CE2-2 are based on the same Bis(1-methyl-3-n-butylcyclopentadienyl)zirconium dichloride complex MC4, similarly to CE1 catalyst, but prepared using the same procedures as other prepared catalyst examples.

Comparative catalysts CE3-1 and CE3-2 are based on the syn- or meso-form MC5:

(MC5)

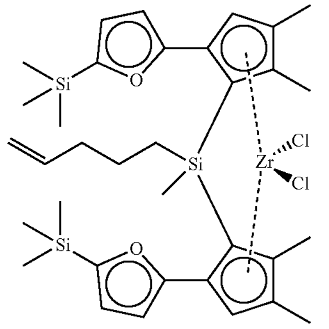

Comparative catalysts CE4-1 and CE4-2 are based on the rac-form MC6:

(MC6)

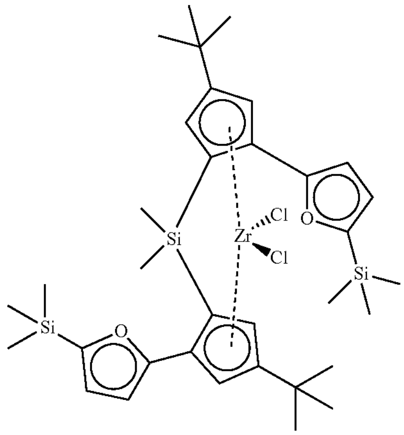

Comparative catalyst CE5-2 is based on the meso-form MC7:

(MC7)

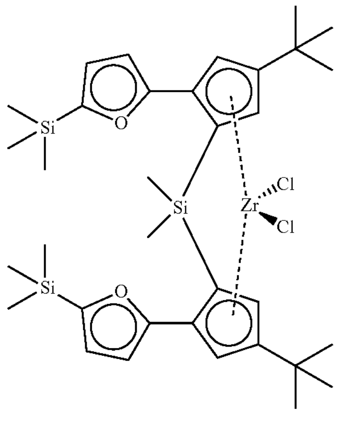

Polymerisation Examples

All the inventive and comparative catalysts were tested in bench-scale Ethylene copolymerisation in same conditions targeting particular gas phase split (58%), meaning that as soon as a certain designated amount of Ethylene was consumed during the slurry phase polymerisation stage, the reactor was switched to the gas phase stage, which was stopped when overall target consumption of Ethylene was reached. In cases when the gas phase split could not be reached due to low catalyst activity, the gas phase stage was terminated prematurely due to total experiment time limitations (see marked with asterisk * values in Table 1 and Table 2).

General Bench-Scale Multi-Stage Ethylene Copolymerisation Method

All polymerisations were done in a stirred autoclave with a volume of 5.3 L. The evacuated autoclave is filled with 700 g of Propane. 0.12 mmol of Triethylaluminium scavenger (0.62 mol/L solution in Heptane) is added using a stream of additional 100 g of Propane. 16 g of Ethylene and 2.7 g of 1-Butene are added and the reactor is heated up to the desired prepolymerisation temperature of 60° C. Approximately 100 mg of catalyst is weighed into a steel vial inside a glovebox and suspended in 3 mL of Heptane (8 mL in case a catalyst is an oil slurry). The vial is then attached to the polymerisation autoclave and the suspension is flushed into the reactor with 200 g of Propane.

For prepolymerisation, the reactor is stirred at 60° C. The pressure is kept constant at 21.1 barg by feeding Ethylene with a flow meter. After consumption of 10 g of Ethylene or exceeding 45 min run time, the temperature is increased to 85° C. Next, 12 mg of Hydrogen and 5.4 g of 1-Butene are fed into the reactor. In parallel, Ethylene is fed until the desired polymerisation pressure of 36.9 barg is reached.

For slurry phase polymerisation, the reactor is stirred at 85° C. The pressure is kept constant by feeding Ethylene, 1-Butene and Hydrogen in fixed ratios (Butene/Ethylene=0.035 g/g and Hydrogen/Ethylene=0.000068 g/g). After consumption of 200 g of Ethylene, the reaction is stopped by venting and evacuating the reactor.

For gas phase polymerisation, the reactor temperature is set to 75° C. It is refilled with Propane until a pressure of 10 barg is reached. 1.3 mg of Hydrogen and 10.5 g of 1-Hexene are fed into the reactor. In parallel, Ethylene is fed until the reactor pressure reaches 20 barg. During polymerisation, the pressure is kept constant by feeding Ethylene, 1-Hexene and Hydrogen in a fixed ratio (Hexene/Ethylene=0.064 g/g and Hydrogen/Ethylene=0.000038 g/g). After consumption of 278 g of Ethylene, the reaction is stopped by venting the reactor. In case of too low activity (e.g. <1 kg/(g·h)), the reaction is stopped before reaching the desired Ethylene consumption.

Experiment 1: One-Step Catalyst Preparation and Polymerisation Examples

Metallocene complexes MC1-MC6 in this experiment were employed using a single step catalyst preparation procedure comprising the mixture of a metallocene and alumoxane during the impregnation. As a result, inventive catalysts IC1-1-IC3-1, as well as comparative catalysts CC2-1-CC4-1 were prepared as described in the below one-step catalyst preparation method.

General One-Step Catalyst Preparation Method

A pre-contact mixture, obtainable by dissolution of 140 μmol of metallocene in Methylaluminoxane solution (14 mmol Al as 30 wt % MAO solution in Toluene) and 1.6-2.0 mL of additional Toluene, is stirred for 1-2 hours in a glass vial at room temperature in Nitrogen atmosphere. The obtained solution is then added drop-wise within 5 minutes to 2 g of pre-treated silica carrier in a glass reactor under gentle mechanical stirring at 10-30° C. The crude catalyst is then gently mixed for 1 hour further and left to stand for further 17 hours. The catalyst is then dried in vacuo for 30-60 minutes at 60° C.

TABLE 1

Bimodal multi-stage copolymerisation with inventive and comparative catalyst examples obtained using one-step catalyst preparation method.

| | Polymerisation example | | | | | | |
|---|---|---|---|---|---|---|---|
| | IE1-1 | LE2-1 | IE3-1 | CE1-1 | CE2-1 | CE3-1 | CE4-1 |
| Catalyst | IC1-1 | IC2-1 | IC3-1 | CC1 | CC2-1 | CC3-1 | CC4-1 |
| Metallocene in catalyst | MC1 | MC2 | MC3 | MC4 | MC4 | MC5 | MC6 |
| Loading Zr/$SiO_2$, μmol/g | 70 | 70 | 70 | | 70 | 70 | 70 |
| Loading Al/$SiO_2$, mmol/g | 7 | 7 | 7 | | 7 | 7 | 7 |
| Loading Al/Zr ratio | 100 | 100 | 100 | | 100 | 100 | 100 |
| Zr content, wt % | 0.307 | 0.317 | 0.349 | | 0.279 | 0.326 | 0.277 |
| Al content, wt % | 12.4 | 12.2 | 12.7 | | 11.7 | 12.4 | 11 |
| Al/Zr ratio, mol/mol | 137 | 130 | 123 | | 142 | 129 | 134 |
| Volatiles content, wt % | 0.51 | <0.2 | <0.2 | | 1.27 | <0.2 | 2.61 |
| Catalyst amount used (dry basis), mg | 106 | 105 | 109 | 94 | 104 | 104 | 102 |
| SP time, min | 87 | 171 | 89 | 83 | 150 | 127 | 165 |
| GP time, min | 52 | 48 | 60 | 73 | 129* | 116 | 55* |
| SP Activity, kgPE/(gcat · h) | 1.4 | 0.7 | 1.3 | 1.6 | 0.7 | 0.9 | 0.3 |
| GP Activity, kgPE/(gcat · h) | 3.2 | 3.5 | 2.7 | 2.6 | 0.6 | 1.5 | 0.2 |
| GP/SP Activity Ratio | 2.4 | 5.1 | 2.1 | 1.6 | 0.9 | 1.6 | 0.8 |
| Polymer yield, g | 502 | 496 | 503 | 502 | 293 | 490 | 67* |
| GP split, wt % | 58 | 58 | 59 | 59 | 42 | 58 | 19 |
| $MFR_2$, g/10 min | 1.0 | 1.0 | 0.6 | 2.2 | 3.0 | 2.5 | 230 |
| Density, kg/$m^3$ | 923.3 | 921.9 | 921.3 | 928.7 | 932.7 | 932.2 | 949.8 |
| 1-Butene content in polymer, wt % | 1.1 | 1.2 | 1.0 | 0.4 | 0.7 | 0.6 | 0.9 |
| 1-Hexene content in polymer, wt % | 4.1 | 4.2 | 4.1 | 4.1 | 2.5 | 3.4 | 2.0 |
| 1-Butene in SP material (calc.), wt % | 2.6 | 2.9 | 1.8 | 1.1 | 1.2 | 1.3 | 1.1 |
| 1-Hexene in GP material (calc.), wt % | 7.0 | 7.2 | 7.1 | 6.9 | 6.0 | 5.8 | 10.4 |

All inventive catalysts IC1-1-IC3-1 and comparative catalysts CC1, CC2-1-CC4-1 were used in copolymerisation in a multi-stage configuration comprising a prepolymerisation, slurry phase polymerisation and gas phase polymerisation. Polymerisation conditions are described above as the "General bench-scale multi-stage Ethylene copolymerisation method" and the corresponding copolymerisation inventive examples IE1-1-IE3-1 and comparative examples CE1-1-CE4-1 are disclosed in Table 1. Comparative CC1 was used in polymerisation as received, in oil slurry form.

DISCUSSION

As can be seen from the Table 1, from kinetic curves in FIGS. 1-2 and from the performance plots for corresponding polymerisation examples in FIGS. 3, 4, 6-9, the inventive catalysts IC1-1, IC2-1 and IC3-1 surprisingly demonstrated (when prepared using the described one-step method) a better ratio of gas phase activity to slurry phase activity, higher and more stable gas phase performance compared to the comparative examples CC1 and CC2-1-CC4-1. A major issue with multi-stage polymerisation is ensuring sufficient catalytic activity in the gas phase relative to the slurry phase. The loop/gas phase process is a multi-stage process with two or more reactors in series, hence with a catalyst that deactivates too soon, the process is not able to produce multimodal polymers with a high fraction (split) of the later reactors. Alternatively viewed, a catalyst that is still highly active in the gas phase stage enables production of a larger fraction of the polymer in the gas phase reactor, often leading to superior product properties. The described herein inventive catalysts in addition possess high comonomer sensitivity as reflected in the polymer higher comonomer content, lower density of the inventive polymerisation examples and higher polymer molecular weight capability, relative to the comparative catalysts.

Comparison of IE1-1 to IE3-1 indicates an importance of metallocene backbone bridge substitution with alkenyl moieties (MC1 complex in IC1-1), to provide some increase of catalyst performance compared to mere short alkyl substitution.

Comparison of IE2-1 to IE3-1 reveals a surprising effect of slight boost to the gas phase activity by introducing a phenyl substitution into peripheral trimethylsilyl moieties (MC2 complex in IC2-1).

Comparison of IE1-1 to CE3-1 demonstrates the importance of selective utilisation of pure stereoisomeric forms (in most cases rac-forms) for best performance (MC1 complex in IC1-1 versus MC5 complex in CC3-1).

Comparison of IE1-1, IE2-1 to CE4-1 (negative effect of tert-butyl substitution of MC6 complex on performance of its catalyst CC4-1) underlines the importance of careful selection of metallocene structure, e.g. the substitution pattern within the same metallocene type (here, bridged furyl-substituted bis-Cp complexes) when high performance is concerned.

Figure 3:
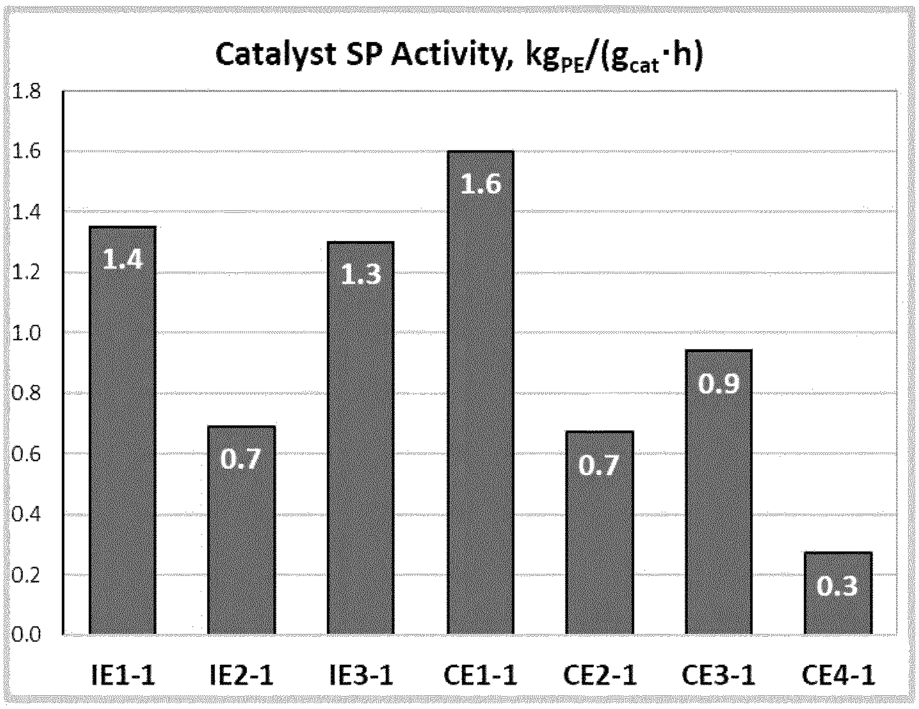
FIG. 3 shows catalyst activity in the slurry phase for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).
Figure 4:
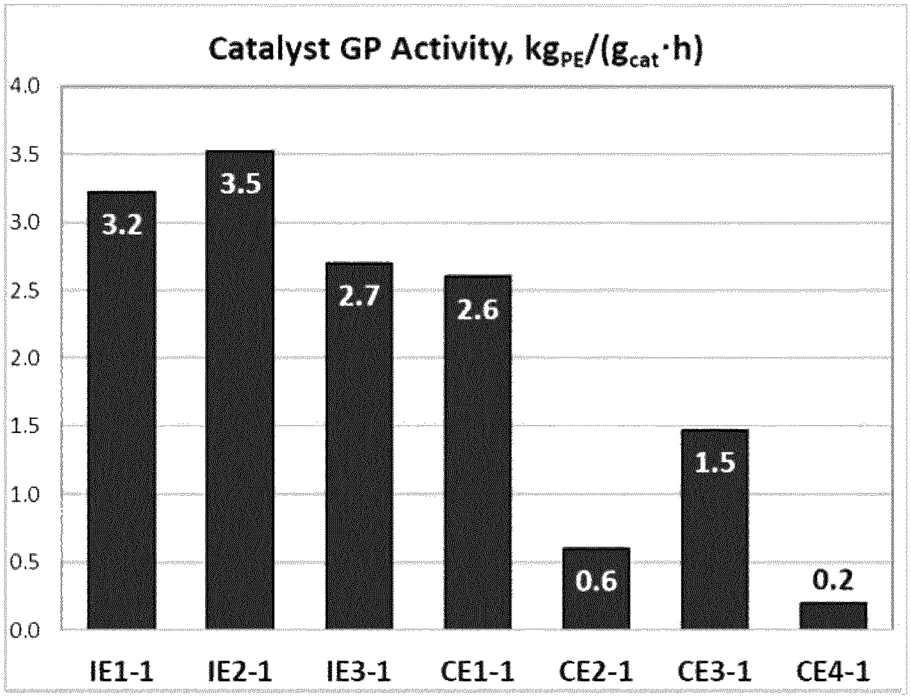
FIG. 4 shows catalyst activity in the gas phase for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

In slurry phase, in terms of catalyst activity, both IC1-1 and IC3-1 had a comparable but somewhat lower activity compared to CC1 (FIG. 3). In gas phase however, a reversed situation is observed. All three inventive catalysts IC1-1 to IE3-1 are superior in terms of catalyst activity in gas phase compared to catalysts CC1 and CC2-1-CC4-1 (FIG. 4).

Figure 5:
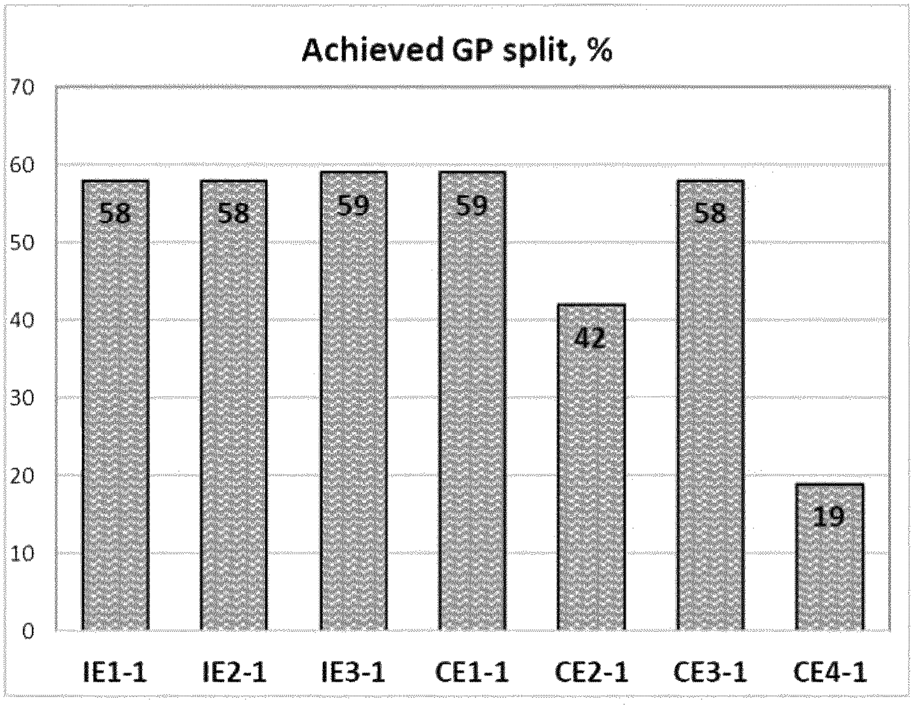
FIG. 5 shows the achieved gas phase split for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).
Figure 6:
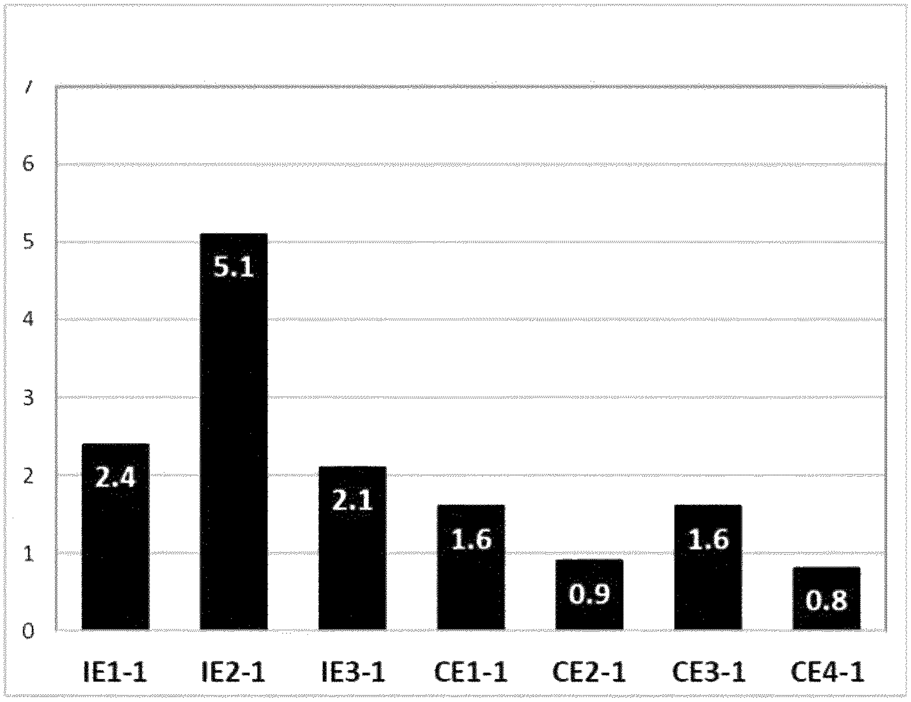
FIG. 6 shows the gas phase to slurry phase activity ratio for IC1-1, IC2-1, IC3-1, CC1, CC2-1, CC3-1 and CC4-1 in the Experiment 1 polymerisations (examples IE1-1, IE2-1, IE3-1, CE1-1, CE2-1, CE3-1 and CE4-1).

The target gas phase split of 58% was achieved in all but two examples (CE2-1 and CE4), where low catalyst activity in slurry required a longer slurry stage time to achieve the required ethylene consumption, which in turn limited the duration of gas phase stage (FIG. 5).

The manifestation of high gas phase performance in form of "Gas Phase to Slurry Phase Activity Ratio" parameter (from here on GP/SP activity ratio) was clearly achieved for IC1-1 to IC3-1 where the ratio was found to be higher and, in case of IC2-1, significantly higher in comparison to CC1 and especially CC2-1-CC4-1 (FIGS. 6-9).

IC2-1 having a lower performance in slurry phase than IC1-1 and IC3-1 improves its performance in gas phase even slightly beyond the activity level of IC1-1 and IC3-1.

High activity of IC1-1 in both slurry and in gas phase conditions, can be attributed to the presence of alkenyl chain in the backbone of metallocene structure. The advantage is reduced for its more open meso-form, as demonstrated by CC3-1 which is based on MC5 that has otherwise the same structure as MC1 in IC1-1.

Poor performance of CC2-1 in comparative example CE2-1 underlines the overall strong advantage of furyl-substituted bridged bis-Cp complexes per se, compared to the classic unbridged bis-Cp complexes when activated and heterogenised in the same way.

Performance of CC4-1 in example CE4-1 is reduced even though the furyl moiety of its metallocene MC6 is exactly the same as in MC1 or MC3 complexes of IC1-1 and IC3-1. This reveals that introducing one bulky substituent in the Cp-ring in position 4 instead of two small substituents in positions 4 and 5 sterically hinders the approach to metal centre, rendering the complex less useful in polymerisation.

Lower $MFR_2$ level in IE1-1-IE3-1 in FIGS. 10 and 11 clearly indicates a higher molecular weight capability of corresponding metallocenes. Introduction of a tert-butyl group in 4-position of Cp-rings of complex MC6 in CC4-1 instead of two methyl groups results in significant loss of molecular weight capability.

The combination of higher comonomer sensitivity and higher activity (especially in gas phase) brings a special value to the inventive examples for a multi-stage process (FIGS. 12-15). High comonomer incorporation capability paired with higher productivity allow for a more economical polymerisation process, as well as allowing for higher GP splits and lower density material unlockable in a gas phase reactor (FIGS. 16, 17).

Experiment 2: Two-Step Catalyst Preparation and Polymerisation Examples

Metallocene complexes MC1-MC7 in this experiment were employed using a significantly different catalyst preparation procedure comprising the two steps—preparation of the aluminoxane-impregnated "activated" silica support (from here and on—$SiO_2$/MAO) and a subsequent metallocene impregnation as a separate step. As a result, inventive catalysts IC1-2-IC3-2, as well as comparative catalysts CC2-2-CC5-2 were prepared as described in the below two-step method.

General Two-Step Catalyst Preparation Method

Step A: Activated carrier preparation ($SiO_2$/MAO)

20 g of pre-treated silica and 100 mL of dry Toluene are placed under nitrogen atmosphere into a multi-necked glass reactor equipped with a mechanical stirrer. The gentle mixing is started and the slurry is cooled −10-0° C. Methylaluminoxane solution (233 mmol Al as 30 wt % MAO solution in Toluene) is then slowly added within 30 minutes, while keeping the reaction mixture temperature below 25° C. The slurry is then allowed to stir at room temperature for further 30 minutes. After that, the stirred reaction mixture is heated up to 90° C. within 20 minutes and kept stirred at this temperature for further 2 hours. The slurry is then settled at 90° C. for 15 minutes and the hot supernatant is siphoned off. 100 mL of dry Toluene is added and the $SiO_2$/MAO carrier is washed under stirring for 30 minutes at 90° C. The carrier is settled and supernatant is siphoned off. A second carrier wash is performed in the same way as above, with a difference that the wash temperature is between 50-70° C. The carrier is settled and supernatant is siphoned off. An extra wash with Heptane at room temperature may be employed to facilitate drying. Supernatant is siphoned off and the activated $SiO_2$/MAO carrier is dried first in the stream of Nitrogen at 60° C. until no free liquid is observed, followed by thorough drying in vacuo for at least 2 hours at 60° C.

Step B: Catalyst Preparation 52.5 μmol of metallocene is dissolved in 2.0 mL of dry Toluene by stirring for 1 hour at 20-60° C. in a glass vial under Nitrogen atmosphere. The obtained solution is then added drop-wise within 5 minutes to 2 g of the activated carrier ($SiO_2$/MAO prepared in step A) in a glass reactor under gentle mechanical stirring at 10-30° C. The crude catalyst is then gently mixed for 1 hour further and left to stand for further 17 hours. The catalyst is then dried in vacuo for 30-60 minutes at 60° C.

TABLE 2

Bimodal multi-stage copolymerisation with inventive and comparative catalyst examples obtained using one-step catalyst preparation method.

| | Polymerisation example | | | | | | | |
|---|---|---|---|---|---|---|---|---|
| | IE1-2 | IE2-2 | IE3-2 | CE1-2 | CE2-2 | CE3-2 | CE4-2 | CE5-2 |
| Catalyst | IC1-2 | IC2-2 | IC3-2 | CC1 | CC2-2 | CC3-2 | CC4-2 | CC5-2 |
| Metallocene in catalyst | MC1 | MC2 | MC3 | MC4 | MC4 | MC5 | MC6 | MC7 |
| Loading Zr/$SiO_2$, umol/g | 38.33 | 38.33 | 38.33 | | 38.33 | 38.33 | 38.33 | 38.33 |
| Loading Al/$SiO_2$, mmol/g | 8.73 | 8.73 | 8.73 | | 8.73 | 8.73 | 8.73 | 8.73 |
| Loading $Al_{SiO2/MAO}$/Zr ratio | 200 | 200 | 200 | | 200 | 200 | 200 | 200 |
| Zr content, wt % | 0.177 | 0.185 | 0.145 | | 0.144 | 0.172 | 0.16 | 0.157 |
| Al content, wt % | 13.6 | 13.9 | 13.3 | | 13.6 | 13.8 | 13.9 | 13.9 |
| Al/Zr ratio, mol/mol | 260 | 254 | 310 | | 319 | 271 | 294 | 299 |
| Volatiles content, wt % | <0.2 | <0.2 | <0.2 | | <0.2 | <0.2 | <0.2 | <0.2 |
| Catalyst amount used (dry basis), mg | 102.5 | 102.6 | 101 | 94 | 104 | 102.5 | 102.7 | 103.4 |
| SP time, min | 92 | 190 | 183 | 83 | 169 | 196 | 118 | 201 |
| GP time, min | 42 | 48 | 50 | 73 | 101* | 175 | 236 | |
| SP Activity, kgPE/(gcat · h) | 1.3 | 0.6 | 0.7 | 1.6 | 0.7 | 0.6 | 0.3 | 0.03 |
| GP Activity, kgPE/(gcat · h) | 4.2 | 3.6 | 3.5 | 2.6 | 0.6 | 1.0 | 0.2 | |
| GP/SP Activity Ratio | 3.2 | 5.6 | 5.3 | 1.6 | 0.9 | 1.6 | 0.7 | |
| Polymer yield, g | 500 | 491 | 465 | 502 | 296 | 468 | 100 | 2 |
| GP split, wt % | 58 | 58 | 58 | 59 | 33 | 58 | 54 | |
| $MFR_2$, g/10 min | 1.2 | 1.2 | 1.4 | 2.2 | 4.6 | 1.9 | 179.4 | |
| Density, kg/$m^3$ | 922.2 | 921.8 | 921.3 | 928.7 | 933.4 | 931.2 | 936.8 | |
| 1-Butene content, wt % | 1.2 | 1.1 | 1.1 | 0.4 | 1 | 0.5 | 0.5 | |

TABLE 2-continued

Bimodal multi-stage copolymerisation with inventive and comparative catalyst examples obtained using one-step catalyst preparation method.

| | Polymerisation example | | | | | | | |
|---|---|---|---|---|---|---|---|---|
| | IE1-2 | IE2-2 | IE3-2 | CE1-2 | CE2-2 | CE3-2 | CE4-2 | CE5-2 |
| 1-Hexene content, wt % | 3.9 | 4.2 | 4.1 | 4.1 | 2.1 | 3.5 | 5.6 | |
| 1-Butene in SP material (calc.), wt % | 2.8 | 2.6 | 2.6 | 1.1 | 1.4 | 1.2 | 1.2 | |
| 1-Hexene in GP material (calc.), wt % | 6.8 | 7.3 | 7.2 | 6.9 | 6.3 | 6.1 | 10.2 | |

All inventive catalysts IC1-2-IC3-2 and comparative catalysts CC1, CC2-2-CC5-2 were used in copolymerisation in a multi-stage configuration comprising a prepolymerisation, slurry phase polymerisation and gas phase polymerisation. Polymerisation conditions are described above as the "General bench-scale multi-stage Ethylene copolymerisation method" and the corresponding copolymerisation inventive examples IE1-2-IE3-2 and comparative examples CE1-2-CE5-2 are disclosed in Table 2. Comparative CC1 was used in polymerisation as received, in oil slurry form.

DISCUSSION

In spite of the significant difference of the two-step catalyst preparation method and of the employed metallocene and alumoxane loadings described herein in comparison to the Experiment 1, surprisingly and largely similar results and observations were obtained, indicating that both methods are viable alternatives for catalyst preparation.

As can be seen from the Table 2 and from the performance plots for corresponding polymerisation examples in FIGS. 18, 19, 21-24, the inventive catalysts IC1-2, IC2-2 and IC3-2 surprisingly demonstrated (when prepared using the described two-step method) a much better ratio of gas phase activity to slurry phase activity and higher gas phase performance compared to the comparative examples CC1 and CC2-2-CC4-2. The described herein inventive catalysts in addition possess high comonomer sensitivity as reflected in the polymer higher comonomer content, lower density of the inventive polymerisation examples and higher polymer molecular weight capability, relative to the comparative catalysts.

Comparison of IE1-2 to IE3-2 indicates a significance of metallocene backbone bridge substitution with alkenyl moieties, to provide an improved catalyst activity, especially in slurry phase, compared to mere short alkyl substitution.

Comparison pair-wise of IE1-2 and CE4-2 to CE3-2 and CE5-2 (the latter two are based on respective meso-forms MC5 and MC7) demonstrates the importance of selective utilization of pure stereoisomer forms (in most cases rac-forms) for best performance.

Comparison of IE1-2, IE2-2 to CE4-2 (negative effect of tert-butyl substitution in MC6 on performance of CC4-2) underlines the importance of selection of metallocene structure, e.g. the substitution pattern within the same metallocene type (here, bridged furyl-substituted bis-Cp complexes) when high performance is concerned. Performance of CC4-2 is low even though the furyl moiety of the metallocene is exactly the same as in MC1 of IC1-2 and MC3 of IE3-2. It reveals that introducing one bulky substituent in the Cp-ring in position 4 instead of two small substituents in positions 4 and 5 sterically hinders the approach to metal centre, rendering the complex less useful in polymerisation.

Its meso-form (MC7) based catalyst CC5-2 possesses even lower, almost negligible performance.

In slurry phase, in terms of catalyst activity, only IC1-2 manages to more to match the CC1 activity, however in gas phase the performance is different: IC1-2-IC3-2 are superior by catalyst activity compared to catalyst examples CC1 and CC2-2-CC4-2.

Gas phase split of 58% is achieved with all but CC2-2, CC4-2 and CC5-2 catalysts (FIG. 20). For CC5-2 low catalyst activity in slurry phase meant that gas phase stage had to be aborted and was not performed.

The key of the invention is the manifestation of high gas phase performance in form of "Gas Phase to Slurry Phase Activity Ratio" parameter. For polymerisation examples IE1-2-IE3-2 the Ratio is found to be significantly to overwhelmingly higher in comparison to CE1-2-CE4-2 (FIG. 21). A high gas phase to slurry phase activity ratio is beneficial since it is an indicator of catalyst utility in a multi-stage process and especially performance in a later gas phase step.

Catalyst IC1-2, owing to its very high activity in both slurry and gas phase, understandably demonstrates (IE1-2) somewhat lower calculated GP/SP Activity Ratio, compared to IC2-2 and IC3-2. The excellent activity of IC1-2 in both slurry and in gas phase conditions is especially prominent, apparently owing to the presence of long alkenyl chain in the backbone of metallocene structure (the alkenyl chain interaction, reversible coordination to active metal centre). Interestingly, such effect becomes lost on more open meso-form, as demonstrated by CC3-2 whose metallocene MC5 has otherwise the same structure as MC1 in IC1-2.

IC2-2 and IC3-2, having moderate slurry phase performance than IC1-2, improve in gas phase significantly.

When the same catalyst preparation platform is used for MC4 in CC2-2 (as opposed to a significantly different ActivCat® platform in CC1), a fair performance comparison can be drawn between the furyl-based metallocenes (MC1-MC3) in the inventive catalysts and Bis(1-methyl-3-n-butylcyclopentadienyl)zirconium dichloride metallocene MC4. Poor performance of CC2-2 underlines the overall strong advantage of furyl-substituted bridged bis-Cp complexes per se, compared to classic unbridged bis-Cp complexes when activated and heterogenised in the same way.

Lower $MFR_2$ level in polymerisation examples IE1-2-IE3-2 clearly indicates a higher molecular weight capability of the corresponding metallocenes MC1-MC3 (FIGS. 25, 26). Introduction of a tert-butyl group in 4-position of Cp-rings of complex MC6 in CC4-2 instead of two methyl groups results in significant loss of molecular weight capability (as well as activity, see CE4-2). MFR in CE2-2 and CE4-2 are to some extent exaggerated due to the GP split not being achieved for these examples (low-MFR polymer fraction is typically produced under the utilised GP conditions) and are not fully representative.

The combination of higher comonomer sensitivity and higher activity (especially in gas phase) brings a special value to the inventive examples for a multi-stage process (FIGS. 27-30). High comonomer incorporation capability paired with higher productivity allow for a more economical polymerisation process, as well as allowing for higher GP splits and lower density material unlockable in a gas phase reactor (FIGS. 31, 32).

It is noteworthy, as mentioned above, that the performance for the inventive and comparative metallocenes, heterogenised using the one-step (Experiment 1) and two-step catalyst preparation method (Experiment 2) are to a large extent similar.

The invention claimed is:

1. A process for the preparation of a multimodal ethylene polymer comprising:

(I) polymerising ethylene and optionally at least one C4-10 alpha olefin comonomer in a first stage in the presence of a racemic metallocene catalyst comprising:

(i) a complex of formula (Ix)

(Ix)

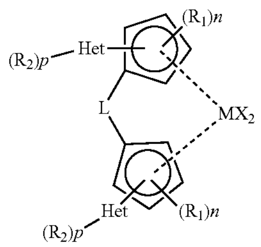

wherein each X is a sigma donor ligand;

each Het is independently a monocyclic or multicyclic heteroaromatic or heterocyclic group containing at least one heteroatom selected from O, N or S;

L is a carbon, silicon or germanium based divalent bridge in which one or two backbone atoms link the ligands;

M is Ti, Zr or Hf;

each $R_1$ is the same or different and is a linear $C_{1-10}$ alkyl group, or linear $C_{1-10}$ alkoxy, each n is 0 to 3;

each $R_2$ is the same or different and is a $C_{1-10}$ alkyl group, $C_{1-10}$ alkoxy group or —$Si(R)_3$ group;

each R is the same or different and is $C_{1-10}$ alkyl or phenyl group optionally substituted by 1 to 3 $C_{1-6}$ alkyl groups; and each p is 0 to 3;

(ii) a cocatalyst which comprises a compound of a group 13 element; and optionally (iii) a support;

so as to form a first polyethylene component;

(II) polymerising ethylene and optionally at least one C4-10 alpha olefin comonomer in a second stage in the presence of the product of step (I) so as to form a second component.

2. The process as claimed in claim 1, wherein:

said first polyethylene component forms 30 to 70 wt % of said ethylene polymer;

said second component forms 30 to 70 wt % of said ethylene polymer; and said multimodal ethylene polymer has a density of 900 to 980 kg/m$^3$, an $MFR_2$ in the range of 0.01 to 50 g/10 min.

3. A process for the preparation of a multimodal polyethylene polymer comprising:

(I) contacting a solid support with a solution of a cocatalyst comprising a compound of a group 13 element and a racemic metallocene complex of formula (Ix)

(Ix)

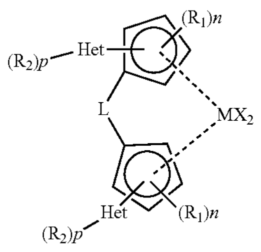

wherein each X is a sigma donor ligand;

each Het is independently a monocyclic or multicyclic heteroaromatic or heterocyclic group containing at least one heteroatom selected from O, N or S;

L is a carbon, silicon or germanium based divalent bridge in which one or two backbone atoms link the ligands;

M is Ti, Zr or Hf;

each $R_1$ is the same or different and is a linear $C_{1-10}$ alkyl group, or linear $C_{1-10}$ alkoxy, each n is 0 to 3;

each $R_2$ is the same or different and is a $C_{1-10}$ alkyl group, $C_{1-10}$ alkoxy group or —$Si(R)_3$ group;

each R is $C_{1-10}$ alkyl or phenyl group optionally substituted by 1 to 3 $C_{1-6}$ alkyl groups; and each p is 0 to 3;

so as to form a supported catalyst;

(II) polymerising ethylene and optionally at least one C4-10 alpha olefin comonomer in a first stage in the presence of said supported catalyst so as to form a first polyethylene component;

(III) polymerising ethylene and optionally at least one C4-10 alpha olefin comonomer in a second stage in the presence of the product of step (I) so as to form a second polyethylene component.

4. A process for the preparation of a multimodal polyethylene polymer comprising:

(I) contacting a solid support with a solution of a cocatalyst comprising a compound of a group 13 element; so as to form a cocatalyst impregnated support;

(II) contacting said cocatalyst impregnated support with a racemic metallocene complex of formula (Ix)

(Ix)

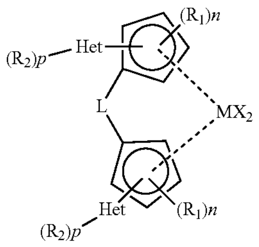

wherein each X is a sigma donor ligand;

each Het is independently a monocyclic or multicyclic heteroaromatic or heterocyclic group containing at least one heteroatom selected from O, N or S;

L is a carbon, silicon or germanium based divalent bridge in which one or two backbone atoms link the ligands;

M is Ti, Zr or Hf;

each $R_1$ is the same or different and is a linear $C_{1-10}$ alkyl group, or linear $C_{1-10}$ alkoxy, each n is 0 to 3;

each $R_2$ is the same or different and is a $C_{1-10}$ alkyl group, $C_{1-10}$ alkoxy group or —$Si(R)_3$ group;

each R is the same or different and is $C_{1-10}$ alkyl or phenyl group optionally substituted by 1 to 3 $C_{1-6}$ alkyl groups; and each p is 0 to 3;

so as to form a supported catalyst;

(III) polymerising ethylene and optionally at least one C4-10 alpha olefin comonomer in a first stage in the presence of said supported catalyst so as to form a first polyethylene component;

(IV) polymerising ethylene and optionally at least one C4-10 alpha olefin comonomer in a second stage in the presence of the product of step (I) so as to form a second polyethylene component.

5. The process as claimed in claim 1, wherein the cocatalyst is an aluminoxane.

6. The process as claimed in claim 1, wherein the support is a porous inorganic support.

7. The process as claimed in claim 1, wherein the complex of formula (Ix) is C2 symmetric.

8. The process as claimed in claim 1, wherein each X is independently a hydrogen atom, a halogen atom, $C_{1-6}$-alkyl, $C_{1-6}$-alkoxy group, amido, phenyl or benzyl group.

9. The process as claimed in claim 1, wherein L is —$R'_2C$—, —$R'_2C$—$CR'_2$—, —$R'_2Si$—, —$R'_2Si$—$SiR'_2$—, —$R'_2Ge$—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring.

10. The process as claimed in claim 1, wherein $R_1$ is a linear $C_{1-6}$-alkyl group.

11. The process as claimed in claim 1, wherein the first polymerisation stage is preceded by a prepolymerisation step.

12. The process as claimed in claim 1, wherein at least one comonomer is present in the first stage or second stage.

13. The process as claimed in claim 1, wherein said multimodal polyethylene polymer comprises 1-butene, 1-hexene, 1-octene or a mixture thereof.

14. The process as claimed in claim 1, wherein the first stage takes place in the slurry phase and the second stage in the gas phase.

15. The process as claimed in claim 1, wherein

L is a (RdRe)Si group, (RdRe)Ge or $(RdRe)CH_2$;

Rd is a $C_{1-10}$ alkyl group, $C_{5-10}$-cycloalkyl, benzyl or phenyl; and

Re is a $C_{2-10}$ alkenyl group.

16. The process as claimed in claim 1, wherein:

each X is independently a hydrogen atom, a halogen atom, a $C_{1-6}$-alkyl, $C_{1-6}$-alkoxy group, amido, phenyl or benzyl group;

each Het is independently a monocyclic heteroaromatic or heterocyclic group containing at least one heteroatom selected from O or S;

L is —$R'_2Si$—, wherein each R' is independently $C_{1-20}$ hydrocarbyl or $C_{1-10}$ alkyl substituted with alkoxy having 1 to 10 carbon atoms;

M is Ti, Zr or Hf;

each $R_1$ is the same or different and is a linear $C_{1-6}$ alkyl group or linear $C_{1-6}$ alkoxy group;

each n is 1 to 2;

each $R_2$ is the same or different and is a $C_{1-6}$ alkyl group, $C_{1-6}$ alkoxy group or —$Si(R)_3$ group;

each R is the same or different and is $C_{1-10}$ alkyl or phenyl group optionally substituted by 1 to 3 $C_{1-6}$ alkyl groups; and each p is 0 to 1.

17. The process as claimed in claim 1, wherein said complex is:

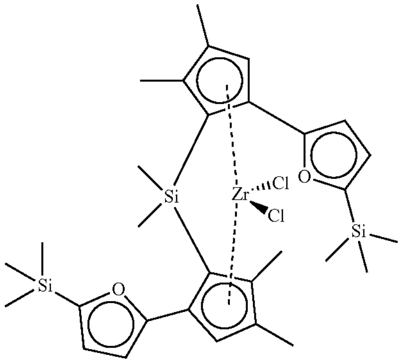

,

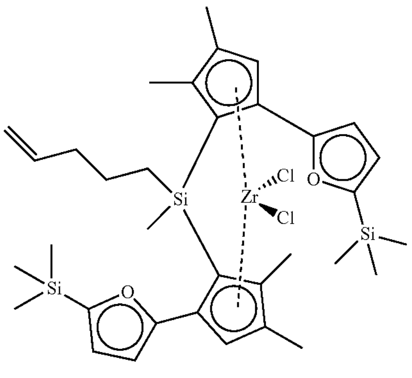

or

-continued

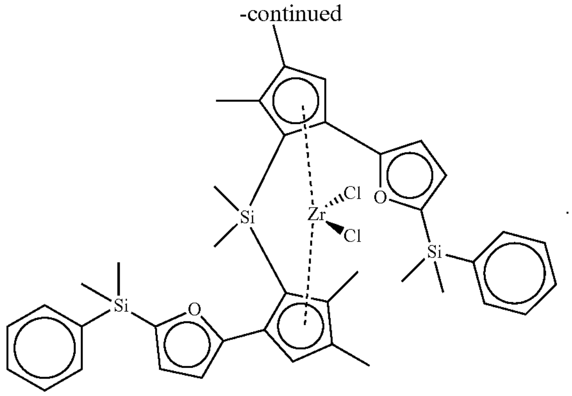

18. The process as claimed in claim 1, wherein the first stage takes place in the slurry phase and the second stage in the gas phase and the activity of the catalyst in the gas phase is higher than the slurry phase.

19. The process as claimed in claim 1, wherein:

each X is independently a hydrogen atom, a halogen atom, a $C_{1-6}$-alkyl, $C_{1-6}$-alkoxy group, amido, phenyl or benzyl group;

each Het is independently a monocyclic heteroaromatic or heterocyclic group containing at least one heteroatom selected from O or S;

L is —R'$_2$Si—, wherein each R' is independently C1-10 alkyl, C3-8 cycloalkyl or C2-10 alkenyl;

M is Ti, Zr or Hf;

each $R_1$ is the same or different and is a linear $C_{1-6}$ alkyl group;

each n is 1 to 2;

each $R_2$ is the same or different and is a —Si(R)$_3$ group;

each R is $C_{1-10}$ alkyl or phenyl group optionally substituted by 1 to 3 $C_{1-6}$ alkyl groups; and each p is 0 to 1.

20. The process as claimed in claim 1, wherein the complex is of formula (VII)

(VII)

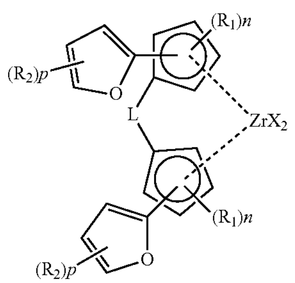

wherein each X is a sigma donor ligand;

L is a carbon, silicon or germanium based divalent bridge in which one or two backbone atoms link the ligands;

each $R_1$ is the same or different and is a linear $C_{1-6}$ alkyl group;

each n is 0 to 3;

each $R_2$ is the same or different and is a $C_{1-6}$ alkyl group or —Si(R)$_3$ group;

each R is $C_{1-10}$ alkyl or phenyl group optionally substituted by 1 to 3 $C_{1-6}$ alkyl groups; and each p is 0 to 3.

21. The process as claimed in claim 1, wherein L is —R'$_2$Si—, wherein each R' is independently a $C_1$-$C_{10}$-alkyl, $C_{2-10}$ alkenyl, $C_{5-6}$-cycloalkyl, $C_{1-10}$-alkyl-O—$C_{1-10}$ alkyl, benzyl or phenyl group.

* * * * *